(12) United States Patent
Ando et al.

(10) Patent No.: US 8,279,722 B2
(45) Date of Patent: Oct. 2, 2012

(54) METHOD, APPARATUS AND PROGRAM FOR PROCESSING INFORMATION

(75) Inventors: Hideki Ando, Kanagawa (JP); Mitsutoshi Shinkai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1212 days.

(21) Appl. No.: 11/105,389

(22) Filed: Apr. 14, 2005

(65) Prior Publication Data

US 2005/0237865 A1 Oct. 27, 2005

(30) Foreign Application Priority Data

Apr. 16, 2004 (JP) .............. P2004-121767

(51) Int. Cl.
*G11B 21/08* (2006.01)
*G11B 7/85* (2006.01)
*G11B 5/09* (2006.01)

(52) U.S. Cl. .............. 369/30.03; 369/30.09; 369/30.07; 369/47.2

(58) Field of Classification Search .............. 369/47.23, 369/30.2
See application file for complete search history.

(56) References Cited

U.S. PATENT DOCUMENTS

| | | | | |
|---|---|---|---|---|
| 5,263,010 A | * | 11/1993 | Amemiya et al. | 369/30.04 |
| 5,731,923 A | * | 3/1998 | Sakuma | 360/69 |
| 6,937,553 B1 | * | 8/2005 | Mitui et al. | 369/84 |
| 2004/0022316 A1 | * | 2/2004 | Ueda et al. | 375/240.05 |

FOREIGN PATENT DOCUMENTS

| | | |
|---|---|---|
| JP | 6-168343 | 6/1994 |
| JP | 6-251562 | 9/1994 |
| JP | 8-315549 | 11/1996 |
| JP | 09-102185 | 4/1997 |
| JP | 9-106658 | 4/1997 |
| JP | 11-196372 | 7/1999 |
| JP | 11-289516 | 10/1999 |
| JP | 11-297041 | 10/1999 |
| JP | 2001-35082 | 2/2001 |
| JP | 2001-52466 | 2/2001 |
| JP | 2001-93263 | 4/2001 |
| JP | 2002-027389 | 1/2002 |
| JP | 2002-182694 | 6/2002 |
| JP | 2002-304822 | 10/2002 |
| JP | 2000-182358 | 6/2008 |

* cited by examiner

*Primary Examiner* — Mohammad Ghayour
*Assistant Examiner* — Carl Adams
(74) *Attorney, Agent, or Firm* — Oblon, Spivak, McClelland, Maier & Neustadt, L.L.P.

(57) ABSTRACT

In an information processing apparatus that stores data on a plurality of storage media, a management information generator generates management information based on which to manage an order in which data is stored on the storage media, using storage medium identification information identifying each storage medium, and a multiplexer multiplexes the management information generated by the management information generator on the data. A storage unit stores the data, including the management information multiplexed by the multiplexer, on the storage media such that the data can be easily managed and the storage media can be used in a very convenient manner.

17 Claims, 41 Drawing Sheets

FIG. 36

```
┌─ 361 ─────────────────────────────────────────────────────────┐
│ STORAGE GROUP IDENTIFICATION                                  │
│ INFORMATION: UMIDXXX         301-1                            │
│                              ┌──────────────────────────────┐ │
│                              │ MANAGEMENT        351        │ │
│         DATA #1              │ INFORMATION                  │ │
│                              │ ┌──────────────────────────┐ │ │
│  251-1 ◄─────────────────────┤ │ STORAGE GROUP IDENTIFICATION│ │
│                              │ │ INFORMATION: UMIDXXX     │ │ │
│                              │ └──────────────────────────┘ │ │
│    DATA IDENTIFICATION       │ ┌──────────────────────────┐ │ │
│  INFORMATION: FILE NAME "C0001"│ │ DATA IDENTIFICATION      │ │ │
│             281-1            │ │ INFORMATION: INITIAL VALUE│ │ │
│                              │ └──────────────────────────┘ │ │
│                              │              321             │ │
│                              └──────────────────────────────┘ │
│                              *INDICATING THE STORAGE GROUP    │
│                              AND THE ORDER DEFINED WITHIN     │
│                              THE STORAGE GROUP                │
│                                    301-2                      │
│                              ┌──────────────────────────────┐ │
│                              │ MANAGEMENT        351        │ │
│         DATA #2              │ INFORMATION                  │ │
│                              │ ┌──────────────────────────┐ │ │
│  251-2 ◄─────────────────────┤ │ STORAGE GROUP IDENTIFICATION│ │
│                              │ │ INFORMATION: UMIDXXXX    │ │ │
│                              │ └──────────────────────────┘ │ │
│    DATA IDENTIFICATION       │ ┌──────────────────────────┐ │ │
│  INFORMATION: FILE NAME "C0002"│ │    FILE NAME "C0001"     │ │ │
│             281-2            │ └──────────────────────────┘ │ │
│                              │              281-1           │ │
│                              └──────────────────────────────┘ │
│                              *INDICATING THE STORAGE GROUP    │
│                              AND THE ORDER DEFINED WITHIN     │
│                              THE STORAGE GROUP                │
│                                    301-3                      │
│                              ┌──────────────────────────────┐ │
│                              │ MANAGEMENT        351        │ │
│         DATA #3              │ INFORMATION                  │ │
│                              │ ┌──────────────────────────┐ │ │
│  251-3 ◄─────────────────────┤ │ STORAGE GROUP IDENTIFICATION│ │
│                              │ │ INFORMATION: UMIDXXXX    │ │ │
│                              │ └──────────────────────────┘ │ │
│    DATA IDENTIFICATION       │ ┌──────────────────────────┐ │ │
│  INFORMATION: FILE NAME "C0003"│ │    FILE NAME "C0001"     │ │ │
│             281-3            │ └──────────────────────────┘ │ │
│                              │              281-2           │ │
│                              └──────────────────────────────┘ │
│                              *INDICATING THE STORAGE GROUP    │
│                              AND THE ORDER DEFINED WITHIN     │
│                              THE STORAGE GROUP                │
└───────────────────────────────────────────────────────────────┘

┌─ 362 ─────────────────────────────────────────────────────────┐
│ STORAGE GROUP IDENTIFICATION INFORMATION UMIDYYY              │
│                                                               │
│    DATA #11        DATA #12         DATA #13                  │
│                                                               │
│  251-11         251-12           251-13                       │
└───────────────────────────────────────────────────────────────┘
```

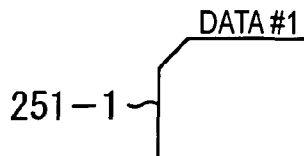
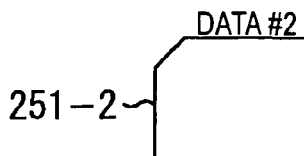
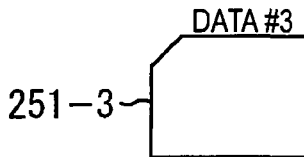
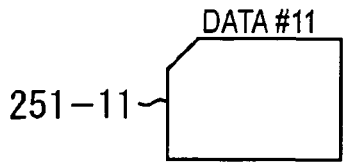
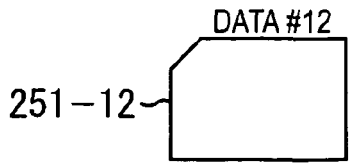
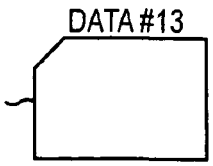

METHOD, APPARATUS AND PROGRAM FOR PROCESSING INFORMATION

CROSS REFERENCES TO RELATED APPLICATIONS

The present invention contains subject matter related to Japanese Patent Application JP 2004-121767 filed in the Japanese Patent Office on Apr. 16, 2004, the entire contents of which are incorporated herein by reference.

BACKGROUND OF THE INVENTION

1. Field of the Invention

The present invention relates to a method, apparatus, and program for processing information, and more particularly, to a method, apparatus, and program for processing information such that data is stored on storage media in a form that allows the stored data to be easily managed and thus the storage media can be dealt with in a very convenient manner.

2. Description of the Related Art

It is known to store image data and/or audio data acquired by taking a picture or the like on a storage medium such as a tape device. For example, in an imager device such as a camcorder (registered trademark), image data (and audio data (sound/voice data)) obtained by taking an image is subjected to signal processing such as image processing, and the resultant image data is stored on a tape device or a rewritable optical disk. In some devices that have been developed in recent years, image data and/or audio data are stored in a semiconductor memory such as a flash memory (examples are disclosed, for example, in Japanese Unexamined Patent Application Publications Nos. 2003-189147 and 2003-333521). An example of such a semiconductor memory used for the above purpose is a built-in semiconductor memory preinstalled in an imager device. Another example is a memory card composed of a semiconductor memory housed in a card-shaped plastic case which can be easily attached/removed to/from an imager device.

In general, a storage medium such as a tape device, an optical disk, or a memory card has a predetermined storage capacity and is constructed in a form that allows attachment/removal to/from a recording apparatus or a playback apparatus. The length of a time period (a maximum allowable recording time) in which image data is allowed to be stored in a storage medium depends on the type (and the storage capacity) of the medium and the signal quality (bit rate) of data to be stored. For example, a common memory card is capable of storing image data with signal quality for use in broadcasting or for business/industrial use for several minutes to several ten minutes. A disk medium such as an optical disk is capable of storing image data for several ten minutes to two hours. A tape medium such as a tape device is capable of storing image data for two hours in the case of media for use in studio recording or several ten minutes in the case of media for use with a portable recording apparatus.

As described above, each storage medium has a limit on the storage capacity (the maximum allowable storage time). Therefore, when a user records image data on a storage medium using a camcorder, the user exchange the storage medium mounted on the camcorder with a new storage medium (having a free storage space) each time the storage medium becomes full and has no free space to further store image data.

That is, to store long image data that cannot be stored on a single storage medium, the image data is stored on a plurality of storage media. For example, a concert, a drama, a sport event, or the like is generally performed for two to three hours (for longer hours such as four hours in some cases). To store image data of such a long event (performance), a single storage medium is insufficient.

Not only when such long image data is stored, but when image data is stored on a storage medium that has a small remaining free capacity after some other image data has been stored, it is also required to exchange the storage medium with a new storage medium.

However, when a plurality of media are used, a user has difficulty in identifying which image data is stored on which medium. Thus, in general, the user manually describes a title, a serial number, or the like on a label attached to each medium to make it possible to identify which image data is stored on which medium. For example, "1" is described on a label attached to a first medium (on which first image data is stored), "2" is described on a label attached to a second medium (on which second image data is stored), "3" is described on a label attached to a third medium (on which third image data is stored), and so on so that the user can identify the order of media (the order in which image data was stored on media).

SUMMARY OF THE INVENTION

However, it is very troublesome for a user to manually describe numbers on respective storage media to indicate the order in which image data was stored. It is desirable to describe a number on a label of a storage medium immediately after the storage medium was exchanged to avoid a wrong description which may occur if it is described at a later time. However, when a user takes an image without help of any other person, it is difficult to describe a number on a storage medium in the middle of a recording operation. Thus, describing of numbers on storage media is generally performed at a later time, and a wrong number is often described by mistake.

Even if correct numbers are described on respective storage media, a common playback apparatus does not have the capability of reading the number described on each storage medium when image data is played back, and thus a user needs to identify a correct storage medium and mount it on the playback apparatus. This is a troublesome task for the user, and the troublesomeness can cause a wrong storage medium to be mounted on the playback apparatus.

In view of the above, the present invention provides a technique of easily managing data stored on storage media to allow storage media to be used in a more convenient manner.

In an embodiment, the present invention provides an information processing apparatus including a management information generator that generates management information based on which to manage an order in which data is stored on the storage media, using storage medium identification information identifying each storage medium, a multiplexer that multiplexes the management information generated by the management information generator on the data, and a storage unit that stores the data, including the management information multiplexed by the multiplexer, on the storage medium.

The information processing apparatus may further include an information reader that reads the storage medium identification information from each storage medium, and the management information generator may generate the management information using the storage medium identification information read by the information reader.

In the information processing apparatus, the management information multiplexed on the data by the multiplexer may be generated by the management information generator so as to include storage medium identification information identifying a storage medium immediately previous, in the order of storage media, to the storage medium on which the data is stored.

The management information multiplexed on the data by the multiplexer may be generated by the management information generator so as to include storage medium identification information identifying a storage medium immediately following, in the order of storage media, the storage medium on which the data is stored.

The information processing apparatus may further include a history information generator that generates history information indicating a history of the management information generated by the management information generator, and the multiplexer may multiplex the history information generated by the history information generator on the data instead of the management information.

The information processing apparatus may further include an order information manager that manages the value of order information associated with the order, and the management information generator may generate the management information using the order information managed by the order information manager.

The information processing apparatus may further include a storage group identification information generator that generates storage group identification information identifying a storage group that is a set of data, and the management information generator may generate the management information using the storage group identification information generated by the storage group identification information generator.

In an embodiment, the invention provides a method of processing information, including the steps of generating management information based on which to manage an order in which data is stored on the storage media, using storage medium identification information identifying each storage medium, multiplexing the management information generated in the management information generating step on the data, and storing the data, including the management information multiplexed in the multiplexing step, on the storage media.

In an embodiment, the invention provides a program that causes a computer to perform a process including the steps of generating management information based on which to manage an order in which data is stored on the storage media, using storage medium identification information identifying each storage medium, multiplexing the management information generated in the management information generating step on the data, and storing the data, including the management information multiplexed in the multiplexing step, on the storage media.

In an embodiment, the present invention provides an information processing apparatus including a reading unit that reads the data from each of the plurality of storage media, an extractor that extracts storage medium identification information from each data read by the reading unit, the storage medium identification information identifying a storage medium on which each data is stored, a playback order determination unit that determines the order in which to play back the plurality of data read by the reading unit, based on the storage medium identification information extracted by the extractor, and a playback controller that plays back the plurality of data read by the reading unit in the order determined by the playback order determination unit.

In an embodiment, the invention provides a method of processing information, including the steps of reading the data from each of the plurality of storage media, extracting storage medium identification information from each data read in the reading step, the storage medium identification information identifying a storage medium on which each data is stored, determining the order in which to play back the plurality of data read in the reading step, based on the storage medium identification information extracted in the extraction step, and playing back the plurality of data read in the reading step in the order determined by the playback order determination step.

In an embodiment, the invention provides a program that causes a computer to perform a process including the steps of reading the data from each of the plurality of storage media, extracting storage medium identification information from each data read in the reading step, the storage medium identification information identifying a storage medium on which each data is stored, determining the order in which to play back the plurality of data read in the reading step, based on the storage medium identification information extracted in the extraction step, and playing back the plurality of data read in the reading step in the order determined by the playback order determination step.

As described above, in the information processing method, apparatus, and program according to one embodiment, management information for managing an order in which data are stored on storage media is generated using storage medium identification information identifying each storage medium, and the data are stored on the storage media together with the generated management information multiplexed on the data.

In the information processing method, apparatus, and program according to another embodiment, data are read from a plurality of storage media and storage medium identification information identifying the respective storage media on which the data are stored is extracted from each data, Based on the extracted storage medium identification information, the order in which to play back the plurality of data is determined, and the plurality of data are played back in the determined order.

As described above, the present invention provides a great advantage that data stored on storage media can be easily managed and thus the storage media can be used in a very convenient manner.

BRIEF DESCRIPTION OF THE DRAWINGS

FIG. 36 is a diagram showing another example of management information;

FIG. 2 is a block diagram showing an example of a structure of an editing apparatus shown in FIG. 38;

DESCRIPTION OF THE PREFERRED EMBODIMENTS

Figure 1:
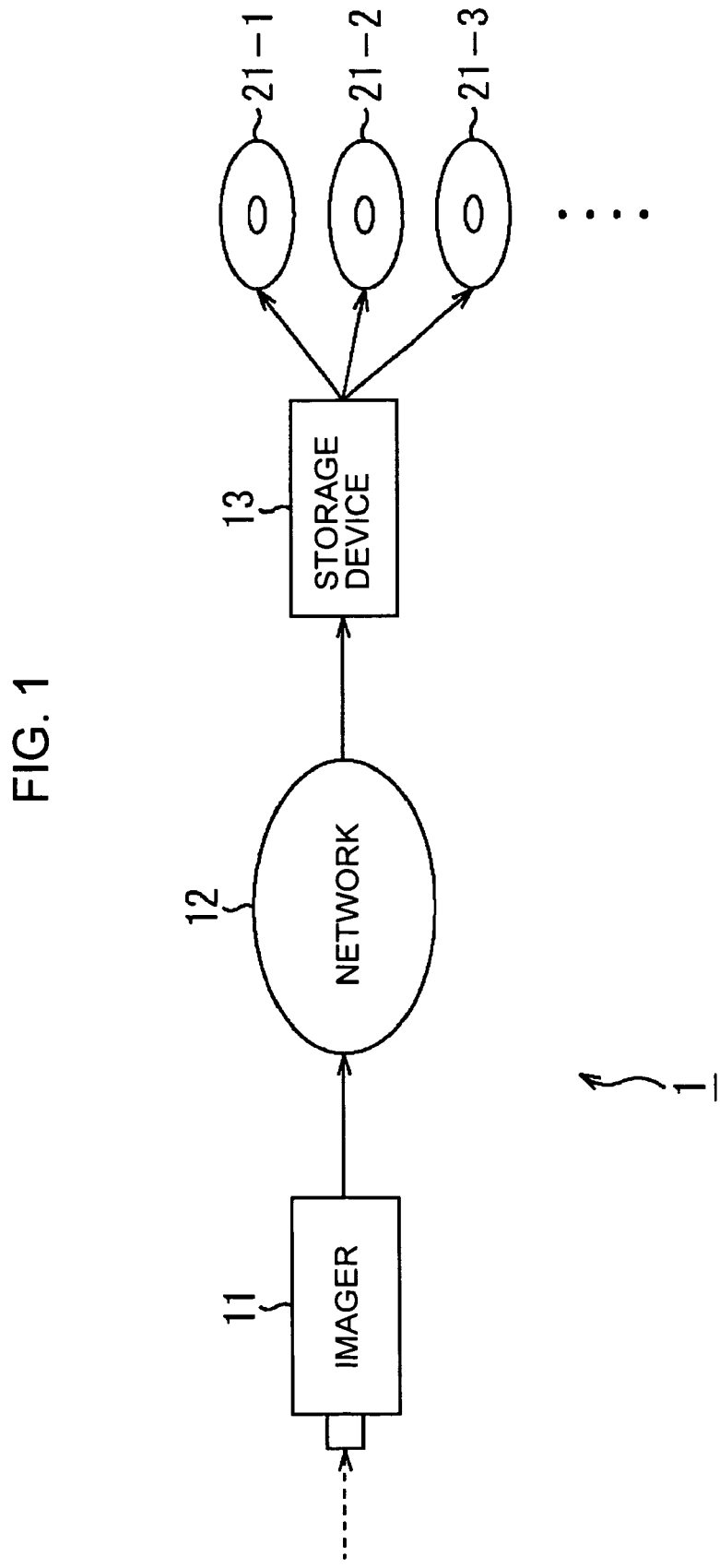
FIG. 1 is a block diagram showing a network system according to an embodiment of the present invention.

Before embodiments of the present invention are described, correspondence between specific examples of parts/steps in the embodiments and those in the respective claims is described. Note that the purpose of the following description is to indicate that specific examples corresponding to the respective claims are described in the embodiments, and thus the purpose of the following description is not to limit specific examples of the respective claims to those described below. That is, there can be a part/step that is not described in the following description of the correspondence but that corresponding to a part/step of a particular claim. Conversely, an example of a part/step, which is described in the following description of the correspondence as corresponding to a particular claim, can correspond to a part/step of another claim.

Also note that it should be understood that some examples described in the embodiments can correspond to no claims. In other words, there can be a claim that corresponds to an example described in the embodiments but that is not included in the current claims, that is, there can be a future claim presented by means of division or amendment of application.

The present invention provides an information processing apparatus (for example, a storage device 13 shown in FIG. 1) that stores data on a plurality of storage media. This information processing apparatus includes a management information generator (for example, a management information generator 44 shown in FIG. 2) that generates management information (for example, management information 71 shown in FIG. 4) based on which to manage an order in which data is stored on the storage media, using storage medium identification information identifying each storage medium, a multiplexer (for example, a multiplexer 34 shown in FIG. 2) that multiplexes the management information generated by the management information generator on the data, and a storage unit (for example, a storage controller 35 shown in FIG. 2) that stores the data, including the management information multiplexed by the multiplexer, on the storage medium.

Figure 2:
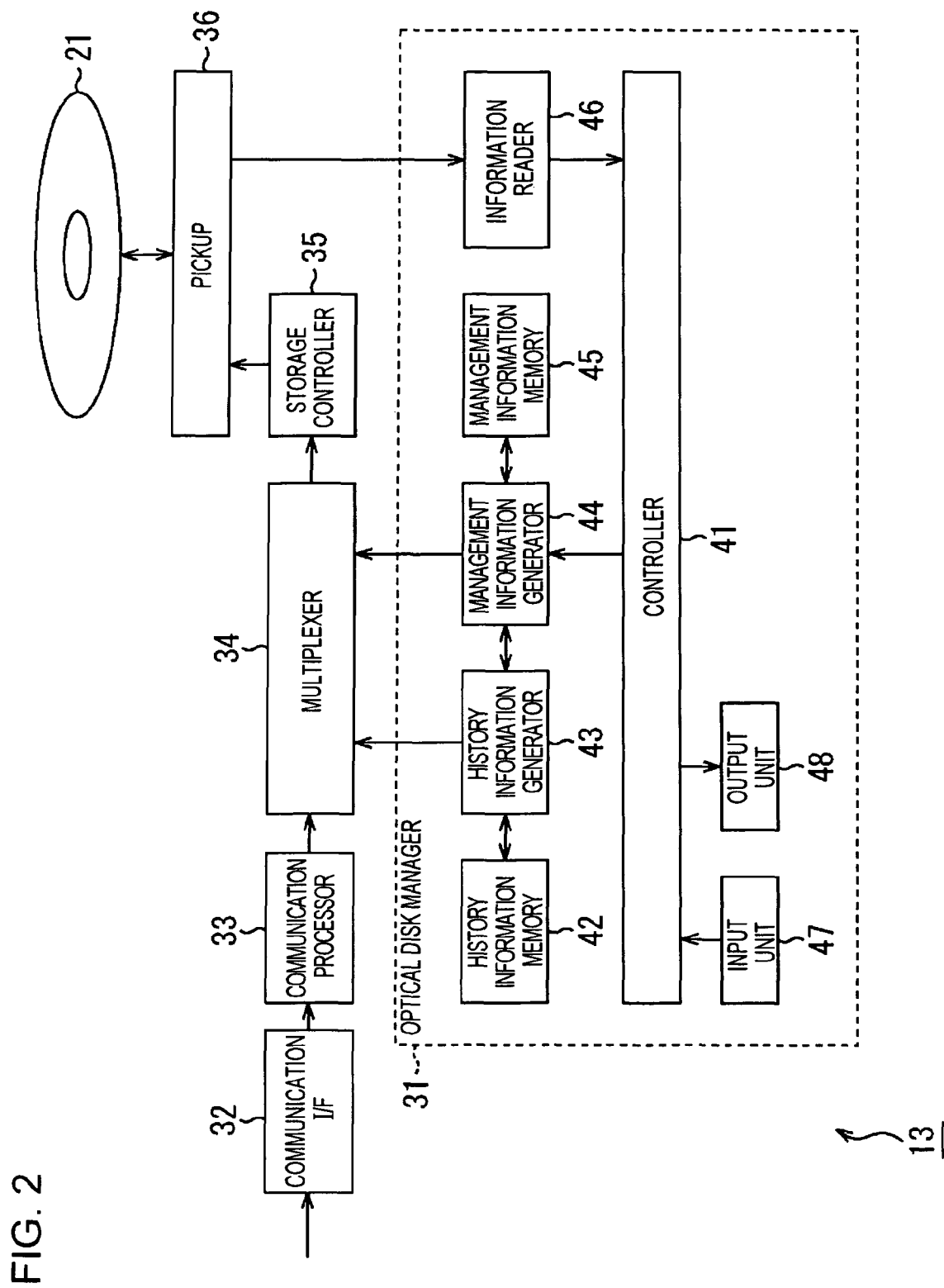
FIG. 2 is a block diagram showing an example of a structure of a storage device shown in FIG. 1.
Figure 3:
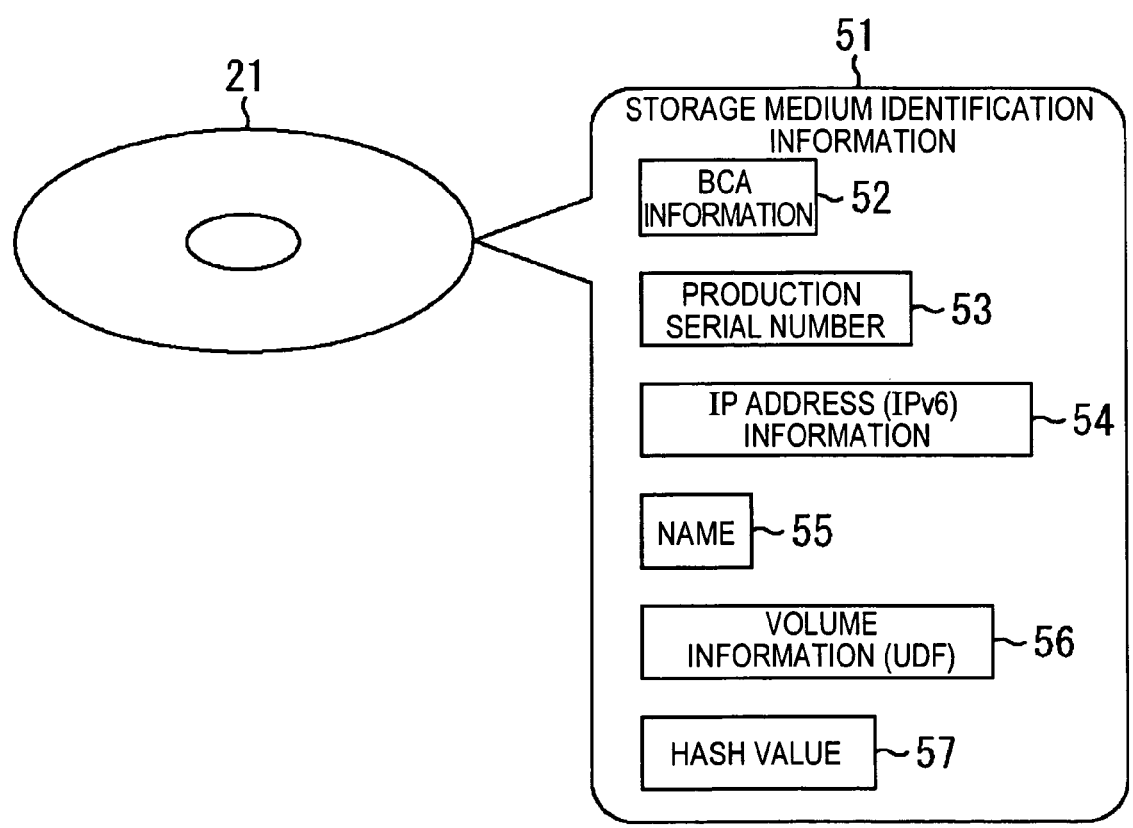
FIG. 3 is a diagram showing an example of a data structure of storage medium identification information.

The information processing apparatus may further include an information reader (for example, an information reader 46 shown in FIG. 2) that reads the storage medium identification information from each storage medium, and the management information generator may generate the management information using the storage medium identification information (for example, storage medium identification information 51 shown in FIG. 3) read by the information reader.

Figure 10:
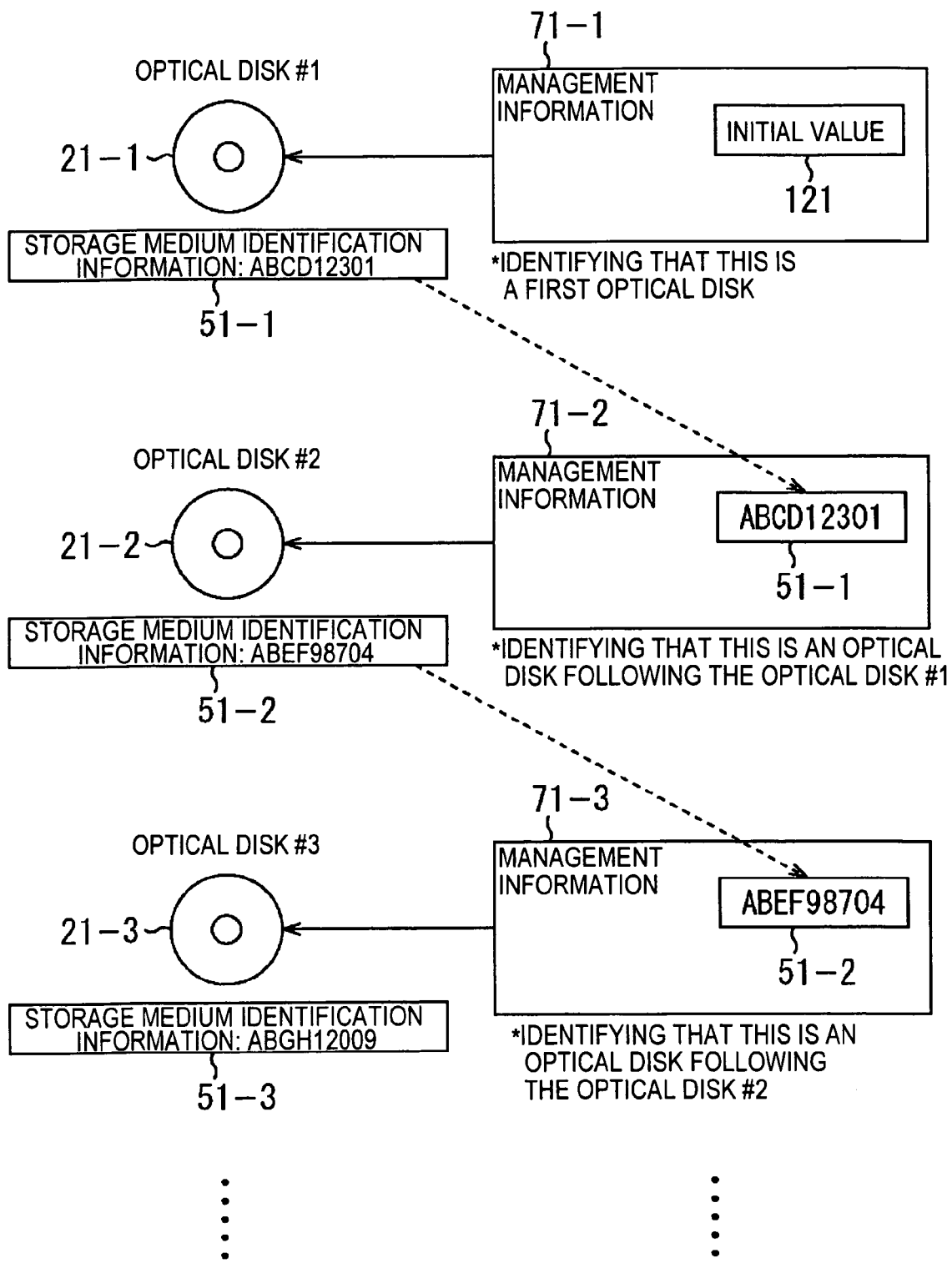
FIG. 10 is a diagram showing an example of management information.

The management information multiplexed on the data by the multiplexer may be management information (for example, management information 71-2 shown in FIG. 10) generated by the management information generator so as to include storage medium identification information (for example, storage medium identification information 51-1 shown in FIG. 10) identifying a storage medium (for example, an optical disk 21-1 shown in FIG. 10) immediately previous, in the order of storage media, to the storage medium (for example, the optical disk 21-2 shown in FIG. 10) on which the data is stored.

The management information multiplexed on the data by the multiplexer may be management information (for example, management information 71-2 shown in FIG. 10) generated by the management information generator so as to include storage medium identification information (for example, storage medium identification information 51-1 shown in FIG. 10) identifying a storage medium (for example, an optical disk 21-1 shown in FIG. 10) immediately previous, in the order of storage media, to the storage medium (for example, the optical disk 21-2 shown in FIG. 10) on which the data is stored.

The information processing apparatus may further include a history information generator (for example, a history information generator 43 shown in FIG. 2) that generates history information (for example, history information 111 shown in FIG. 6) indicating a history of the management information generated by the management information generator, and the multiplexer may multiplex the history information generated by the history information generator on the data instead of the management information.

The information processing apparatus may further include an order information manager (an order information manager 132 shown in FIG. 13) that manages the value of order information (for example, order information 131 shown in FIG. 13) associated with the order, and the management information generator may generate the management information using the order information managed by the order information manager.

Figure 15:
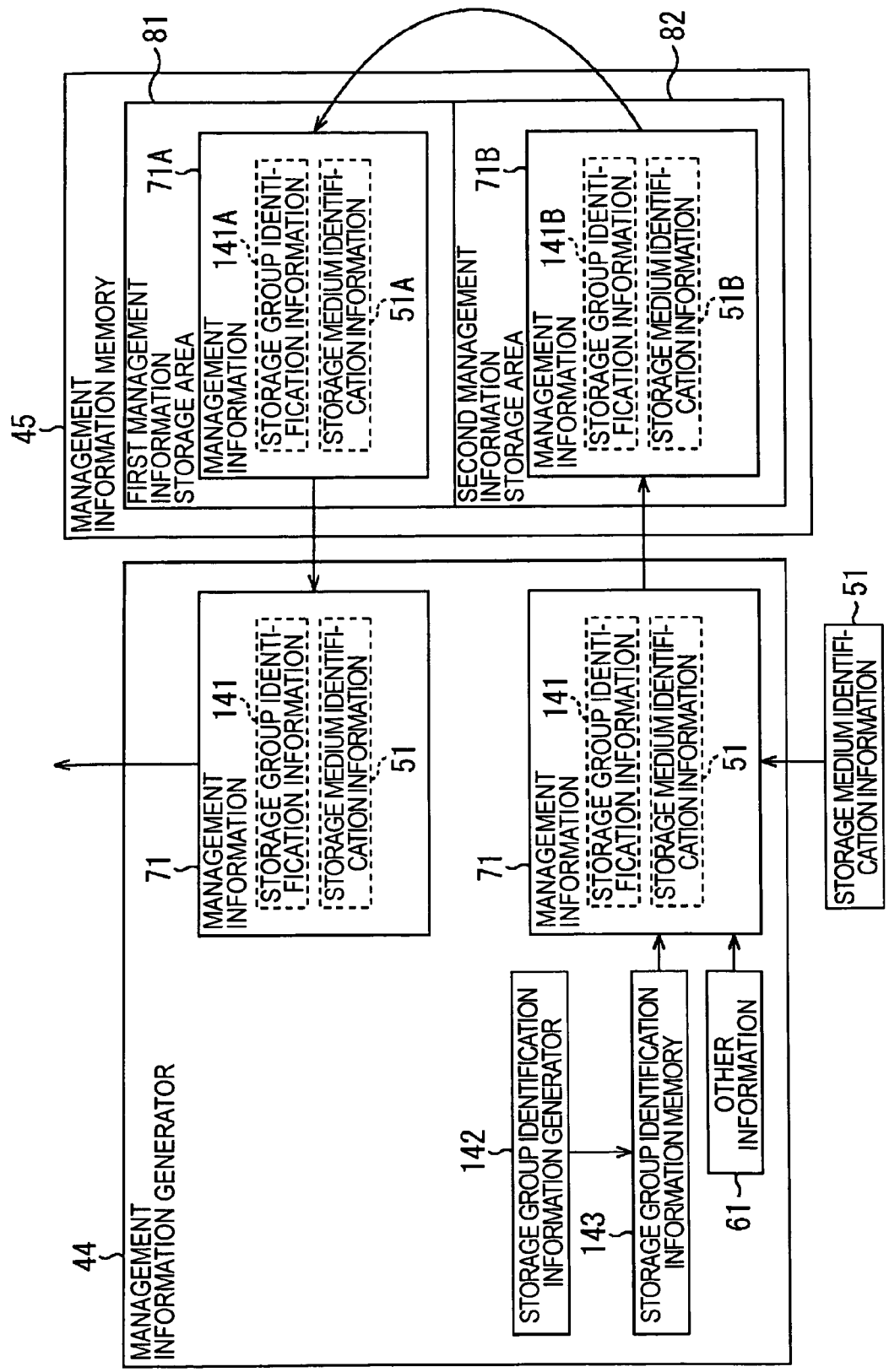
FIG. 15 is a diagram showing another example of a manner in which management information is generated.

The information processing apparatus may further include a storage group identification information generator (for example, a storage group identification information generator 142 shown in FIG. 15) that generates storage group identification information (for example, storage group identification information 141 shown in FIG. 15) identifying a storage group that is a set of data, and the management information generator may generate the management information using the storage group identification information generated by the storage group identification information generator.

The present invention also provides an information processing method (for example, a storage device 13 shown in FIG. 1) that stores data on a plurality of storage media. This method includes the steps of generating management information (for example, management information 71 shown in FIG. 4) based on which to manage an order in which data is stored on the storage media, using storage medium identification information identifying each storage medium (for example, step S25 shown in FIG. 8), multiplexing the management information generated in the management information generating step on the data (for example, step S44 shown in FIG. 9), and storing the data, including the management information multiplexed in the multiplexing step, on the storage media (for example, step S45 shown in FIG. 9).

The present invention also provides a program that causes a computer (for example, a storage device 13 shown in FIG. 1) to execute a process of storing data on a plurality of storage media. This program includes the steps of generating management information (for example, management information 71 shown in FIG. 4) based on which to manage an order in which data is stored on the storage media, using storage medium identification information identifying each storage medium (for example, in step S25 shown in FIG. 8), multiplexing the management information generated in the management information generating step on the data (for example, step S44 shown in FIG. 9), and storing the data, including the management information multiplexed in the multiplexing step, on the storage media (for example, step S45 shown in FIG. 9).

The present invention also provides an information processing apparatus (for example, a playback apparatus 201 shown in FIG. 25) that plays back data stored on a plurality of storage media. This information processing apparatus includes a reading unit (for example, a read controller 213 shown in FIG. 25) that reads the data from each of the plurality of storage media, an extractor (for example, a storage medium identification information extractor 222 shown in FIG. 25) that extracts storage medium identification information from each data read by the reading unit, the storage medium identification information identifying a storage medium on which each data is stored, a playback order determination unit (for example, a controller 221 shown in FIG. 25) that executes step S193 shown in FIG. 26) that determines the order in which to play back the plurality of data read by the reading unit, based on the storage medium identification information extracted by the extractor, and a playback controller (for example, a continuous playback controller 223 shown in FIG. 25) that plays back the plurality of data read by the reading unit in the order determined by the playback order determination unit.

The present invention also provides a method of processing information in an information processing apparatus (for example, a playback apparatus 201 shown in FIG. 25) that plays back data stored on a plurality of storage media. This information processing method includes the steps of reading the data from each of the plurality of storage media (for example, step S191 shown in FIG. 26), extracting storage medium identification information from each data read in the reading step, the storage medium identification information identifying a storage medium on which each data is stored (for example, step S192 shown in FIG. 26), determining the order in which to play back the plurality of data read in the reading step, based on the storage medium identification information extracted in the extraction step (for example, step S193 shown in FIG. 26), and playing back the plurality of data read in the reading step in the order determined by the playback order determination step (for example, step S195 shown in FIG. 26).

The present invention also provides a program that causes a computer (for example, a playback apparatus 201 shown in FIG. 25) to execute a process of playing back data stored on a plurality of storage media. This program includes the steps of reading the data from each of the plurality of storage media (for example, step S191 shown in FIG. 26), extracting storage medium identification information from each data read in the reading step, the storage medium identification information identifying a storage medium on which each data is stored (for example, step S192 shown in FIG. 26), determining the order in which to play back the plurality of data read in the reading step, based on the storage medium identification information extracted in the extraction step (for example, step S193 shown in FIG. 26), and playing back the plurality of data read in the reading step in the order determined by the playback order determination step (for example, step S195 shown in FIG. 26).

Now, embodiments of the present invention are described below with reference to the accompanying drawings.

FIG. 1 shows a network system according to an embodiment of the present invention.

The network system 1 includes an imager 11, a network 12, and a storage device 13. As shown in FIG. 1, the imager 11 is connected to the storage device 13 via the network 12. Clip data (including image data and voice/sound data) taken by the imager 11 is supplied to the storage device 13 via the network 12 and stored on a plurality of optical disks in the storage device 13. In the storage device 13, an optical disk for storing clip data is mounted on a drive. When the optical disk becomes full and there is no free storage space for further storing data, a user exchanges the optical disk with a new optical disk (blank medium). Thus, the clip data output from the imager 11 is stored on a plurality of optical disks, such as an optical disk 21-1, an optical disk 21-2, an optical disk 21-3, and so on.

Hereinafter, when a non-specific optical disk is described or when it is not necessary to distinguish optical disks from one another, an optical disk (or optical disks) will be generically referred to as an optical disk 21 (or as optical disks 21).

When it is necessary to distinguish a plurality of optical disks 21 from one another, they are referred to as the optical disk 21-1, the optical disk 21-2, the optical disk 21-3, and so on.

The term "clip" is used to describe a single process, from a start to an end, performed by a user to take an image. In general, an image signal of a clip includes plural frames of image signal. The term "clip" is also used to describe a time from a start to an end of a process of taking an image. Furthermore, the term "clip" is used to describe the length or the size of image data produced in a single process of taking an image. The term "clip" is also used to describe image data itself. In some cases, the term "clip" is used to describe the length or the size of various kinds of data (associated data) obtained in a single process of taking an image or used to describe a set of such data. In some cases, such data is called clip data. Specific examples of clips (clip data) are material data such as image data and audio data, various metadata associated with material data, low-resolution data corresponding to original material data, and play list data for controlling playback of material data. The details of these data will be described later.

FIG. 2 is a block diagram showing an example of a structure of the storage device 13 shown in FIG. 1.

As shown in FIG. 2, the storage device 13 includes an optical disk manager 31, a communication interface 32, a signal processor 33, a multiplexer 34, a storage controller 35, and a pickup 36.

The optical disk manager 31 is responsible for management of optical disks and includes a controller 41, a history information memory 42, a history information generator 43, a management information generator 44, a management information memory 45, an information reader 46, an input unit 47, and an output unit 48.

The controller 41 includes a CPU (Central Processing Unit), a ROM (Read Only Memory), and a RAM (Random Access Memory), and is responsible for general control of the storage device 13. The controller 41 also serves to supply information read via the information reader 46 to the management information generator 44. Although in FIG. 2, only some data flows such as the data from the information reader 46 to the controller 41 and the data from the controller 41 to the management information generator 44 are shown. However, the controller 41 is actually connected to various parts in the storage device 13 via a control bus or a data bus, various data are output and input from or to the controller 41 to or from various parts in the storage device 13 to control them.

The history information memory 42 includes a memory device such as a semiconductor memory and serves to store history information generated by the history information generator 43. The history information generator 43 generates history information associated with management information generated by the management information generator 44. The details of the history information generator 43 will be described in detail later.

The management information generator 44 generates management information for managing optical disks 21, based on information associated with the optical disks 21 supplied from the controller 41. The details of the management information generator 44 will be described later. The management information memory 45 stores the management information generated by the management information generator 44.

The information reader 46 read storage medium identification information identifying an optical disk 21 from the optical disk 21 via the pickup 36 and supplies the read storage medium identification information to the management information generator 44 via the controller 41.

The input unit 47 includes buttons, switches, an adjuster, a keyboard, a mouth, a touchpad, a touch pen, a touch panel, a microphone, and/or a pointer device. The input unit 47 is used by a user to input a command to the controller 41. The output unit 48 includes a speaker, a display such as a CRT (Cathode Ray Tube) or an LCD (Liquid Crystal Display), and a light emitting unit such as an LED (Light Emitting Diode) or a florescent lamp, and serves to output information supplied from the controller 41.

The communication interface 32 connected to the network 12 communicates with the imager 11 to acquire clip data output from the imager 11. The acquired clip data is supplied to the signal processor 33. The signal processor 33 performs signal processing such as a format conversion on the clip data received via the communication interface 32 and supplies the resultant data to the multiplexer 34.

The multiplexer 34 multiplexes the clip data supplied from the signal processor 33, the history information supplied from the history information generator 43, and the management information supplied from the management information generator 44, as require, and supplies the resultant multiplexed data to the storage controller 35. The storage controller 35 commands the pickup 36 to store the data supplied from the multiplexer 34 on the optical disk 21.

The pickup 36 illuminates the optical disk 21 mounted on a drive with a laser beam to read or write data from or on the optical disk 21.

FIG. 3 is a diagram showing an example of storage medium identification information identifying an optical disk 21.

Arbitrary information may be used as the storage medium identification information 51 as long as it correctly identifies a storage medium at least within the network system 1. As shown in FIG. 3, examples usable as the storage medium identification information 51 include BCA (Burst Cutting Area) information 52, a production serial number 53, an IP (Internal Protocol) address (IPv6) 54, a name 55, volume information (UDF (Universal Disk Format) 56, and a hash value 57 using the above parameters.

The BCA information 52 is information uniquely identifying each optical disk 21 and is described in the form of a bar code formed by a YAG laser in a bar code zone close to a hub of the optical disk 21. The process of cutting the bar code is performed independently of the stamping process, and thus it is possible to record unique data such as a serial ID on each disk. The BCA information 52 can be read by illuminating it with a laser beam emitted from the pickup 36.

The production serial number 53 is used to manage the production of optical disks 21. Use of the production serial number 53 allows each medium to be uniquely identified. The IP address (IPv6) 54 is an identification number used in the IP protocol. In the case of IPv6, 128 bits are used to express the IP address. Use of the IP address (IPv6) 54 allows each medium to be identified.

The name 55 is a name uniquely assigned to an optical disk 21. More specifically, a name is assigned to each medium by an apparatus in the network system 1 independently of other systems. Use of the name 55 makes it possible to identify each medium at least in the system. The volume information (UDF) 56 is a name assigned to a logical area (volume) when the storage area of the optical disk 56 is logically formatted (in accordance, for example, the UDF).

The hash value 57 is a fixed-length pseudorandom number generated using at least one of the BCA information 52, the production serial number 53, the IP address (IPv6) 54, the name 55, and the volume information (UDF) 56.

The information reader 46 shown in FIG. 2 reads the storage medium identification information 51 indicating such information described above from the optical disk 21 (via the pickup 36) and supplies the storage medium identification information 51 to the management information generator 44 via the controller 41.

Figure 4:
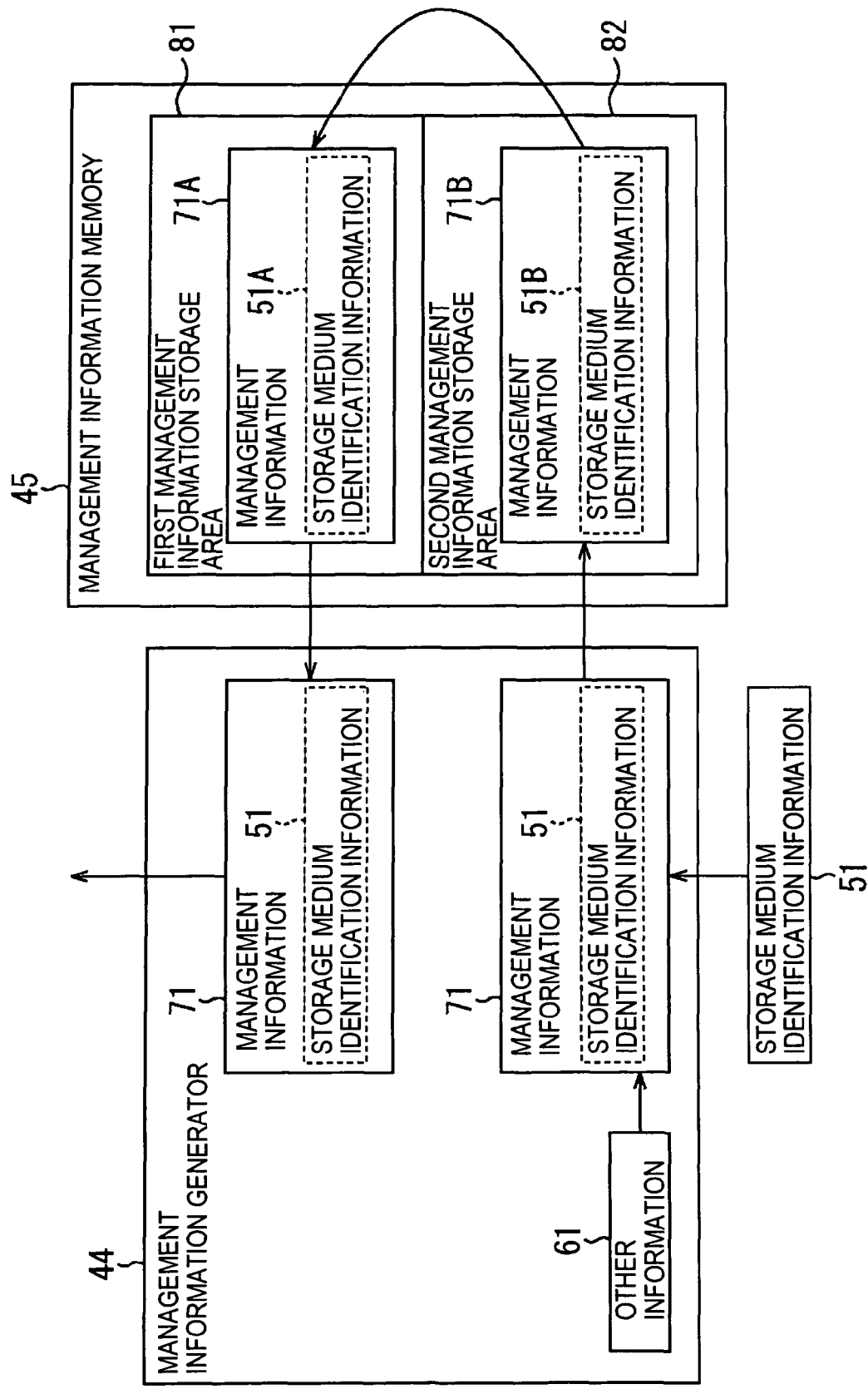
FIG. 4 is a diagram showing an example of a manner in which management information is generated.

FIG. 4 shows management information generated by the management information generator 44 and stored in the management information memory 45.

In FIG. 4, if the management information generator 44 receives storage medium identification information 51 from the controller 41, the management information generator 44 generates management information 71 based on the received storage medium identification information 51 and other information 61. The management information generator 44 supplies the generated management information 71 to a second management information storage area 82 of the management information memory 45. The management information memory 45 has two storage areas: a first management information storage area 81 for storing management information 71A; and the second management information storage area 82 for storing management information 71B. Note that the management information 71A is management information 71 generated immediately before the management information 71B.

The management information generator 44 reads the management information 71A from the first management information storage area 81 and supplies it to the multiplexer 34. If the management information 71A is read from the first management information storage area 81, the management information 71A is deleted from the first management information storage area 81, and the management information 71B stored in the second management information storage area 82 is moved to the first management information storage area 81 and stored therein. The second management information storage area 82 becomes free and ready to store next management information 71.

Figure 5:
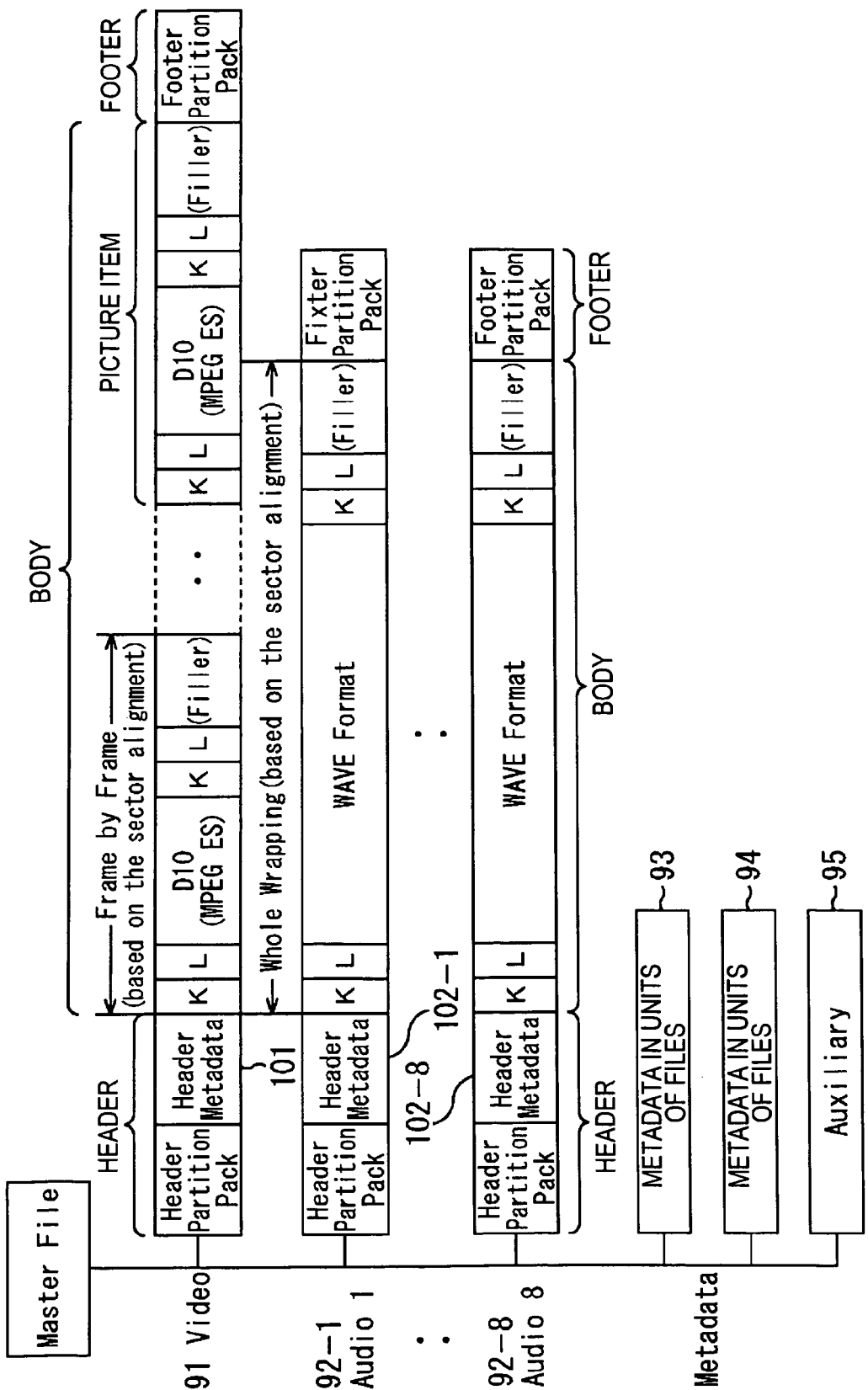
FIG. 5 is a diagram showing an example of a data structure of clip data.

FIG. 5 shows an example of a format of clip data supplied from the signal processor 33 to the multiplexer 34. In this example shown in FIG. 5, clip data is described in a non-multiplexed AV format that is one of formats for use in storing data.

In the non-multiplexed AV format, unlike a standard multiplexed AV format (not shown) which is one of formats for use in transmitting data and in which video data, audio data, metadata of each file, and user data (various data included in clip data) are multiplexed, these data are separately described in files.

That is, in the non-multiplexed AV format, a video file 91 is formed by placing video data, which would be placed in picture items in the standard multiplexed AV format, in a body and adding header metadata 101 and a footer in the same format as the standard multiplexed AV format to the body.

Since picture items each having a length equal to an integral multiple of the sector length of the optical disk 21 are placed in the body of the video file 91 in the non-multiplexed AV format, the total size of the body is also equal to an integral multiple of the sector length of the optical disk 21. That is, in the non-multiplexed AV format, sectors are automatically aligned in the body of the video file 91.

In the MXF, the index table is optional, and no index table is used in the video file 91 shown in FIG. 5 (and also in an audio file which will be described later).

In the non-multiplexed AV format, 8-channel audio data, which would be placed in a multiplexed form in a sound item in the standard multiplexed AV format, is placed separately for each channel such that each channel is converted from the AED3 format into a WAVE format and placed in a KLV form in a body of a file and furthermore, one of headers (header metadata) 102-1 to 102-8 in the same format as the standard multiplexed AV format and a footer are attached to each body thereby forming audio files 92-1 to 92-8.

That is, in the non-multiplexed AV format, for given 8-channel audio data, audio files 92-1 to 92-8 of respective channels are separately produced. In each audio file, one channel of audio data is converted into a WAVE format and resultant all data of that channel in the WAVE format is placed in the KLV form in a body. Furthermore, a header and a footer in the same format as the standard multiplexed AV format are attached to the body.

In the body of each audio file 92-1 to 92-8 in the non-multiplexed AV format, as described above, all audio data of one channel in the WAVE format is placed in the KLV form. However, the total size of the audio data of each channel is not necessarily equal to an integral multiple of the sector length of the optical disk 21. To achieve sector alignment in the non-multiplexed AV format, a filler in the KLV form necessary to achieve the sector alignment is placed following the audio data in the KLV structure in the body of each of the audio files 92-1 to 92-8.

In the non-multiplexed AV format, in addition to the video file 91 and the audio files 92-1 to 92-8 of respective 8 channels, metadata of respective files, which would be placed as header metadata in the standard multiplexed AV format, are all together placed in a file metadata file 93, and metadata of respective frames, which would be placed as metadata on a frame-by-frame basis in the standard multiplexed AV format, are all together placed in a frame metadata file 94. Furthermore, user data, which would be placed in an auxiliary item in the standard multiplexed AV format, are all together placed in an auxiliary file 95 in the non-multiplexed AV format.

Furthermore, in the non-multiplexed AV format, a master file is produced which includes pointers pointing to the video file 91, the audio files 92-1 to 92-8 of respective 8 channels, the file metadata file 93, the frame metadata file 94, and the auxiliary file 95.

The master file is described, for example, in the XML (Extensible Markup Language). More specifically, file names are described as pointers pointing to the above-described files, that is, the video file 91, the audio files 92-1 to 92-8 of respective 8 channels, the file metadata file 93, the frame metadata file 94, and the auxiliary file 95.

Thus, by referring to the mater file, it is possible to access the video file 91, the audio files 92-1 to 92-8 of respective 8 channels, the file metadata file 93, the frame metadata file 94, and the auxiliary file 95.

The auxiliary file 95 may be optional.

As required, the multiplexer 34 multiplexes the management information 71 supplied from the management information generator 44 or the history information supplied from the history information generator 43, for example, on the file metadata 93 of the clip data in the non-multiplexed AV format shown in FIG. 5 and the multiplexer 34 supplies the resultant multiplexed data to the storage controller 35. Alternatively, the management information 71 supplied from the management information generator 44 or the history information supplied from the history information generator 43 may be multiplexed on another file such as the frame metadata 94 the auxiliary file 95, the header metadata 101 of the video file 91, or one of the header metadata 102-1 to 102-8 of the respective audio files 92-1 to 92-8. The management information 71 or the history information may be divided into a plurality of pieces and they may be separately multiplexed. The management information 71 or the history information may be multiplexed into a file that varies depending on given data. At least one of the management information 71 and the history information may be described in an independent file similar to those described above.

By storing the clip data together with the management information 71 or the history information in the multiplexed form on the optical disk 21 as described above, each optical disk 21 has information associated with an immediately previous optical disk 21. Thus, the storage device 13 is capable of storing data on storage media in a form that allows the stored data to be easily managed, and thus the storage media can be used in a very convenient manner.

Figure 6:
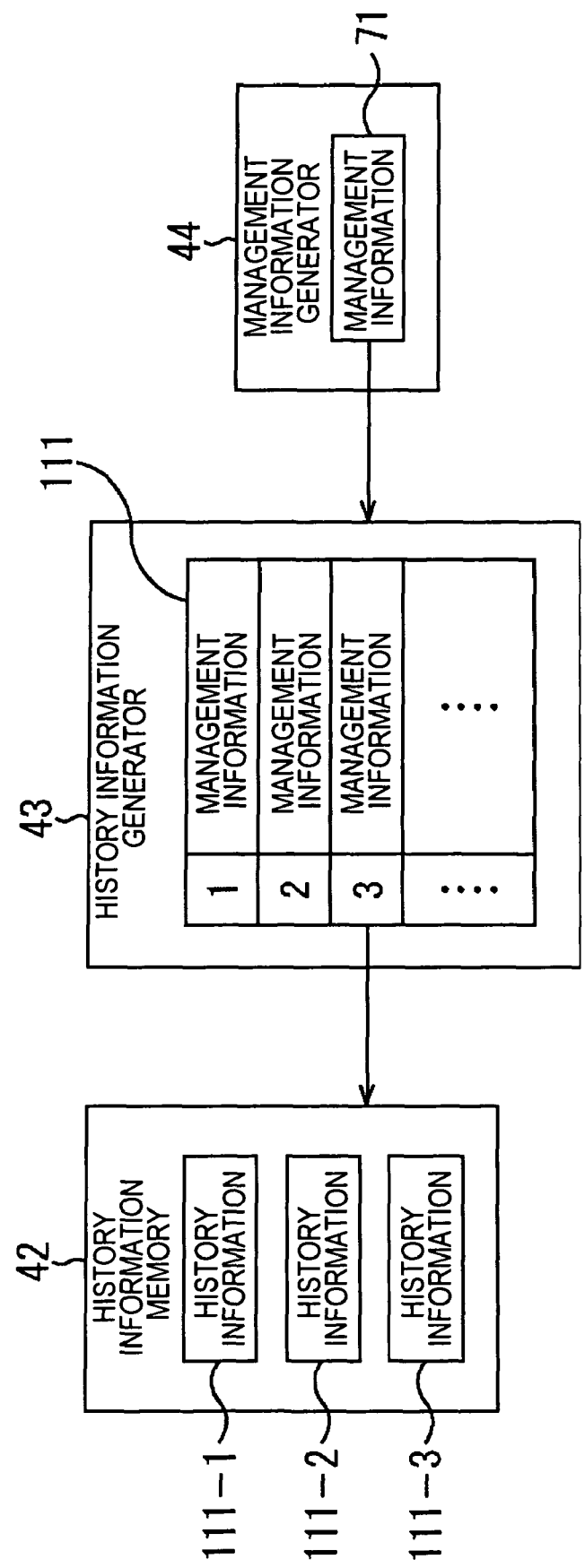
FIG. 6 is a diagram showing an example of a manner in which history information is generated.

FIG. 6 shows an example of a manner in which history information is generated. In FIG. 6, the history information generator 43 generates history information 111 in which all pieces of management information 71 supplied from management information generator 44 are described in the form of a table. That is, the history information 111 is a list (table) of management information 71 generated by management information generator 44 and supplied to the history information generator 43. As shown in FIG. 4, the management information 71 includes storage medium identification information 51, and thus the history information 111 (that is, the history of the management information 71) is also a list of storage media (optical disks 21) that have been used. Referring to the history information 111, it is possible to detect the order in which optical disks 21 were used (and thus, the order in which clip data were stored on the optical disks 21).

One piece of history information 111, which is a list of management information 71 (associated with each optical disk 21) corresponds to a series of clip data (belonging to the same group) obtained in a certain image-taking process. When an image is taken as a new group, a user closes the current history information 111 and generates new history information 111 of management information 71. The history information 111 is supplied to the history information memory 42 and managed in units of history information (history information 111-1 to 111-3).

A specific example of the process performed by the storage device 13 is described below. In the following explanation, a discussion will be focused on processes which are important in the present invention. When similar processes are used in different steps, a duplicated description will not be given.

Figure 7:
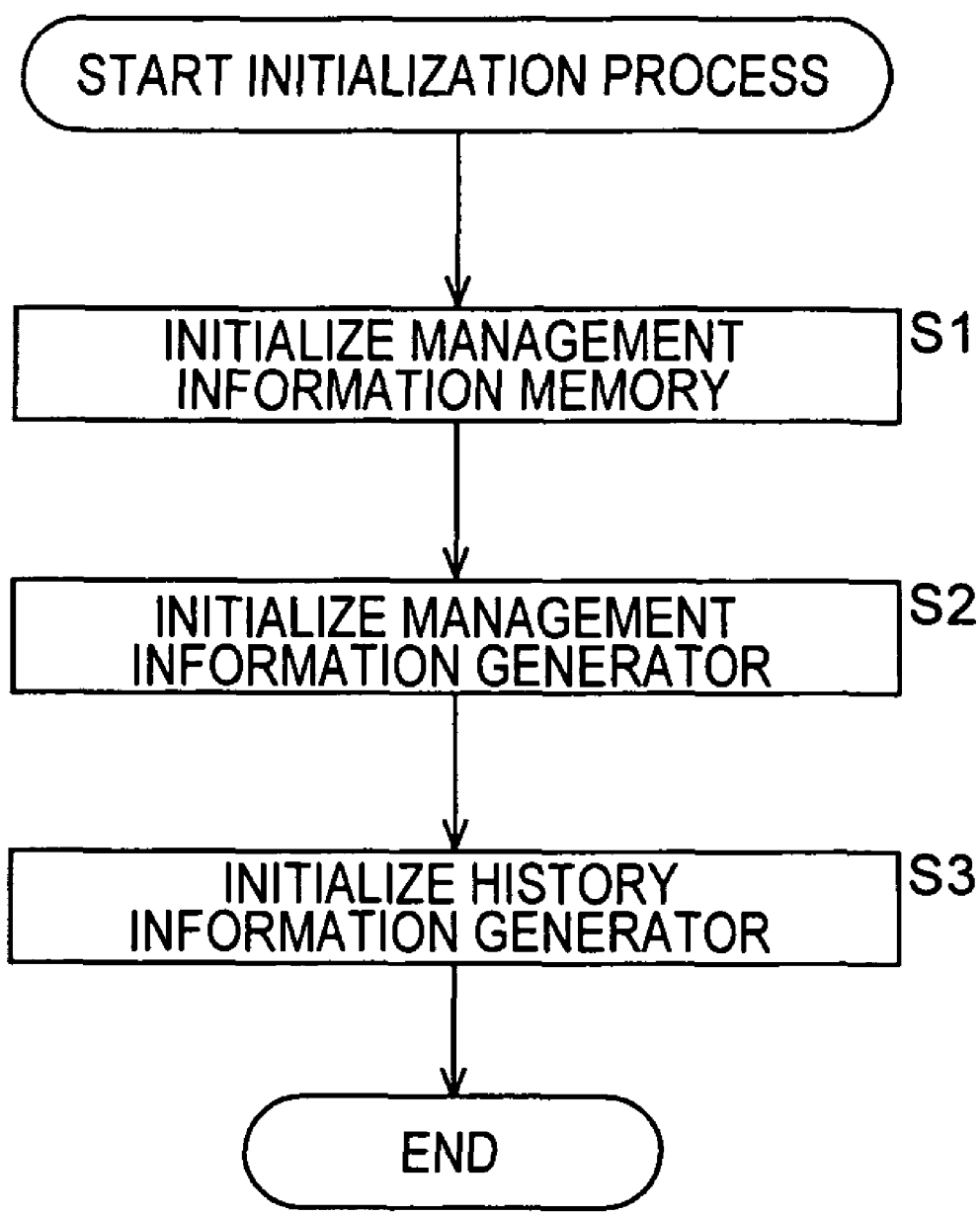
FIG. 7 is a flow chart showing an example of an initialization process.

First, referring to a flow chart shown in FIG. 7, a process performed by the controller 41 of the storage device 13 shown in FIG. 2 to initialize various parts of the optical disk manager 31 is described.

In a first step S1 in the initialization process, the controller 41 initializes the management information memory 45 such that all management information stored in the management information memory 45 is deleted. Then in step S2, the controller 41 initializes the management information generator 44 such that all data stored therein is deleted. Furthermore, in step S3, the controller 41 initializes the history information generator 43 such that all history information 111 stored therein is deleted. After the completion of step S3, the controller 41 ends the initialization process.

A process performed when a new optical disk 21 is mounted on a drive (not shown) of the storage device 13 is described below. When the new optical disk 21 is mounted on the drive, it is necessary to generate management information 71 to be stored on a next optical disk 21, based on the storage medium identification information 51 of the current optical disk 21. To this end, the optical disk manager 31 performs a management information preparation process when a new optical disk 21 is mounted. The process of preparing management information is described below with reference to a flow chart shown in FIG. 8.

In a first step S21 of the management information preparation process, the controller 41 examines the optical disk 21 mounted on the drive by controlling the pickup 36 and other parts. That is, the controller 41 controls the information reader 46, the pickup 36, and other parts to read the storage medium identification information 51 from the optical disk 21. If the controller 41 acquires the storage medium identification information 51, the controller 41 controls the management information generator 44, the management information memory 45, the history information generator 43, and the history information memory 42 to check whether management information 71 or history information 111 corresponding to the storage medium identification information 51 is stored to determine whether the optical disk 21 mounted on the drive is a new optical disk.

In step S22, based on the result of the checking, the controller 41 determines whether the mounted optical disk 21 is a new optical disk. If it is determined that the optical disk 21 is a new optical disk, the controller 41 advances the process to step S23. In step S23, the management information memory 45 updates (overwrites) the first management information 71A with the second management information 71B. In step S24, the controller 41 controls the information reader 46 and the pickup 36 to acquire the storage medium identification information 51 of the optical disk 21 mounted on the drive, and the controller 41 supplies the acquired storage medium identification information 51 to the management information generator 44. In step S25, the management information generator 44 generates management information 71 based on the supplied storage medium identification information 51 and supplies the generated management information 71 to the management information memory 45. In step S26, the management information memory 45 stores the management information 71 generated by the management information generator 44 as second management information 71B in the second management information storage area 82. The management information generator 44 also supplies the generated management information 71 to the history information generator 43. In step S27, the history information generator 43 generates history information by adding information to the list based on the received management information 71, and supplies the history information to the history information memory 42. In step S28, the history information memory 42 stores the received history information. After completion of step S28, the process is ended.

In a case in which it is determined in step S22 that the optical disk 21 mounted on the drive is not a new optical disk, the controller 41 advances the process to step S29 to perform an error handling process. After the error handling process, the controller 41 ends the management information preparation process.

As described above, when an optical disk 21 is mounted on the drive, management information to be stored on an optical disk next to that optical disk 21 is generated and stored, and thus the storage device 13 is capable of storing information associated with an immediately previous optical disk on the current optical disk 21. This makes it possible for a playback apparatus to recognize the order of optical disks 21. That is, the storage device 13 is capable of easily managing data stored on storage media and thus providing improved convenience in using storage media.

Figure 9:
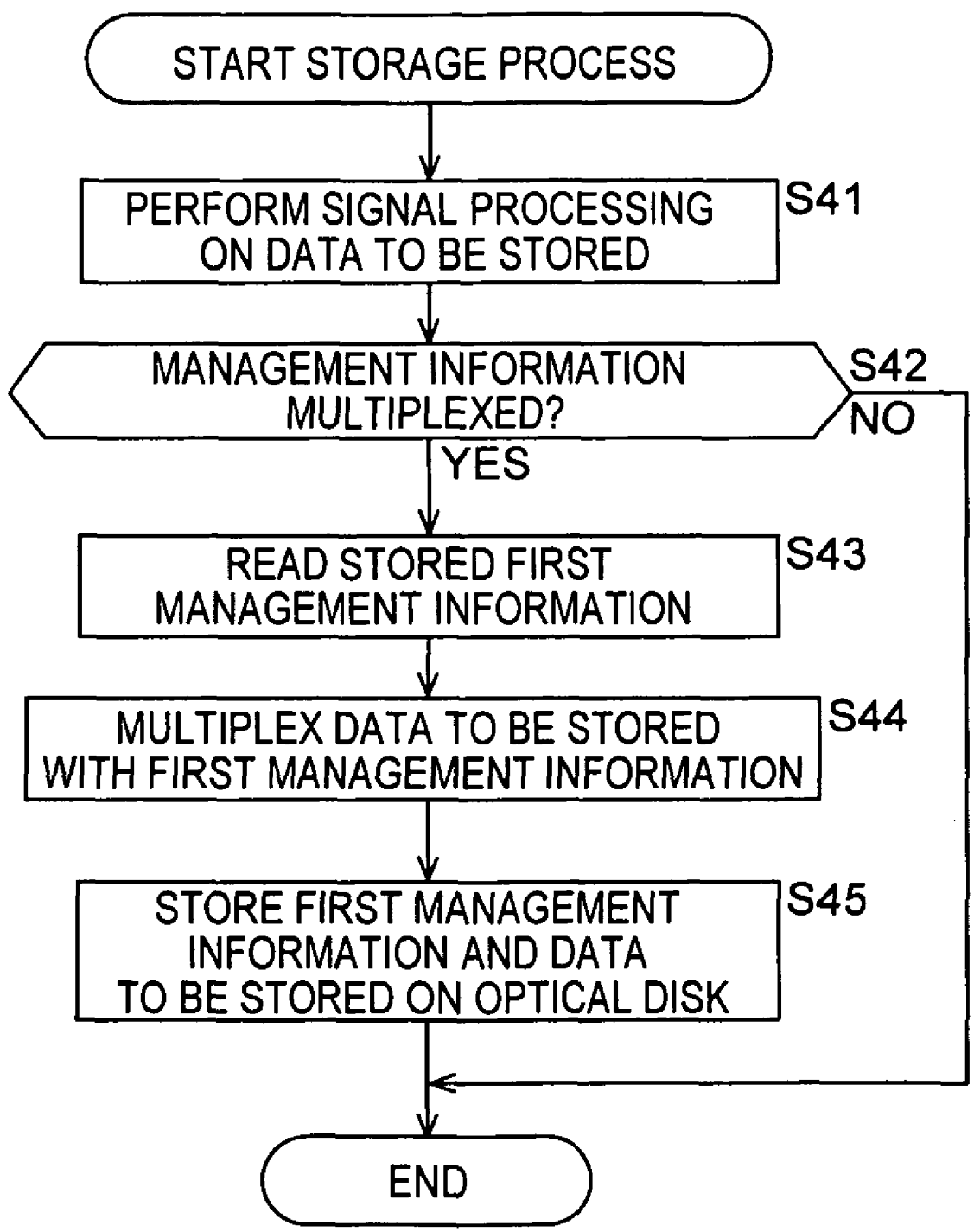
FIG. 9 is a flow chart showing an example of a storage process.

The process of recording the management information 71 is described below, with reference to a flow chart shown in FIG. 9.

First, in step S41, the signal processor 33 processes the clip data (hereinafter, data to be stored such as clip data will be generally referred to as "storage data") received via the communication interface 32 and supplies the resultant clip data to the multiplexer 34. In step S42, the controller 41 determines whether to attach management information 71 to the storage data (clip data) received from the signal processor 33 by means of multiplexing. If it is determined that the management information 71 should be multiplexed with the clip data, the process proceeds to step S43. In step S43, under the control of the controller 41, the management information generator 44 read first management information 71A stored in the first management information storage area 81 of the management information memory 45 and supplies the read first management information 71A to the multiplexer 34. In step S44, the multiplexer 34 multiplexes the storage data (the clip data) and the management information 71 and supplies the management information 71 multiplexed with clip data to the storage controller 35. In step S45, the storage controller 35 stores the supplied management information 71 and the storage data (two data in the multiplexed form) on the optical disk 21. After completion of step S45, the storage process is ended.

In a case in which it is determined step S42 that the management information 71 is not to be multiplexed with the storage data, the controller 41 ends the storage process.

As described above, because the management information 71 is multiplex with the storage data and the resultant multiplex data is stored on the optical disk 21, the controller 41 can store information associated with a previous optical disk on the current optical disk 21. That is, the storage device 13 is capable of easily managing data stored on storage media and thus providing improved convenience in using storage media.

As shown in FIG. 10, in a stage immediately after the initialization, a first optical disk 21-1 of a group (an optical disk #1) has a storage medium identification information 51-1 having a value "ABCD12301". There is no optical disk prior to this optical disk 21-1, and thus management information 71-1 having a predetermined initial value 121 is stored on the optical disk 21-1. Based on this management information 71-1, a playback apparatus can determine that this optical disk 21-1 is the first optical disk (on which first image data is stored).

A second optical disk 21-2 (optical disk #2) has storage medium identification information 51-2 having a value "ABEF98704". On this optical disk 21-2, management information 71-2 is stored. The management information 71-2 includes storage medium identification information 51-1 of the optical disk 21-1 immediately previous to the optical disk 21-2. Based on the management information 71-2, the playback apparatus can determine that the optical disk 21-1 is an optical disk immediately previous to this optical disk 21-2 (and thus can determine that image data immediately previous to image data stored on the optical disk 21-2 is stored on the optical disk 21-1). In other words, the playback apparatus can determine that the present optical disk 21-2 is an optical disk immediately next to the optical disk 21-1.

A third optical disk 21-3 (optical disk #3) has storage medium identification information 51-3 having a value "ABGH12009". On this optical disk 21-3, management information 71-3 is stored. The management information 71-3 includes storage medium identification information 51-2 of the optical disk 21-2 immediately previous to the optical disk 21-3. Based on the management information 71-3, the playback apparatus can determine that the optical disk 21-2 is an optical disk immediately previous to this optical disk 21-3 (and thus can determine that image data immediately previous to image data stored on the optical disk 21-3 is stored on the optical disk 21-2). In other words, the playback apparatus can determine that the present optical disk 21-3 is an optical disk immediately next to the optical disk 21-2.

As described above, when the storage device 13 stores successive clip data of a group across different storage media, notification information identifying an immediately previous storage medium is recorded on each storage medium, so that a playback apparatus can easily manage the data stored across different storage media. That is, the storage device 13 is capable of easily managing data stored on storage media and thus providing improved convenience in using storage media.

Figure 11:
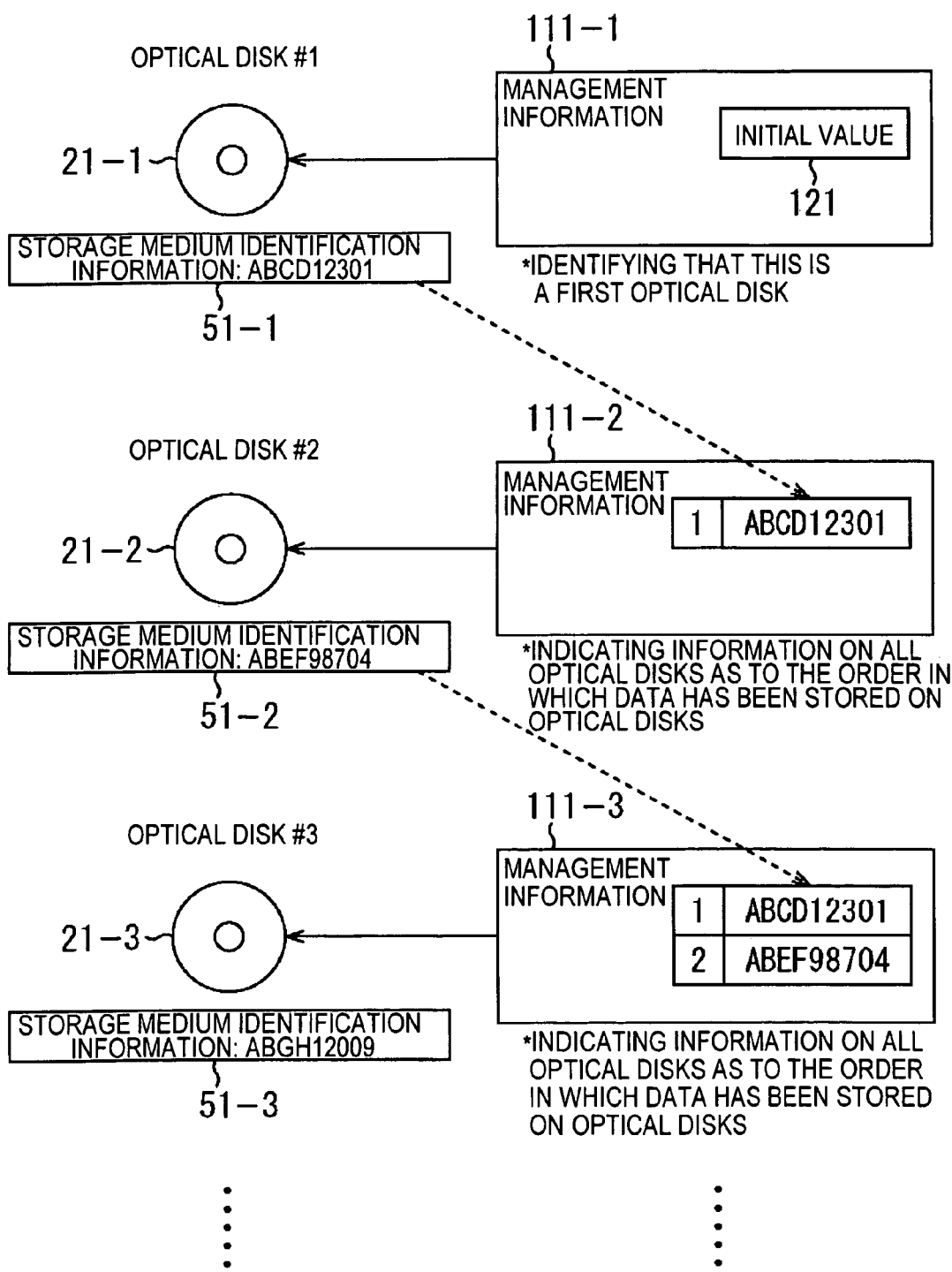
FIG. 11 is a diagram showing an example of history information.

In the embodiment described above with reference to FIG. 10, management information 71 is stored on each optical disk 21, but the information stored on each optical disk 21 is not limited to the management information 71. For example, history information 111 may be stored on each optical disk 21 as described in FIG. 11. In this case, the history information 111 stored on each optical disk 21 includes information indicating all previous optical disk 21 belonging to the same group. For example, the history information 111 stored on a third optical disk 21-3 includes information indicating a first optical disk 21-1 and a second optical disk 21-2. This makes it possible for a playback apparatus to easily identify the order in which data were stored on optical disks belonging to the same group, simply by referring to the history information 111. That is, the storage device 13 is capable of storing data on storage media in a form that allows the stored data to be easily managed, thereby providing improved convenience in using storage media.

However, the data size of the history information 111 varies from one optical disk to another, and the data size becomes greater than in the case in which management information 71 is stored in the manner described in FIG. 10. The difference in the data size from that needed in the case in which management information 71 is stored in the manner described in FIG. 10 increases with increasing order of the optical disk. That is, the data size of a third optical disk is greater than that of a second optical disk, the data size of a fourth optical disk is greater than that of the third optical disk, and so on.

Figure 12:
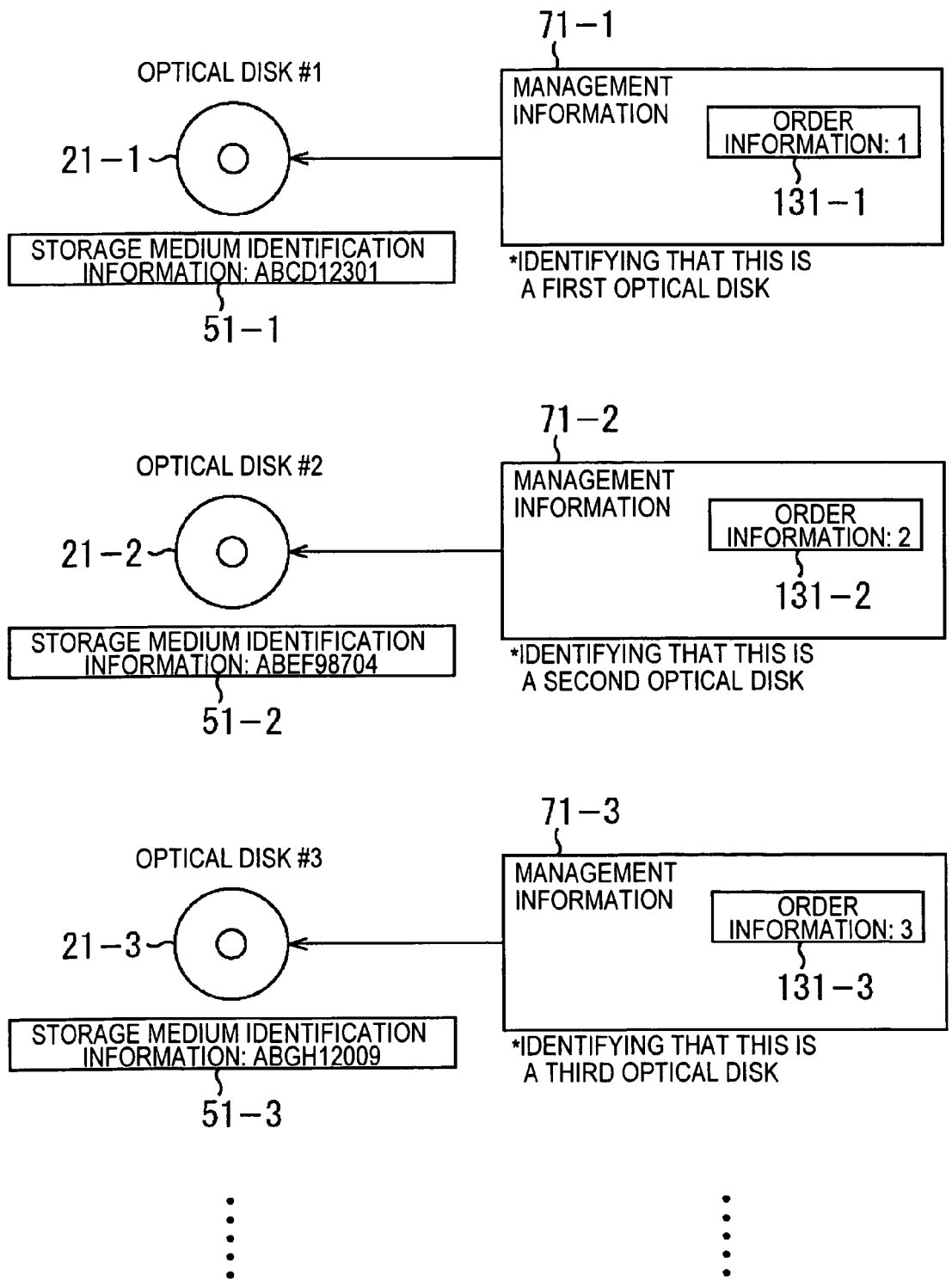
FIG. 12 is a diagram showing another example of management information.

Instead of storage medium identification information, order information 131 indicating the order of the optical disk 21 may be included in the management information 71, as shown in FIG. 12, and the management information 71 may be stored on the optical disk 21.

In this case, on a first optical disk 21-1, stored is management information 71-1 including order information 131-1 indicating that the present optical disk 21-1 is the first optical disk. When a playback apparatus reads data from this optical disk 21-1, the playback apparatus can identify that this optical disk 21-1 is the first optical disk (on which first clip data of successive clip data belonging to the same group is stored).

On a second optical disk 21-2, stored is management information 71-2 including order information 131-2 indicating that this optical disk 21-2 is the second optical disk. When the playback apparatus reads data from this optical disk 21-2, the playback apparatus can identify that this optical disk 21-2 is the second optical disk (on which second clip data of successive clip data belonging to the same group is stored).

Similarly, on a third optical disk 21-3, stored is management information 71-3 including order information 131-3 indicating that this optical disk 21-3 is the third optical disk. When the playback apparatus reads data from this optical disk 21-3, the playback apparatus can identify that this optical disk 21-3 is the third optical disk (on which third clip data of successive clip data belonging to the same group is stored).

Figure 13:
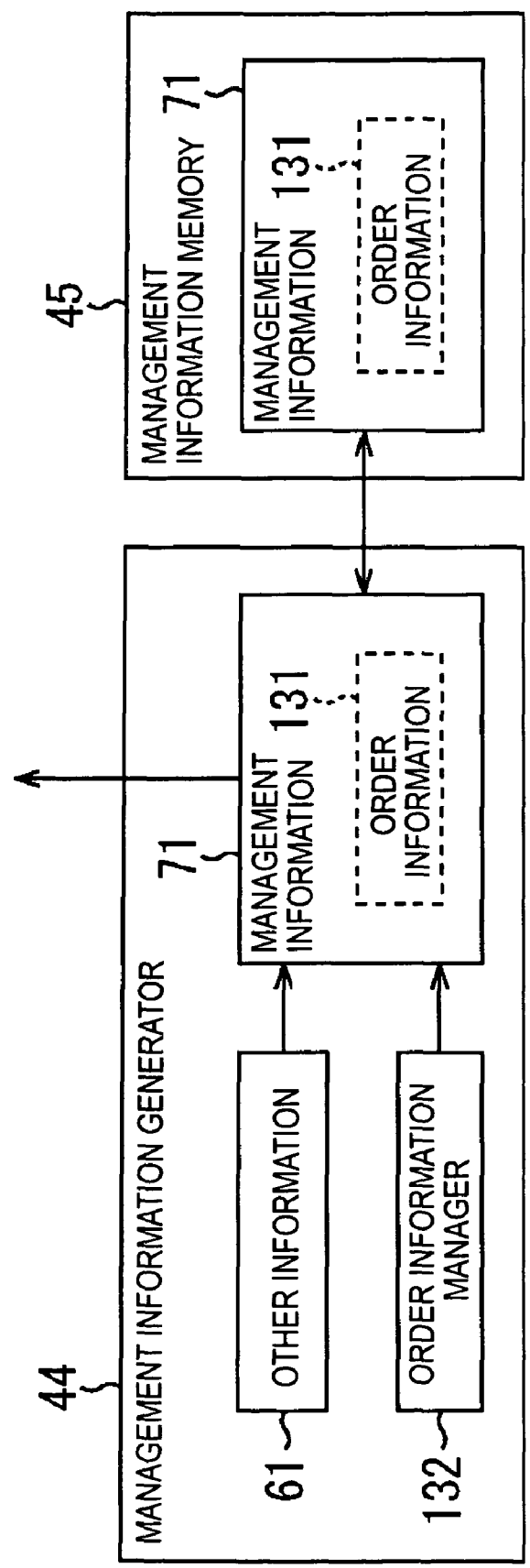
FIG. 13 is a diagram showing another example of a manner in which management information is generated.

FIG. 13 shows an example of the structure of the management information generator 44 and that of the management information memory 45 used in this mode.

As shown in FIG. 13, the management information generator 44 includes an order information manager 132 that manages the order information. The order information manager 132 stores order information (number information) in an internal register (not shown) and provides the order information when management information 71 is generated. Under the control of the controller 41, the management information generator 44 generates the management information 71 using the order information manager 132 and other information 61, as required. The order information (the number information) is initialized to "1" when a new group starts (when the initialization process is performed), and the order information is incremented by 1 each time new management information 71 is generated.

If the management information generator 44 generates the management information 71, the management information generator 44 supplies the generated the management information 71 to the management information memory 45, which stores the supplied management information 71. In this mode, as described earlier, the storage area of the management information memory 45 is not divided into sub storage areas, and the management information memory 45 stores only one piece of management information 71. That is, information associated with other optical disks is not stored on the present optical disk 21, and only one piece of (newest) management information 71 is stored in the management information memory 45. Under the control of the controller 41, the management information generator 44 reads the management information 71 from the management information memory 45 as required, and supplies it to the multiplexer 34 (FIG. 2).

A management information preparation process performed in this case is described below with reference to a flow chart shown in FIG. 14. This management information preparation process is similar to management information preparation process described above with reference to the flow chart shown in FIG. 8 except for some differences described below. A description of similar parts in the management information preparation process is omitted.

Figure 8:
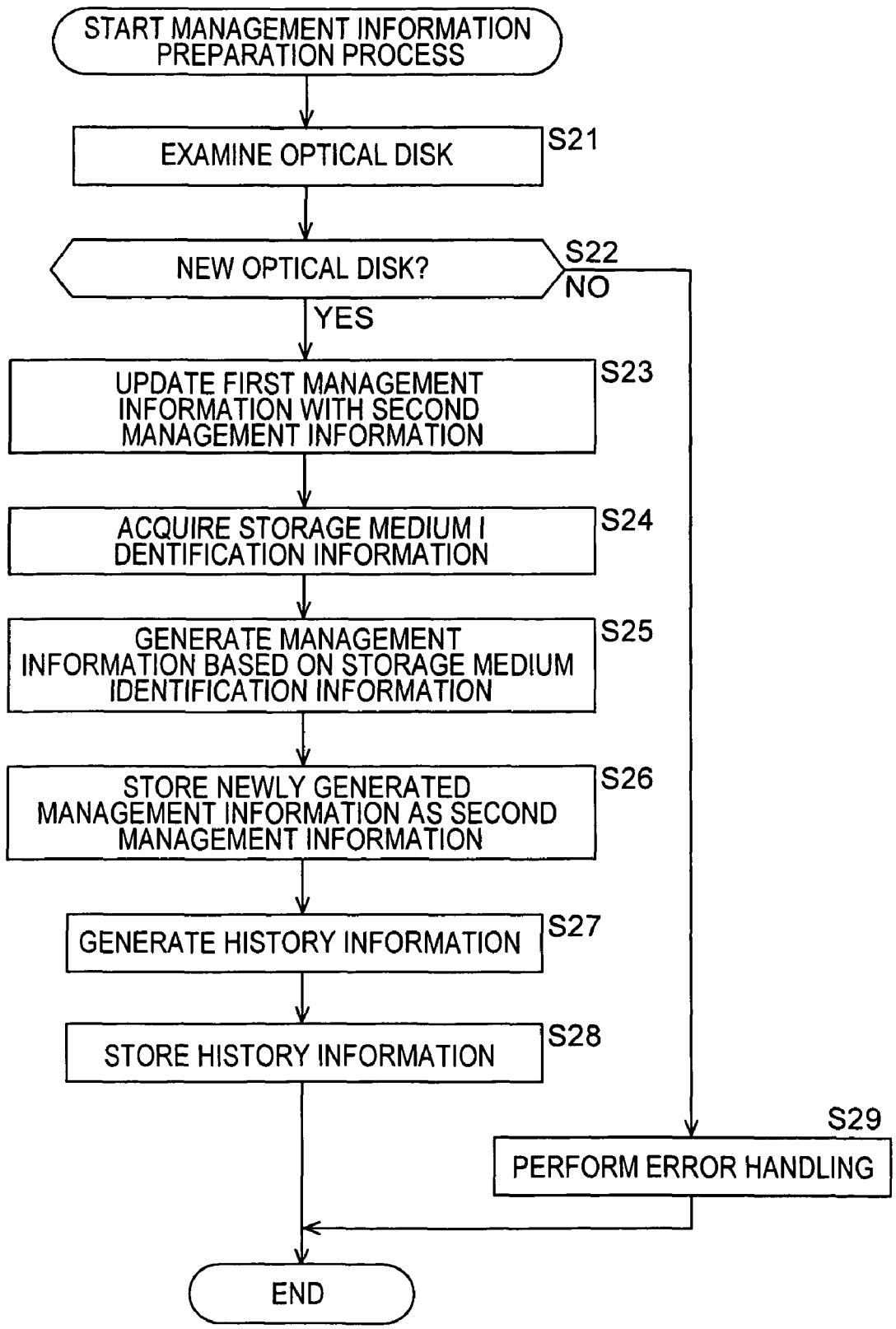
FIG. 8 is a flow chart showing an example of a management information preparation process.
Figure 14:
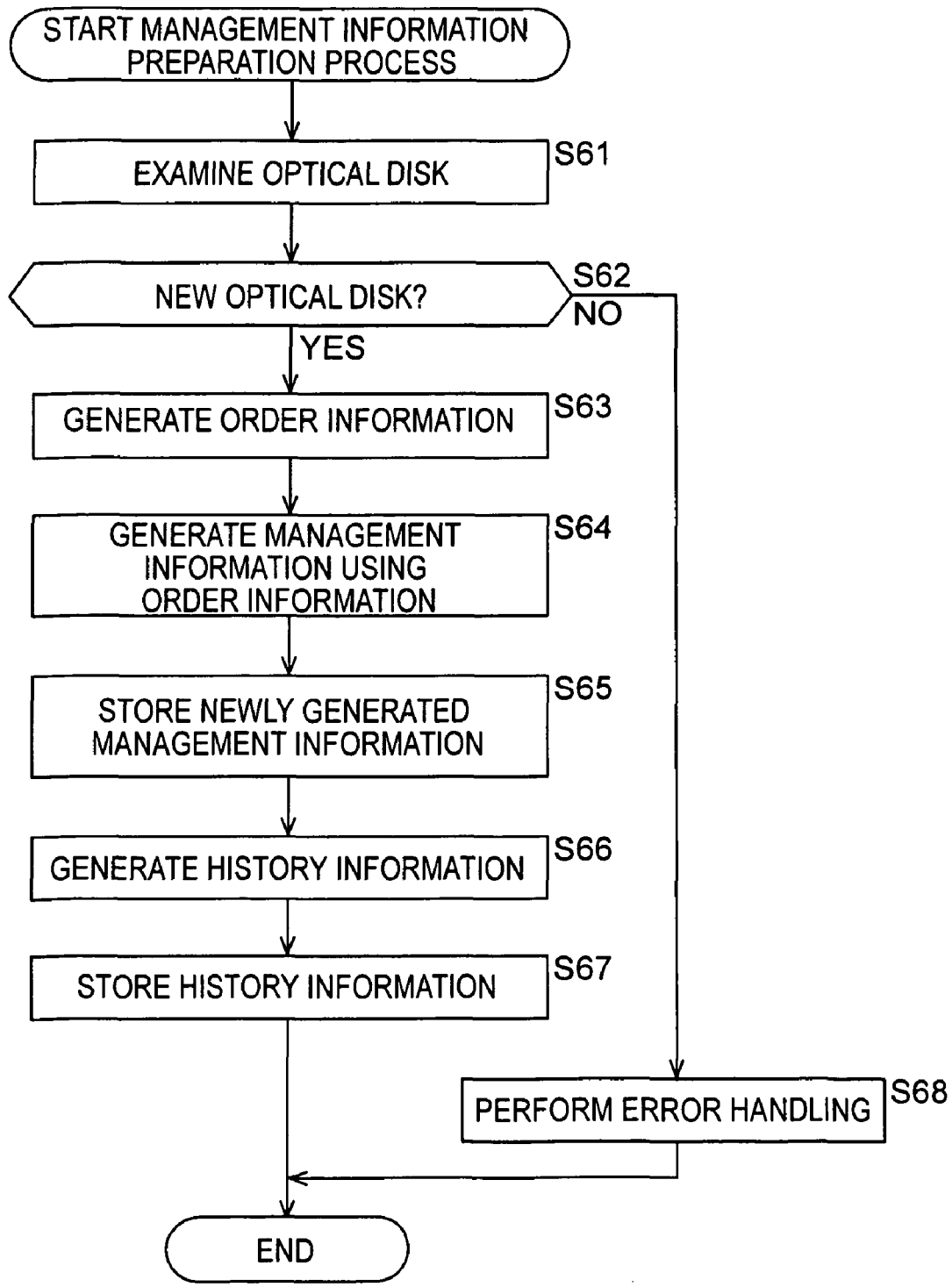
FIG. 14 is a flow chart showing another example of a management information preparation process.

Steps S61 and S62 shown in FIG. 14 are performed in a similar manner to step S21 and step S22 shown in FIG. 8, and steps S66 to S68 in FIG. 14 are performed in a similar manner to steps S27 to S29 in FIG. 8.

In step S62 in FIG. 14, if it is determined that an optical disk 21 mounted on the drive is a new optical disk, then, in step S63, the order information manager 132 of the management information generator 44 generates new order information 131 by incrementing the current order information 131 stored in the order information manager 132 by +1. In step S64, the management information generator 44 generates management information 71 using the order information 131 and supplies the generated management information 71 to the management information memory 45. In step S65, the management information memory 45 overwrites the current management information with the newly generated management information 71 and stores it. Thereafter, the process proceeds to step S66.

As described above, when the management information 71 is generated using the order information 131, the management information generator 44 can generate the management information 71 without having to acquire the storage medium identification information 51. The management information memory 45 needs to store only one piece of (newest) management information 71, and thus the management information memory 45 can be constructed in a simple form.

Another example of a data structure of management information 71 is described below. When there are a plurality of groups, the storage device 13 may generate management information such that the management information includes storage group identification information identifying a group to which a series of clip data belongs. This makes it possible to easily identify the relationship among optical disks 21 when there are plurality of groups.

To this end, as shown in FIG. 15, the management information generator 44 includes a storage group identification information generator 142 that generates storage group identification information 141 to be incorporated in the management information 71 and a storage group identification information memory 143 that stores the generated storage group identification information 141.

When the initialization process is performed, the storage group identification information generator 142 of the management information generator 44 generates storage group identification information 141 identifying a storage group and supplies the generated storage group identification information 141 to the storage group identification information memory 143, which stores the received storage group identification information 141.

The management information generator 44 generates management information 71 using the storage medium identification information 51 supplied from the controller 41, other information 61, and the storage group identification information 141 stored in the storage group identification information memory 143, The generated the management information 71 is stored in the management information memory 45. The management information memory 45 stores two pieces of management information (management information 71A and management information 71B), as with the management information memory 45 shown in FIG. 4.

Figure 16:
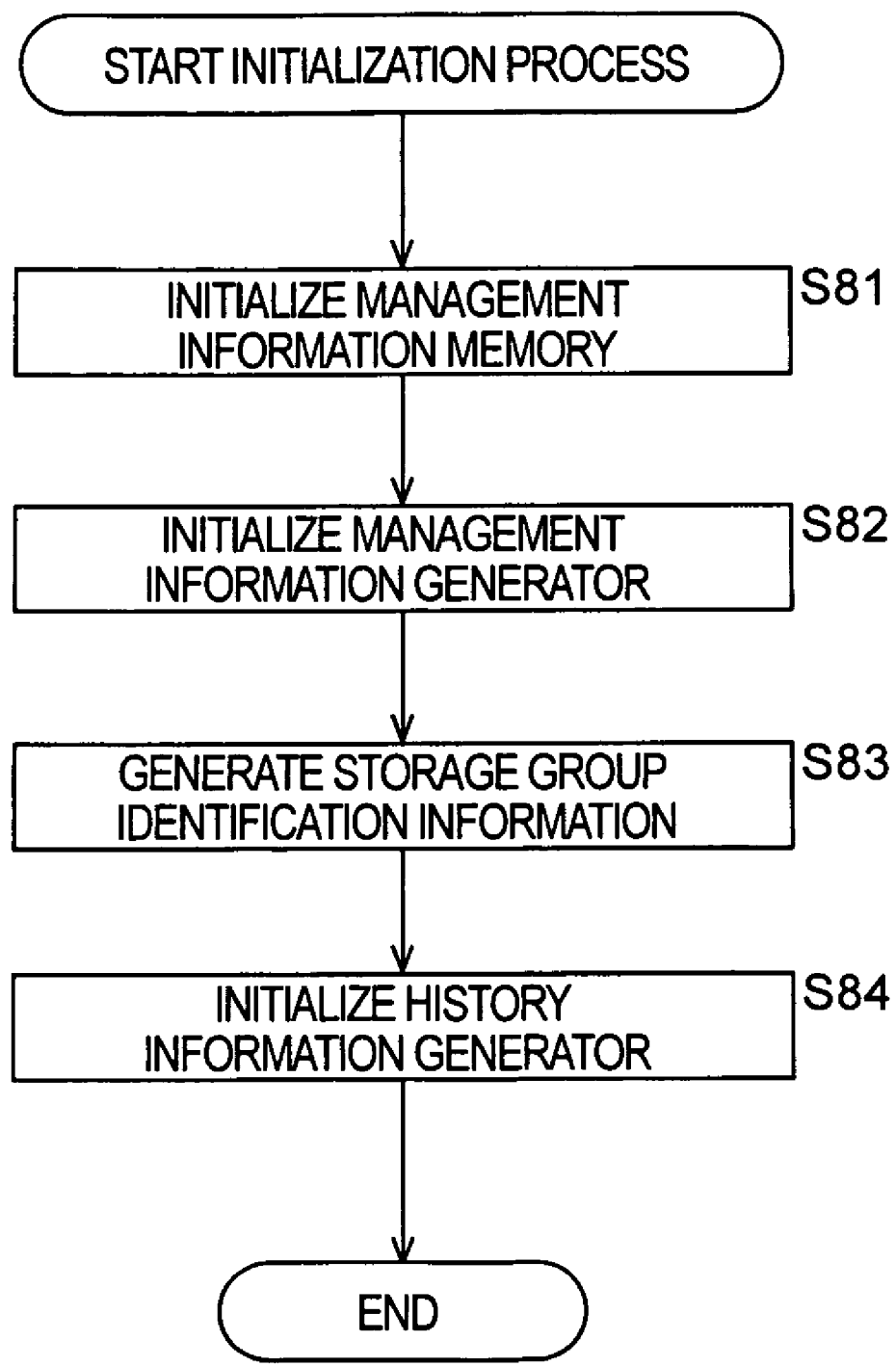
FIG. 16 is a flow chart showing another example of an initialization process.

The initialization process performed in the present embodiment is described below with reference to a flow chart shown in FIG. 16. The initialization process is basically similar to that described above with reference to the flow chart shown in FIG. 7.

In a first step S81 of the initialization process, the controller 41 initializes the management information memory 45 such that all management information stored in the management information memory 45 is deleted. In the next step S82, the controller 41 initializes the management information generator 44 such that all data stored therein is deleted.

Next, unlike the initialization process shown in FIG. 7, in step S83, the controller 41 commands the storage group identification information generator 142 of the management information generator 44 to generate storage group identification information 141. Under the control of the controller 41, the storage group identification information generator 142 generates the storage group identification information 141 and supplies it to the storage group identification information memory 143, which stores the received storage group identification information 141.

In step S84, the controller 41 initializes the history information generator 43 (FIG. 2) such that the history information 111 stored therein is deleted. After the completion of step S84, the controller 41 ends the initialization process.

Figure 17:
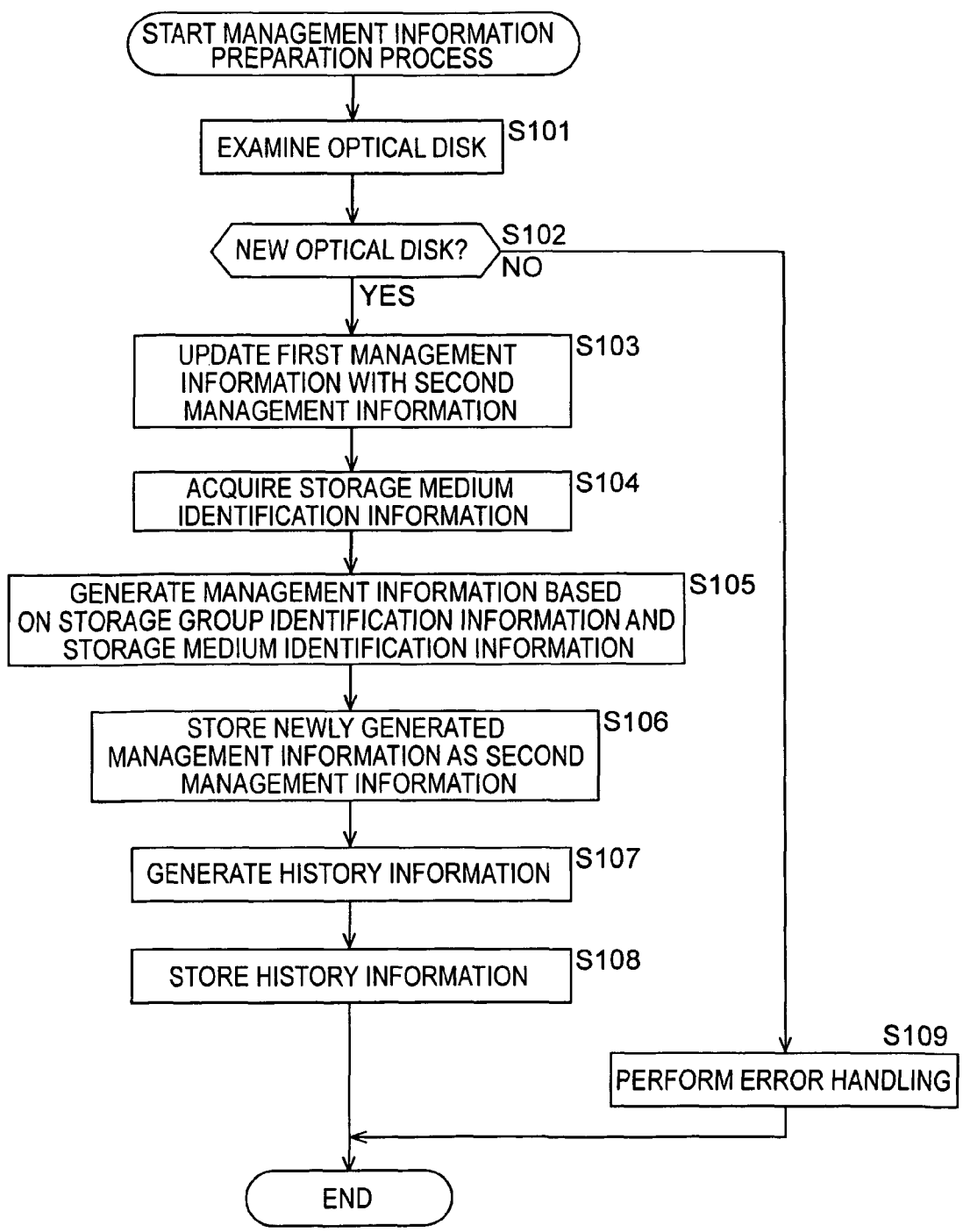
FIG. 17 is a flow chart showing another example of a management information preparation process.

Next, referring to a flow chart shown in FIG. 17, a management information preparation process performed in the present embodiment is described below.

In a first step S101 of the management information preparation process, the controller 41 examines an optical disk 21 mounted on the drive. This step is performed in a similar manner to step S21 shown in FIG. 8. In step S102, the controller 41 determines whether the mounted optical disk 21 is a new optical disk, based on the result of the examination. This step is performed in a similar manner to step S22 shown in FIG. 8. If it is determined that the optical disk 21 is a new optical disk, the controller 41 advances the process to step S103.

In step S103, the management information memory 45 updates (overwrites) the first management information 71A with the second management information 71B. This step is performed in a similar manner to step S23 shown in FIG. 8. In step S104, the controller 41 controls the information reader 46 and the pickup 36 to acquire the storage medium identification information 51 of the optical disk 21 mounted on the drive, and the controller 41 supplies the acquired storage medium identification information 51 to the management information generator 44. This step is performed in a similar manner to step S24 shown in FIG. 8.

In step S105, the management information generator 44 generates management information 71, based on the storage medium identification information 51 supplied from the controller 41 and the storage group identification information 141 stored in the storage group identification information memory 143, and supplies the generated management information 71 to the management information memory 45.

In step S106, the management information memory 45 stores the management information 71 generated by the management information generator 44 as second management information 71B in the second management information storage area 82. This step is performed in a similar manner to step S26 shown in FIG. 8. The management information generator 44 also supplies the generated management information 71 to the history information generator 43. In step S107, the history information generator 43 generates history information by adding information to the list based on the received management information 71, and supplies the history information to the history information memory 42. This step is performed in a similar manner to step S27 shown in FIG. 8. In step S108, the history information memory 42 stores the received history information. After completion of step S108, the process is ended. This step is performed in a similar manner to step S28 shown in FIG. 8.

In a case in which it is determined in step S102 that the optical disk 21 mounted on the drive is not a new optical disk, the controller 41 advances the process to step S109 to perform an error handling process. After the error handling process, the controller 41 ends the management information preparation process. This step is performed in a similar manner to step S29 shown in FIG. 8.

As a result of the process described above, as shown in FIG. 18, each of the management information 71-1 to 71-3 includes storage group identification information 141 having a value of "A01" together with storage medium identification information 51 (storage medium identification information 51-1 or 51-2 or the predetermined initial value 121). The storage group identification information 141 allows the respective optical disks 21-1 to 21-3 to be identified as belonging to the storage group 151 identified by the value "A01" (that is, it becomes possible to identify that clip data belonging to the storage group 151 is stored on the optical disks 21-1 to 21-3). Thus, a playback apparatus can easily identify that the optical disks 21-1 to 21-3 belong to a group different from a group identified by "B02" to which optical disks 21-11 to 21-13 belong.

As described above, the storage device 13 describes the storage group identification information 141 together with the storage medium identification information in the management information 71 to identify the storage group to which the optical disk 21 belong and the order of the optical disk 21 defined in the storage group.

Figure 18:
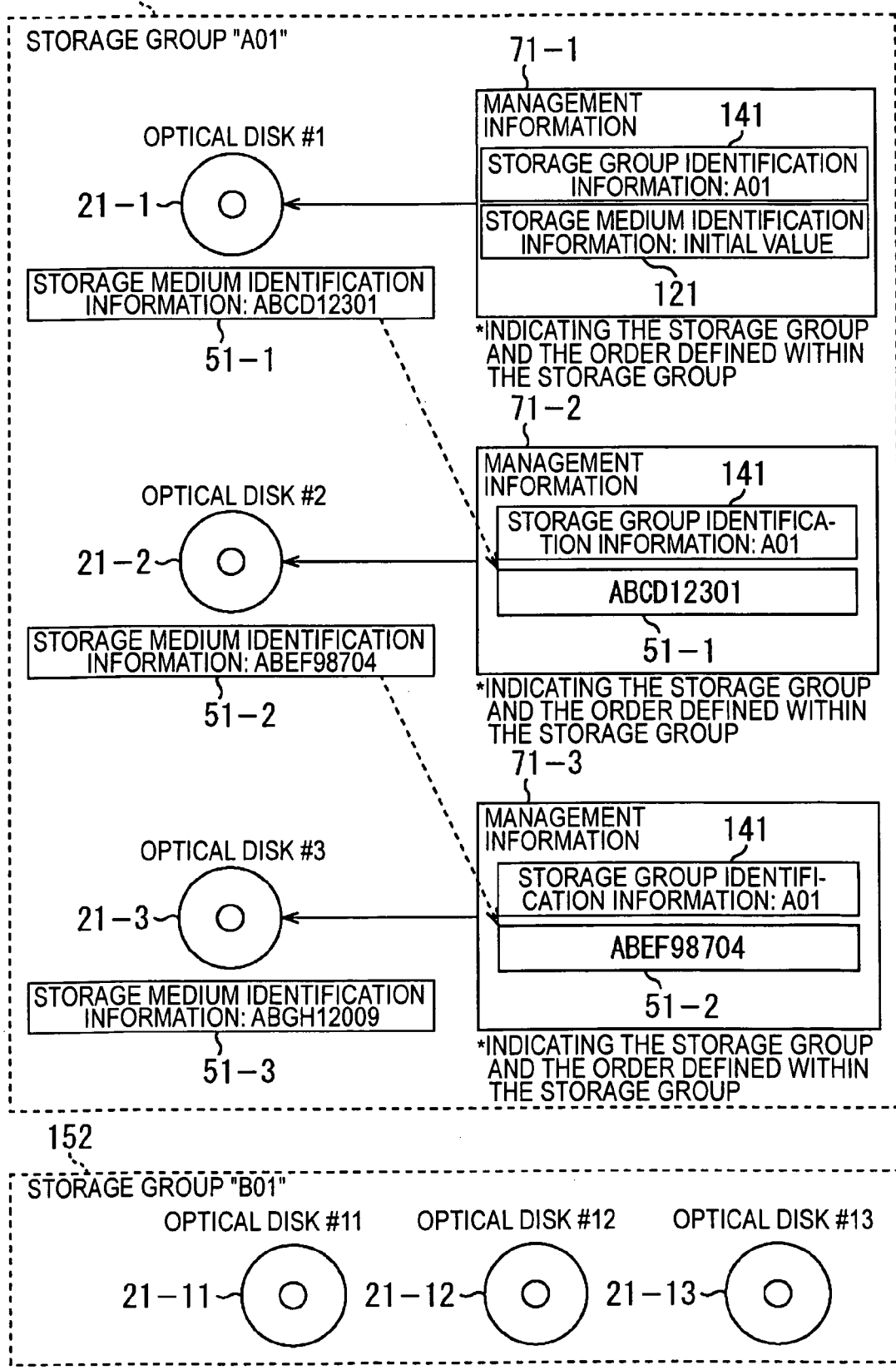
FIG. 18 is a diagram showing another example of management information.

The value of the storage group identification information 141 shown in FIG. 18 is an example, and an arbitrary value may be used as long as it can uniquely identify the storage group. The storage medium identification information 51 may also have an arbitrary value as long as the value identifies the optical disk in the above-described manner. This also applies to notification information included in the management information 71 described elsewhere in the present invention.

As described above, when an optical disk 21 is mounted on the drive, management information 71 to be stored on an optical disk next to that optical disk 21 is generated and stored, and thus the storage device 13 is capable of storing information associated with an immediately previous optical disk on the current optical disk 21. This makes it possible for a playback apparatus to recognize the order of optical disks 21. That is, the storage device 13 is capable of easily managing data stored on storage media and thus providing improved convenience in using storage media. Since the management information 71 includes not only the storage medium identification information 51 but also the storage group identification information 141, the storage device 13 is capable of storing data on optical disks such that not only the order of optical disks is identified but the group to which each optical disk belongs is also identified. This makes it possible to deal with storage media in a still more convenient manner.

Instead of storing the management information 71 in the form described above, the management information 71 may include notification information indicating a storage medium to be used next to a current storage medium. However, in this case it is required to predetermine the order in which to use storage media for storing data, and it is required that the storage device 13 is notified in advance of the notification information identifying these storage media to be used.

Figure 19:
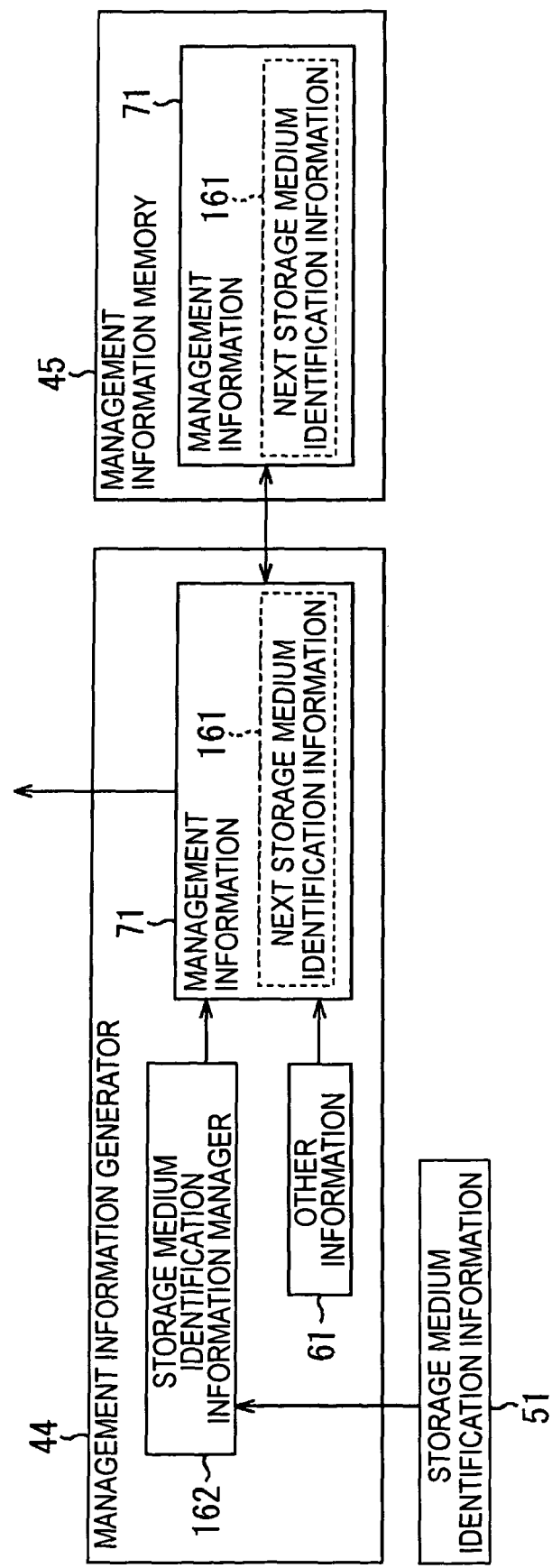
FIG. 19 is a diagram showing another example of a manner in which management information is generated.

FIG. 19 shows an example of the structure of the management information generator 44 and that of the management information memory 45 used in this mode and also shows an example of a manner in which the management information 71 is generated.

In FIG. 19, the management information generator 44 includes storage medium identification information manager 162 that acquires, in advance, storage medium identification information of all optical disks 21 to be used and manages the acquired storage medium identification information. The storage medium identification information of optical disks 21 to be used is supplied in advance to the storage medium identification information manager 162. For example, before optical disks 21 are actually used, a user mounts the optical disks 21 to be used one by one on the drive in the same order in which the optical disks 21 will be used. The storage device 13 acquires the storage medium identification information 51 from the respective optical disks 21 in the order the optical disks 21 are mounted and registers the acquired storage medium identification information 51 in the storage medium identification information manager 162. The storage medium identification information manager 162 manages the storage medium identification information 51 of the respective optical disks 21 in the registered order and supplies the storage medium identification information 161 of an optical disk to be used next when management information 71 is generated. Note that the manner of registering the storage medium identification information 51 is not limited to that described above, but the storage medium identification information 51 may be registered in other ways.

After the registration is completed, if an optical disk 21 to be used to store clip data is mounted on the drive, the controller 41 reads storage medium identification information 51 from the mounted optical disk 21 and supplies the read storage medium identification information 51 to the storage medium identification information manager 162 of the management information generator 44. If the storage medium identification information manager 162 receives the storage medium identification information 51, the storage medium identification information manager 162 examines the storage medium identification information 51 stored therein to detect the storage medium identification information 51 located next to the storage medium identification information 51 of the received storage medium identification information 51, and the storage medium identification information manager 162 supplies the detected storage medium identification information as next-storage medium identification information 161 to the management information generator 44.

The management information generator 44 generates management information 71 using the received next-storage medium identification information 161 and other information 61 and supplies the generated the management information 71 to the management information memory 45, which stores the supplied management information 71. The management information generator 44 reads the management information 71 from the management information memory 45 when it is needed, and the management information generator 44 supplies the read management information 71 to the multiplexer 34. Thus, the management information memory 45 needs to store only one piece of management information 71.

A specific example of the process is described below.

Figure 20:
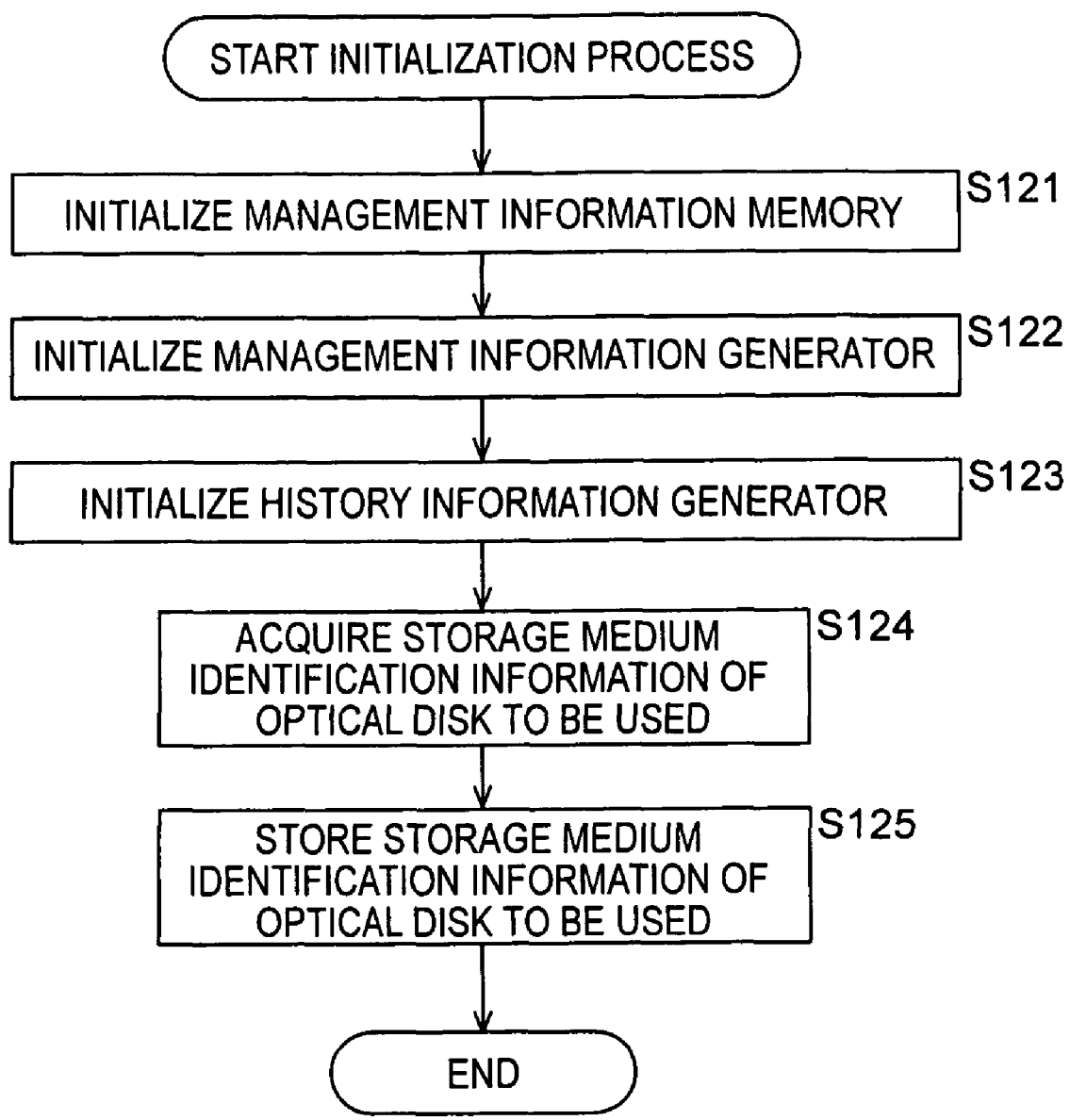
FIG. 20 is a flow chart showing another example of an initialization process.

First, the initialization process is described with reference to a flow chart shown in FIG. 20. The initialization process is basically similar to that described above with reference to the flow chart shown in FIG. 7.

In a first step S121 of the initialization process, the controller 41 initializes the management information memory 45 such that all management information stored in the management information memory 45 is deleted. In the next step S122, the controller 41 initializes the management information generator 44 such that all data stored therein is deleted. In step S123, the controller 41 initializes the history information generator 43 such that all history information 111 stored therein is deleted.

Next, unlike the initialization process shown in FIG. 7, in step S124, the controller 41 acquires storage medium identification information 51 of the optical disk 21 to be used to store storage data, and supplies the acquired storage medium identification information 51 to the storage medium identification information manager 162. In step S125, the storage medium identification information manager 162 stores the received storage medium identification information 51 of the optical disk 21 to be used to store storage data. After completion of step S125, the initialization process is ended.

Figure 21:
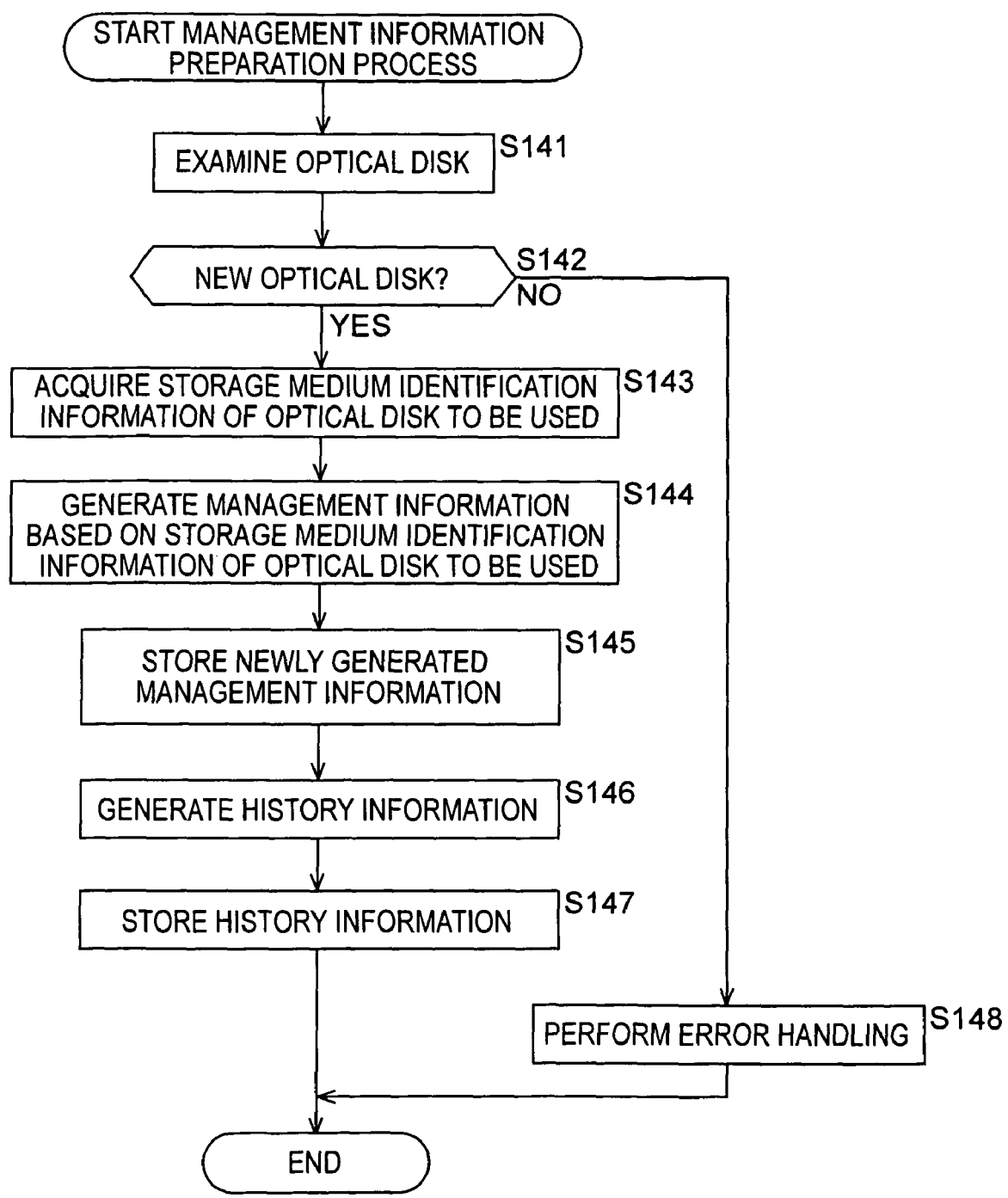
FIG. 21 is a flow chart showing another example of a management information preparation process.

The management information preparation process according to the present embodiment is described below with a flow chart shown in FIG. 21 is described below.

In a first step S141 of the management information preparation process, the controller 41 examines an optical disk 21 mounted on the drive. This step is performed in a similar manner to step S21 shown in FIG. 8. In step S142, the controller 41 determines whether the mounted optical disk 21 is a new optical disk, based on the result of the examination. This step is performed in a similar manner to step S22 shown in FIG. 8. If it is determined that the optical disk 21 is a new optical disk, the controller 41 advances the process to step S143.

In step S143, the management information generator 44 acquires storage medium identification information 161 identifying a next optical disk from the storage medium identification information manager 162. In step S144, the management information generator 44 generates management information 71 using the acquired storage medium identification information 161 identifying the next optical disk and supplies the generated management information 71 to the management information memory 45. In step S145, the management information memory 45 stores the management information 71 generated by the management information generator 44.

The management information generator 44 also supplies the generated management information 71 to the history information generator 43. In step S146, the history information generator 43 generates history information 111 by adding information to the list based on the received management information 71, and supplies the history information 111 to the history information memory 42. This step is performed in a similar manner to step S27 shown in FIG. 8. In step S147, the history information memory 42 stores the received history information 111. After completion of step S147, the process is ended. This step is performed in a similar manner to step S28 shown in FIG. 8.

In a case in which it is determined in step S142 that the optical disk 21 mounted on the drive is not a new optical disk, the controller 41 advances the process to step S148 to perform an error handling process. After the error handling process, the controller 41 ends the management information preparation process. This step is performed in a similar manner to step S29 shown in FIG. 8.

Figure 22:
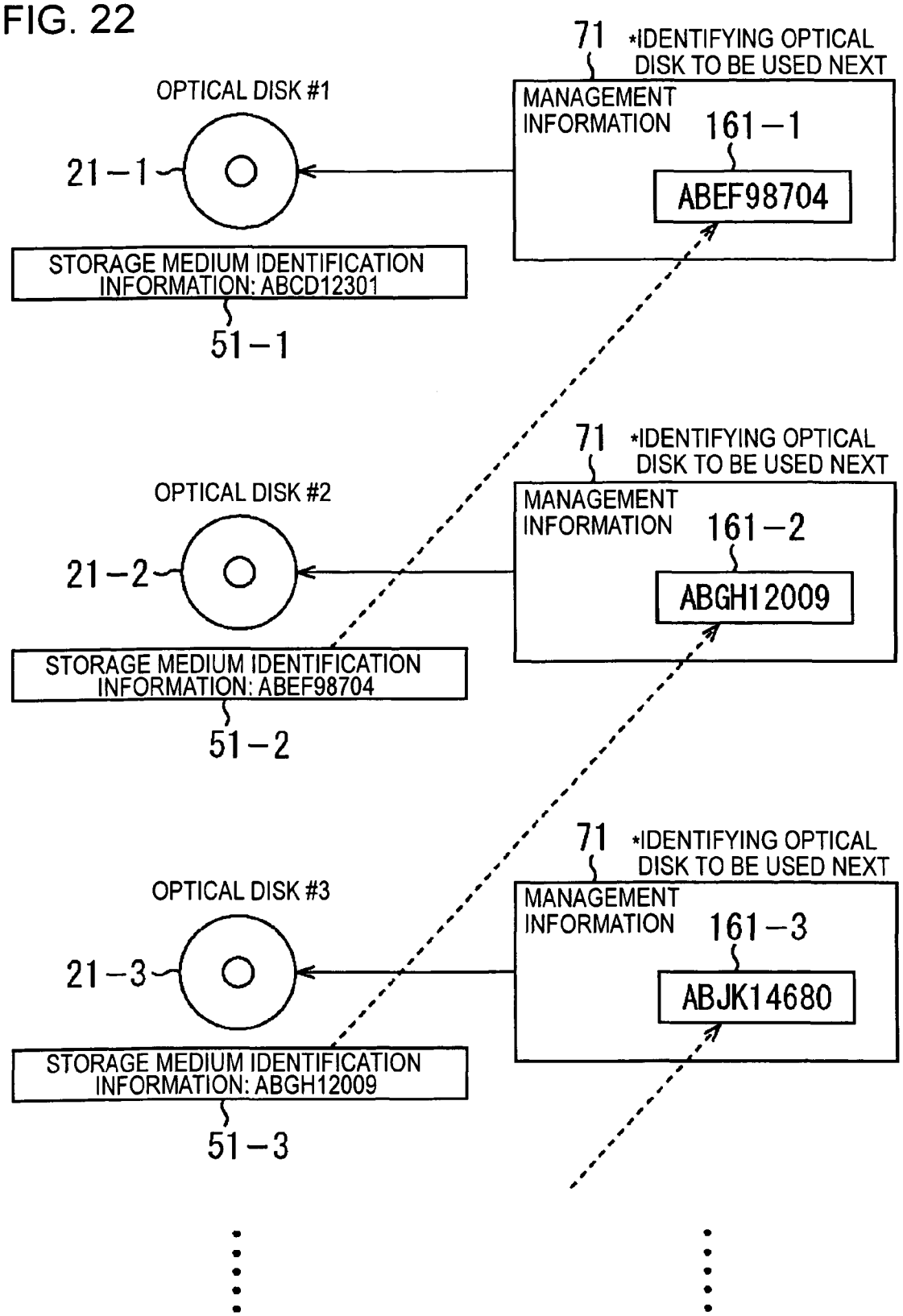
FIG. 22 is a diagram showing another example of management information.

As a result of the process described above, as shown in FIG. 22, management information 71-1 includes next-storage medium identification information 161-1 indicating an optical disk 21 to be used next to store clip data, management information 71-2 includes next-storage medium identification information 161-2, and management information 71-3 includes next-storage medium identification information 161-3. When an optical disk 21 is mounted on a playback apparatus, the playback apparatus can easily determine (identify) which optical disk 21 is to be used next to the mounted optical disk 21, from the information read from the mounted optical disk 21.

As described above, since the storage device 13 stores management information 71 including next-storage medium identification information 161, it is possible to identify an optical disk to be used next to the current optical disk 21.

The value of the next-storage medium identification information 161 (storage medium identification information 51) shown in FIG. 21 is an example, and an arbitrary value may be used as long as it can correctly identify a next optical disk. This also applies to notification information included in the management information 71 described elsewhere in the present invention.

In the example described above, it is assumed that all clip data are stored on optical disks 21 by using the same single storage device 13. Alternatively, a group of clip data may be stored on optical disks 21 by using a plurality of storage devices. In this case, it is required that the history information 111 should be shared by all storage devices.

Figure 23:
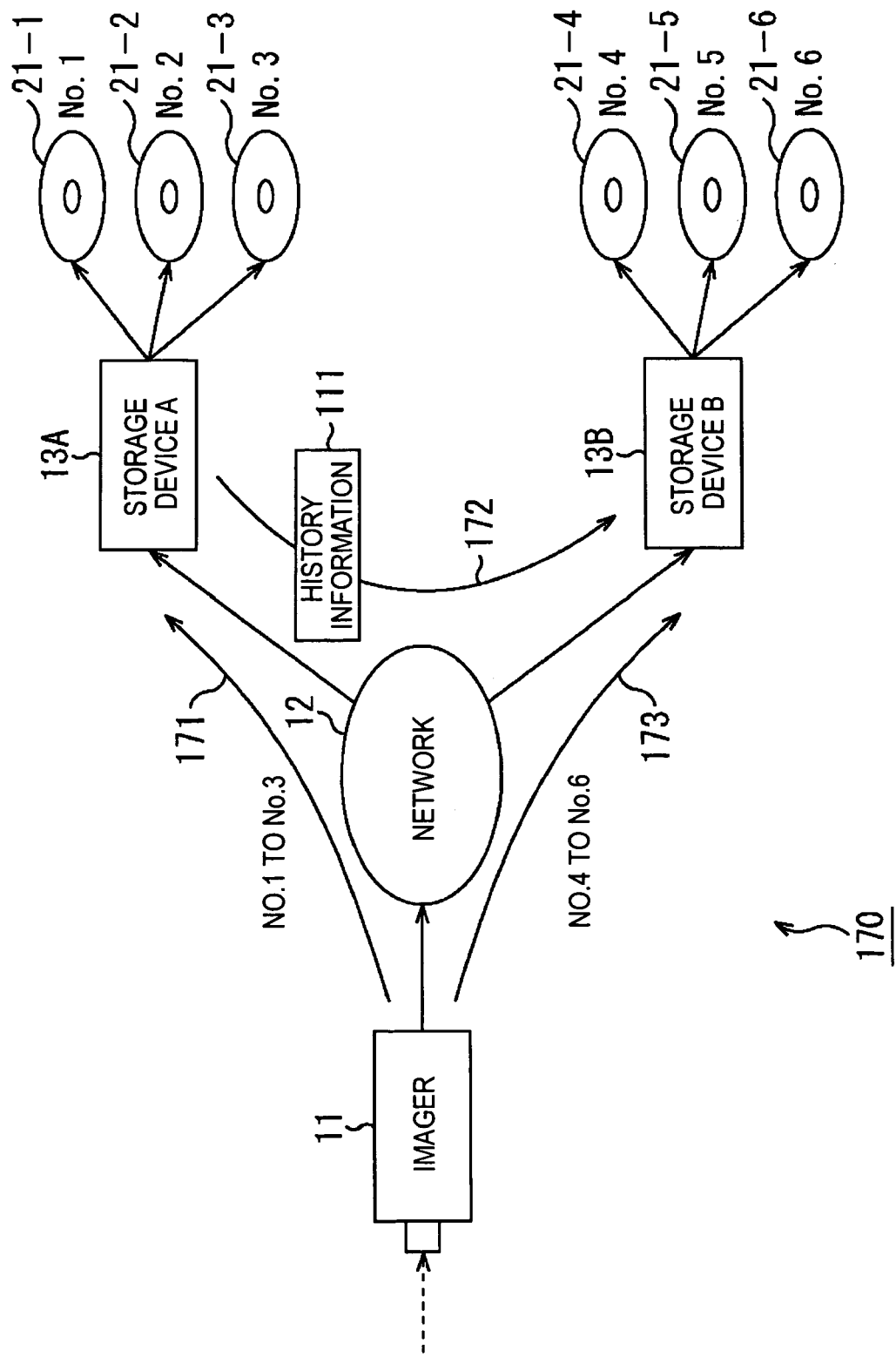
FIG. 23 is a block diagram showing a network system according to another embodiment of the present invention.

FIG. 23 shows an example of a network system in which history information 111 is shared by all storage devices.

As shown in FIG. 23, the network system 170 includes an imager 11, a network 12, a storage device 13A (storage device A), and a storage device 13B (storage device B).

The storage device 13A and 13B are similar to the storage device 13 shown in FIG. 1, and thus an explanation thereof is omitted. The controller 41 of each of the storage device 13A and 13B is capable of transmitting and receiving history information 111 stored in the history information memory 42 via the communication interface 32 and the network 12 to share the history information 111.

For example, as shown in FIG. 23, when clip data of one group are stored on six optical disks 21-1 to 21-6, the storage device 13A is used to store clip data on the first to third optical disks 21-1 to 21-3 and the storage device 13B is used to store clip data on the fourth to sixth optical disks 21-4 to 21-6.

In this case, the imager 11 supplies clip data to be stored on the first three optical disks 21-1 to 21-3 to the storage device 13A via the network 12 as shown by an arrow 171. The storage device 13A sequentially stores the received clip data on the optical disks 21-1 and 21-3 in the specified order. If the storing of clip data on the three optical disks 21-1 to 21-3 is completed, the storage device 13A supplies the history information 111 associated with the storage of the management information 71 to the storage device 13B via the network 12 as shown by an arrow 172. The imager 11 then supplies clip data to be stored on the fourth to sixth optical disks 21-4 to 21-6 to the storage device 13B via the network 12 as shown by an arrow 173. The storage device 13B sequentially stores the received clip data on the optical disks 21-4 and 21-6 in the specified order.

In the storage process, the storage device 13B generates management information 71 using the history information 111 using the history information 111 supplied from the storage device 13A. More specifically, for example, the storage device 13B generates management information 71 to be stored on the fourth optical disk 21-4, using the storage medium identification information 51 of the third optical disk 21-3 included in the history information 111. For example, to incorporate the storage group identification information 141 in the management information 71, the storage device 13B acquires the storage group identification information 141 from the history information 111.

A process of transferring the history information 111 is described below with reference to a flow chart shown in FIG. 24.

Figure 24:
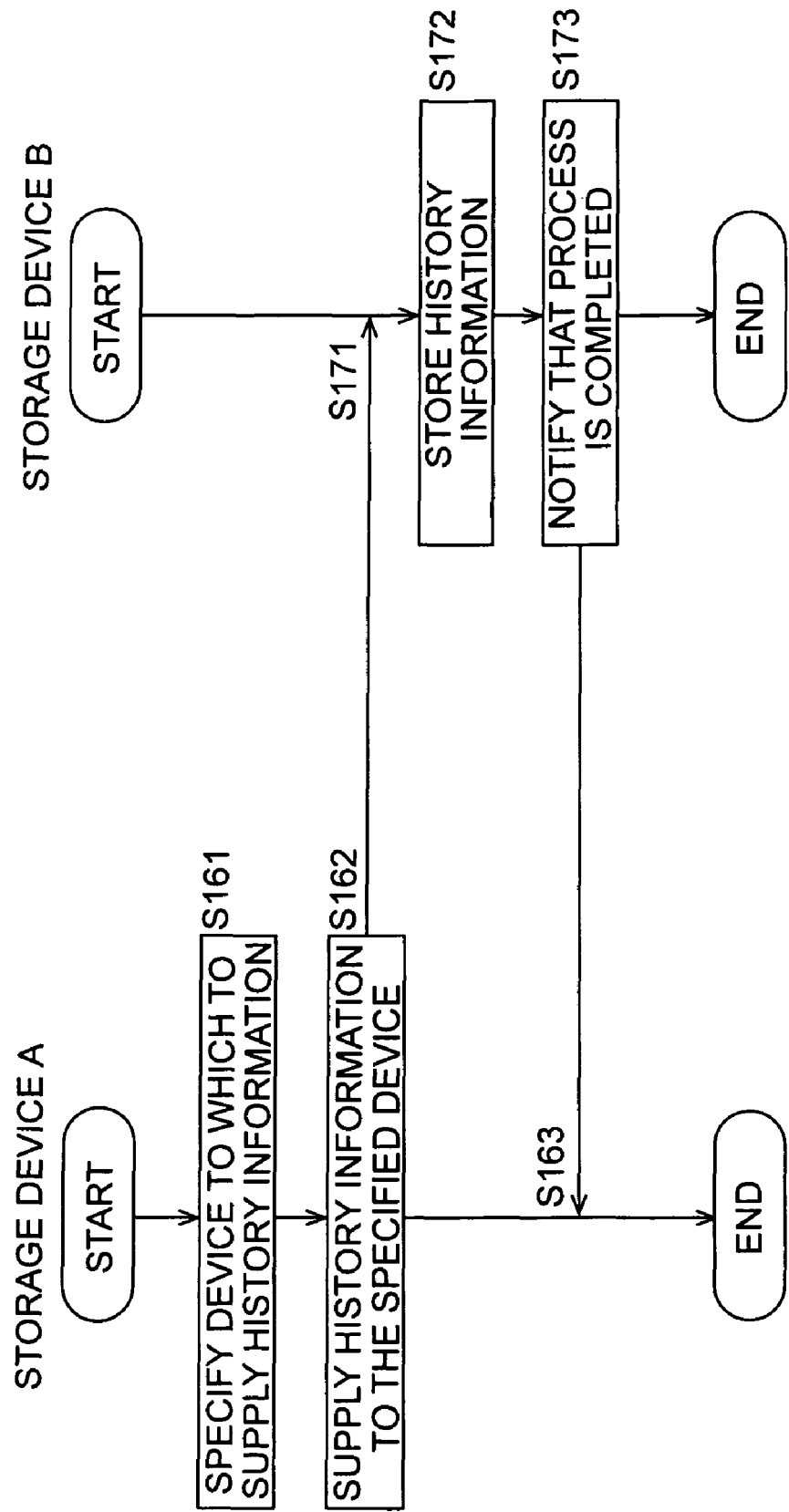
FIG. 24 is a flow chart showing an example of a history information transfer process.

First, in step S161, in FIG. 24, the storage device 13A (storage device A), which is a sender of the history information 111, sets a destination of the history information 111. More specifically, in the example shown in FIG. 23, the storage device 13A specifies the storage device 13B as the destination of the history information 111 by using an IP address or the like of the storage device 13B (storage device B).

In step S162, the storage device 13A supplies the history information 111 to the storage device 13B via the network 12 according to the setting. In step S171, the storage device 13B receives the history information 111. In step S172, the storage device 13B stores the received history information 111 in the history information memory 42. In step S173, the storage device 13B notifies the storage device 13A that the history information 111 has been successfully received. In step S163, if the storage device 13A receives this notification, the transfer process is ended.

As described above, by sharing the history information 111 by a plurality of storage device 13, it becomes possible to switch the storage device used to store clip data on optical disks 21 in the middle of the clip data. This makes it possible to continuously store clip data taken by the imager 11 on optical disks 21 mounted on two storage devices 13 (the storage device 13A and the storage device 13B) without having a break, which would be needed to exchange an optical disk 21 mounted on a drive with another optical disk 21 when storing the clip data using only a single storage device, by using alternately the storage device 13A and the storage device 13B (by exchanging alternately optical disks 21 mounted on the storage device 13A and the storage device 13B).

Note that the number of storage device 13 is not limited to two, but three or more storage device 13 may be used. Instead of sharing the history information 111, the management information 71 may be shared. In this case, it is required that information similar to the history information 111 be shared to check whether an optical disk 21 mounted on a drive is a new optical disk.

A process of playing back data from an optical disk 21, on which clip data is stored together with management information 71 or history information 111 in the above-described manner, is described below.

Figure 25:
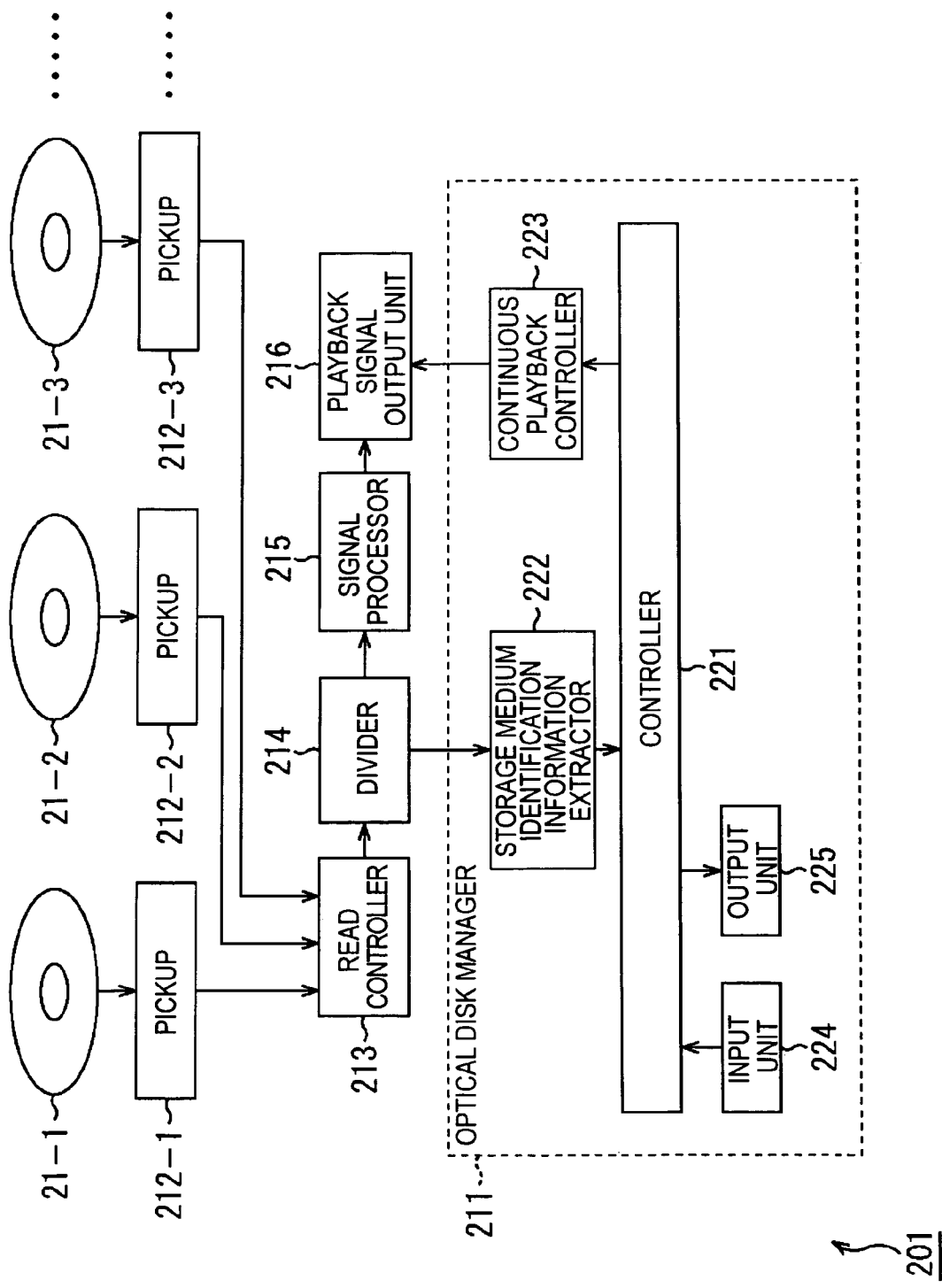
FIG. 25 is a block diagram showing an example of a structure of a playback apparatus.

FIG. 25 is a block diagram showing an example of a structure of a playback apparatus according to an embodiment of the present invention.

As shown in FIG. 25, a playback apparatus 201 includes a plurality of drives such that a plurality of optical disks 21 can be mounted at the same time. Each drive has its own pickup (a pickup 212-1, a pickup 212-2, a pickup 212-3, and so on). Hereinafter, when it is not necessary to distinguish pickups from one another, a pickup or pickups are referred to as a pickup 212 or pickups 212.

The playback apparatus 201 includes an optical disk manager 211 that manages mounted optical disks 21, pickups 212, a read controller 213, a divider 214, a signal processor 215, and a playback signal output unit 216.

The optical disk manager 211 includes a controller 221, a storage medium identification information extractor 222, a continuous playback controller 223, an input unit 224, and an output unit 225.

The controller 221 controls operations of various parts over the entire playback apparatus 201. The controller 221 also supplies the storage medium identification information 51 extracted by the storage medium identification information extractor 222 to the continuous playback controller 223. Note that although in FIG. 25, only data flows are shown by arrows (an arrow from the storage medium identification information extractor 222 and an arrow to the continuous playback controller 223), the controller 221 is actually connected to various parts of the playback apparatus 201 via a control bus or a data bus so that control information or data can be transmitted from the controller 221 and the various parts to control the various parts.

The storage medium identification information extractor 222 extracts storage medium identification information 51 from management information 71 (or history information 111) divided by the divider 214 and supplies the extracted storage medium identification information 51 to the controller 221. Based on the storage medium identification information 51 supplied from the controller 221, the continuous playback controller 223 identifies the order of optical disks 21 mounted on the respective drives (the order in which clip data is stored) thereby identifying the order of clip data, and the continuous-playback controller 223 controls the playback signal output unit 216 to continuously play back all clip data in the identified order. The input unit 224 includes various buttons or a keyboard or the like for use by a user to input commands. The output unit 225 includes a light emitting unit such as an LED, a display such as a CRT or an LCD, and an audio output unit such as a speaker and serves to output information supplied from the controller 221.

As described above, the pickups 212 include a plurality of pickups (the pickup 212-1, the pickup 212-2, the pickup 212-3, etc.) for reading clip data from optical disks 21 mounted on different drives. In the example shown in FIG. 25, pickup 212-1, the pickup 212-2, and the pickup 212-3 respectively read clip data from the optical disk 21-1, the optical disk 21-2, and the optical disk 21-3. The pickups 212 supply the read clip data to the read controller 213.

The read controller 213 controls reading of clip data from the optical disks 21 by controlling the pickups 212. The read controller 213 transfers the clip data read by the pickups 212 to the divider 214. The divider 214 extracts management information 71 (or history information 111) multiplexed on the received clip data and supplies the extracted management information 71 (or history information 111) to the storage medium identification information extractor 222. The divider 214 supplies the other components of the clip data to the signal processor 215.

The signal processor 215 performs a predetermined signal processing such as a format conversion on the received clip data and supplies the resultant clip data to the playback signal output unit 216. The playback signal output unit 216 plays back the clip data supplied from the signal processor 215 by displaying an image on the display and outputting a sound/voice via the speaker in accordance with the clip data. In the playback process, as required, the playback signal output unit 216 requests the controller 221 to control various parts so as to properly read the clip data. For example, under the control of the continuous playback controller 223, the playback signal output unit 216 requests the controller 221 to read the clip data from the optical disks 21 to the continuous playback controller 223 in the specified order.

The playback apparatus 201 has also the capability of playing back a particular clip data, specified by a user, of those stored on the optical disks 21 in a normal manner, in addition to the above-described capability of continuously playing back all clip data stored on the optical disks 21 in the same order as that in which the clip data was stored, in accordance with the management information 71 stored on the optical disks 21.

Figure 26:
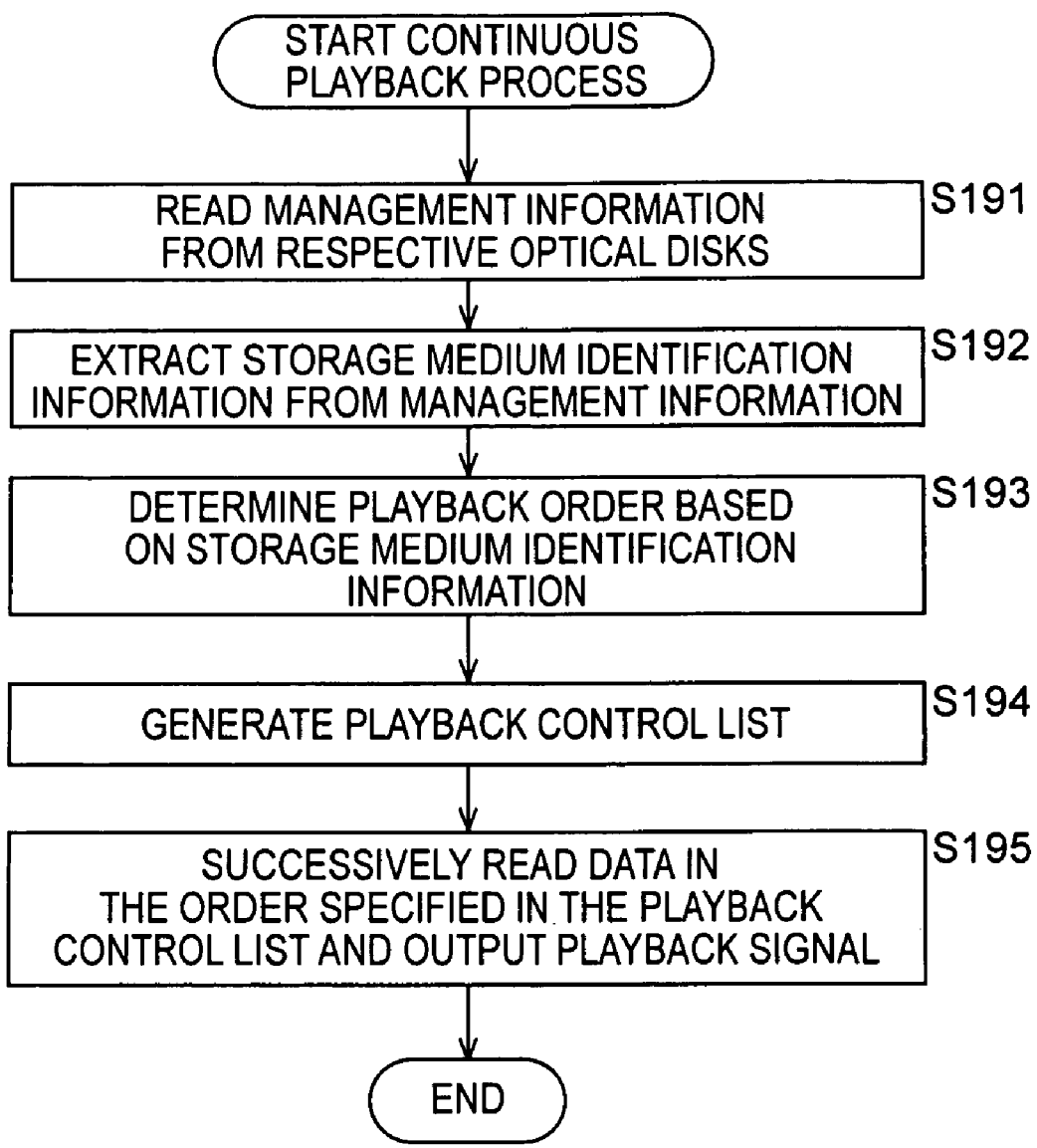
FIG. 26 is a flow chart showing an example of a continuous playback process.

A specific example of the continuous playback process is described below with reference to a flow chart shown in FIG. 26.

If the continuous playback process is started in response to a command issued by a user, the controller 221 first controls, in step S191, the read controller 213 and the divider 214 to read the management information 71 from the respective optical disks 21. In accordance with the command from the controller 221, the read controller 213 reads the clip data on which the management information 71 is multiplexed from the respective optical disks 21 via the pickups 212 and supplies the read clip data to the divider 214. The divider 214 extracts the management information 71 from the clip data and supplies the extracted management information 71 to the storage medium identification information extractor 222.

In step S192, the controller 221 commands the storage medium identification information extractor 222 to extract the storage medium identification information 51 from the management information 71. In accordance with the command from the controller 221, the storage medium identification information extractor 222 extracts the storage medium identification information 51 from the management information 71 received from the divider 214 and supplies the extracted storage medium identification information 51 to the controller 221. The controller 221 supplies the received storage medium identification information 51 to the continuous playback controller 223. In step S193, the continuous playback controller 223 determines the playback order based on the storage medium identification information 51 and, in step S194, produces a playback control list in accordance with the determined playback order.

In step S195, after the completion of producing the playback control list, the continuous playback controller 223 commands the playback signal output unit 216 to read the clip data from the optical disk 21 in the order specified in the playback control list and sequentially output the read clip data. In accordance with the command from the continuous playback controller 223, the playback signal output unit 216 requests the controller 221 to read the clip data from the optical disks 21 in the order specified in the playback control list. The playback signal output unit 216 plays back the clip data by displaying the supplied clip data on the display (not shown).

If step S195 is completed, the controller 221 ends the continuous playback process.

As described above, the playback apparatus 201 is capable of easily identifying the order in which clip data are stored on optical disks 21, based on the management information 71 stored on the respective optical disks 21 and capable of continuously playing back the clip data in the identified order.

In the embodiment described above, the storage order is managed in units of storage media. Instead, the storage order may be managed in other units such, for example, in units of files or in units of clips, as described below.

Figure 27:
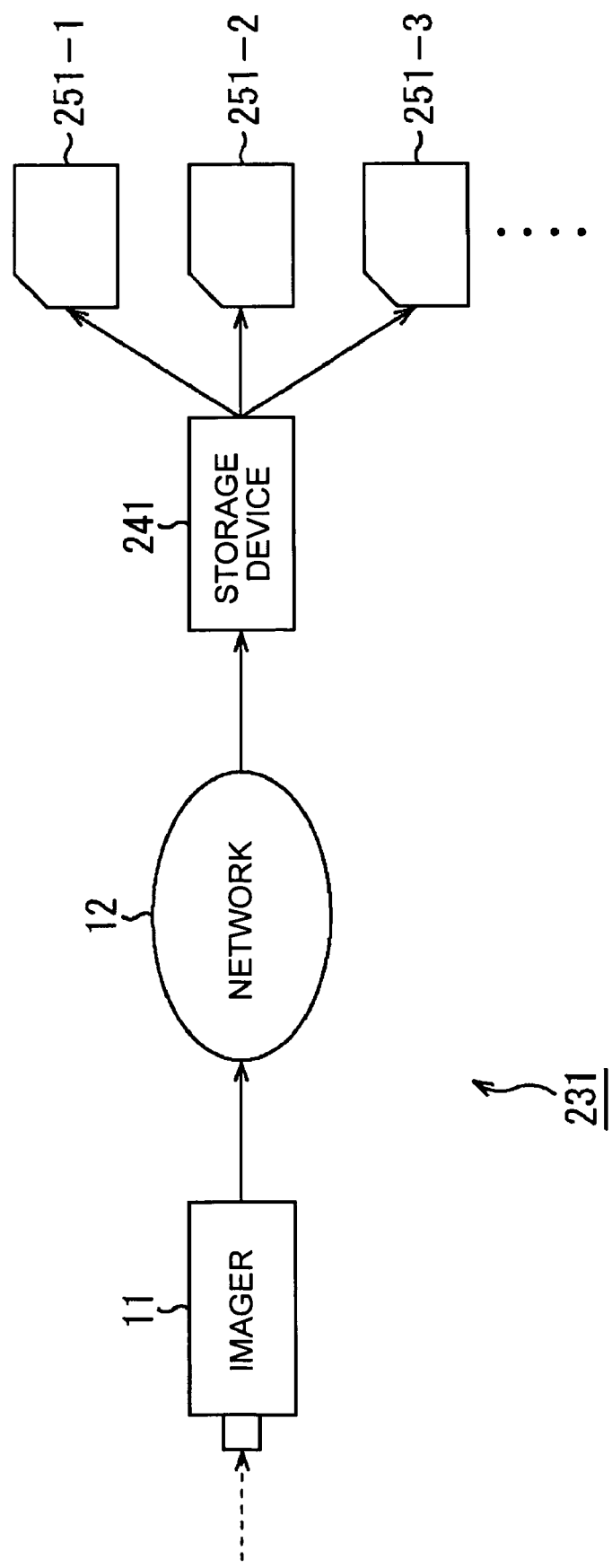
FIG. 27 is a block diagram showing another example of a network system according to an embodiment of the present invention.

FIG. 27 shows a network system according to an embodiment of the present invention.

As shown in FIG. 27, the network system 231 includes an imager 11, a network 12, and a storage device 241. In this network system 231, the storage device 13 of the network system 1 shown FIG. 1 is replaced with the storage device 241. In this network system 231, clip data obtained by taking an image of a subject by the imager 11 is supplied to storage device 241 via the network 12 and stored in the form of a plurality of files on a storage medium by the storage device 241.

The storage device 241, as with the storage device 13 shown in FIG. 1, stores a plurality of successive clip data output from the imager 11 in the form of a plurality of files (for example, a file 251-1, a file 251-2, a file 251-3, and so on) on storage media (for example, writable optical disks).

The files may be formed in arbitrary units of data as long as each file includes a part or all of the clip data. For example, a file may include entire clip data. A single clip data may be divided into a series of parts that are successive in time and a file may include one of the parts. When a single clip data includes plural parts, a file may include some of successive parts. A plurality of files may be combined into a signal file. The units of data are not limited to those described above, but a file may include data in any units. In the following explanation, when it is not necessary to distinguish plural files from one another, a file or files will be referred to as a file 251 or files 251.

Figure 28:
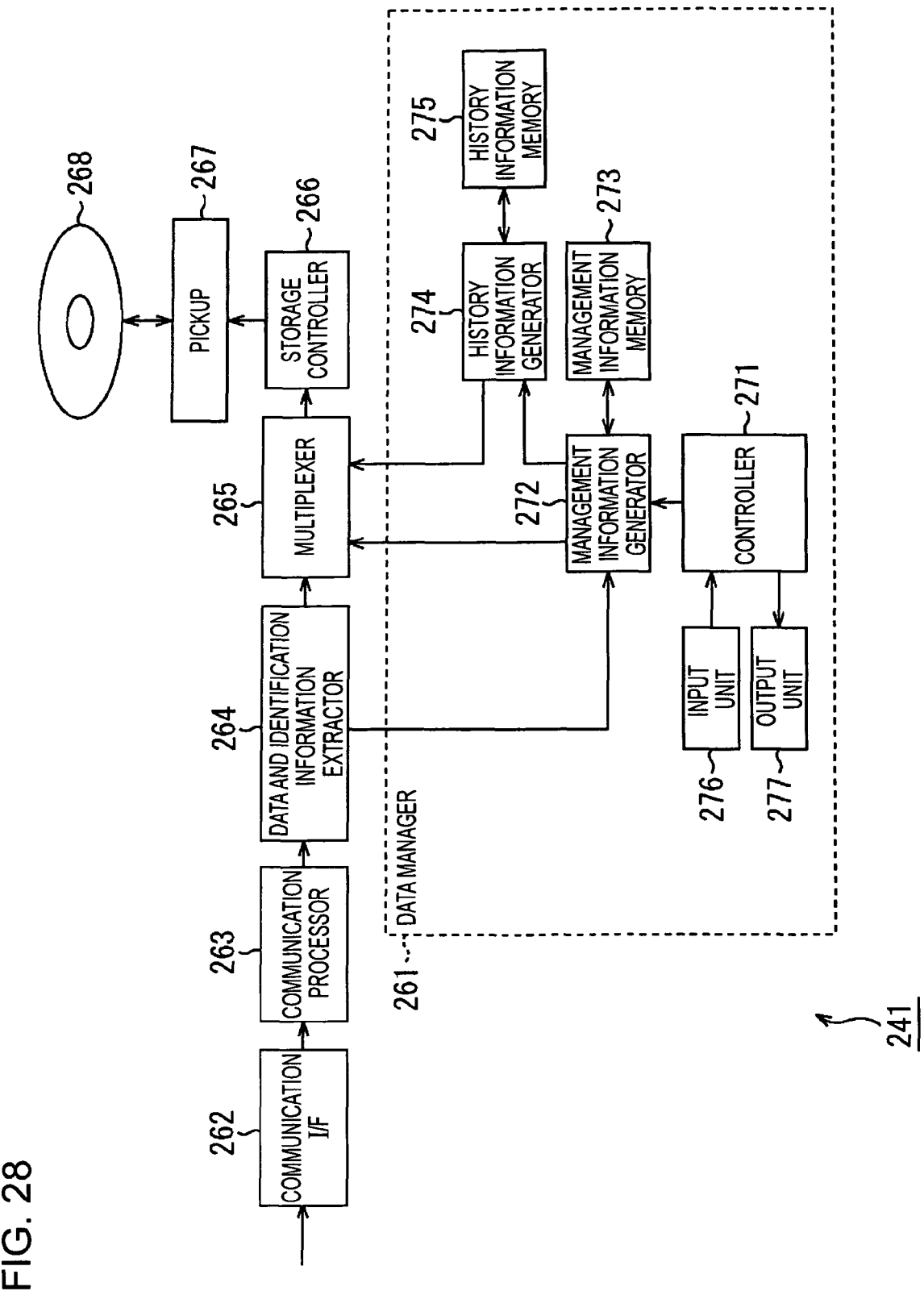
FIG. 28 is a block diagram showing an example of a structure of a storage device shown in FIG. 27.

FIG. 28 is a block diagram showing an example of a structure of the storage device 241 shown in FIG. 27.

As shown in FIG. 28, the storage device 241 includes a data manager 261, a communication interface (I/F) 262, a signal processor 263, a data identification information extractor 264, a multiplexer 265, a storage controller 266, and a pickup 267.

The data manager 261 is a processing unit that manages data, and includes a controller 271, a management information generator 272, a management information memory 273, a history information generator 274, a history information memory 275, an input unit 276, and an output unit 277.

The controller 271 includes a CPU, a ROM, and RAM, and is responsible for general control of the storage device 241. Note that although in FIG. 28, only main control flows are shown by arrows (arrows from or to the management information generator 272), the controller 271 is actually connected to various parts of the storage device 241 via a control bus or a data bus so that control information or data can be transmitted from the controller 271 and the various parts to control the various parts of the storage device 241.

Under the control of the controller 271, the management information generator 271 generates management information for managing files 251 stored on the optical disk 268. The details of the management information generator 271 will be described later. The management information memory 273 stores the management information generated by the management information generator 272.

The history information generator 274 generates history information associated with management information generated by the management information generator 272. The history information memory 275 includes a memory device such as a semiconductor memory and serves to store history information generated by the history information generator 274. The details of the history information memory 275 will be described later.

The input unit 276 includes buttons, switches, an adjuster, a keyboard, a mouth, a touchpad, a touch pen, a touch panel, a microphone, and/or a pointer device. The input unit 276 is used by a user to input a command to the controller 271. The output unit 277 includes a speaker, a display such as a CRT (Cathode Ray Tube) or an LCD (Liquid Crystal Display), and a light emitting unit such as an LED (Light Emitting Diode) or a florescent lamp and serves to output information supplied from the controller 271.

The communication interface 262 connected to the network 12 communicates with the imager 11 to acquire clip data output from the imager 11. The acquired clip data is supplied to the signal processor 263. The signal processor 263 performs signal processing, such as format conversion, combining a plurality of data into a single data, or dividing a single data into a plurality of parts, on the clip data received via the communication interface 32. The signal processor 263 supplies the resultant data (file 251) to the data identification information extractor 264. The data identification information extractor 264 extracts data identification information from the file 251 received from the signal processor 263 and supplies the extracted data identification information to the management information generator 272. The data identification information extractor 264 also supplies the file 251 to the multiplexer 265.

The multiplexer 265 multiplexes the file 251 supplied from the data identification information extractor 264, the history information supplied from the history information generator 274, and the management information supplied from the management information generator 271, as required, and supplies the resultant multiplexed data to the storage controller 266. The storage controller 266 commands the pickup 267 to store the file 251 supplied from the multiplexer 265 on the optical disk 268.

The pickup 267 illuminates the optical disk 268 mounted on a drive with a laser beam to read or write data from or on the optical disk 268.

Figure 29:
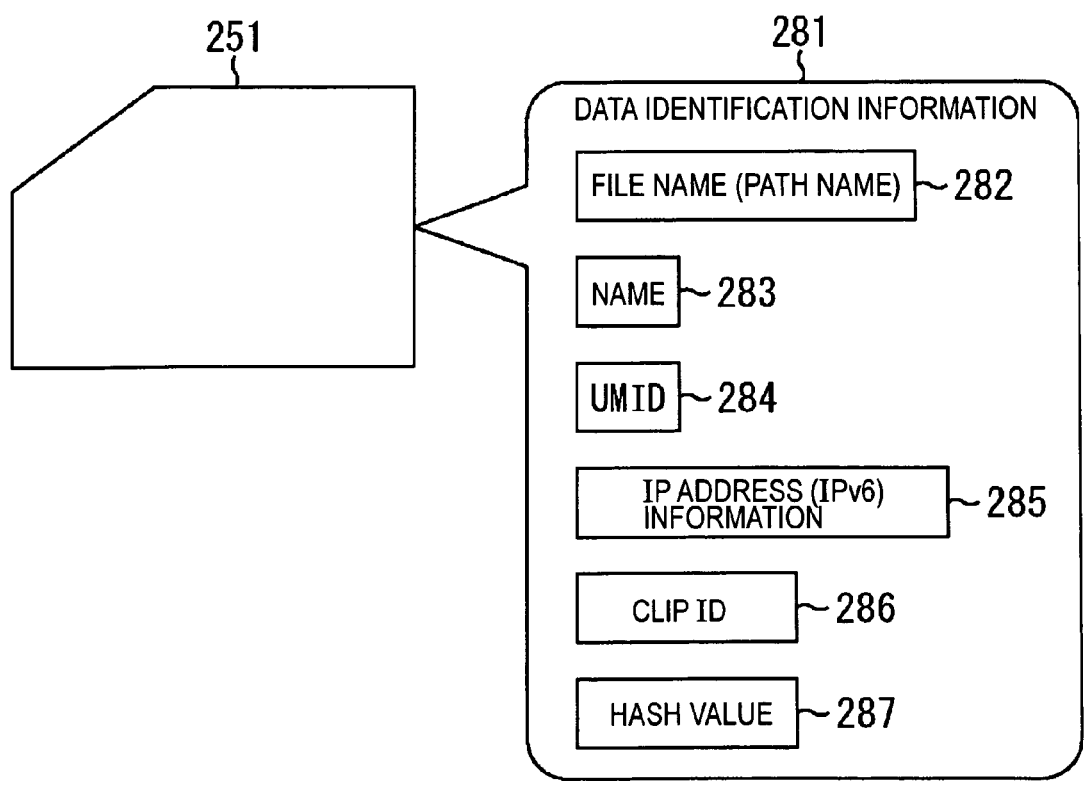
FIG. 29 is a diagram showing an example of a data structure of data identification information.

FIG. 29 is a diagram showing an example of data identification information identifying the file 251.

Arbitrary information may be used as the data identification information 281 as long as it correctly identifies the file 251 at least within the network system 231. In the example shown in FIG. 29, the data identification information 281 includes a file name (path name) 282, a name 283, a UMID (Unique Material Identifier) 284, IP (Internet Protocol) address (IPv6) information 285, a clip ID 286, and a hash value 287 of the above parameters.

When a file 251 is stored on a storage medium (for example, the optical disk 268 shown in FIG. 28), a name (a file name) is assigned to the file 251 and the file 251 is stored in a predetermined format (for example, in the UDF). The name assigned to the file 251 or a path name including the name assigned to the file 251 and the name of a hierarchical directory in which the file 251 is located is employed as the file name (path name) 282. Use of the file 251 defined in such a manner allows the storage device 241 to identify the file 251 at least among files stored on the storage medium (optical disk 268).

The name 283 refers to a name arbitrarily assigned to the file 251 by which to manage the file order). More specifically, the name 283 is a name assigned to each file by the storage device 241 independently of other systems. Use of the name 283 makes it possible to identify each file at least among files used by the storage device 241.

The UMID 284 is an identifier that globally uniquely identifies an AV (Audio Visual) material, according to the standards established by SMPTE (Society of Motion Picture and Television Engineers). Use of a UMID allows it to identify each file 251 regardless of its location (directory). By managing the correspondence between the UMID and the directory where the file 251 is located, the storage/playback apparatus 241 can specify the file 251 regardless of its directory.

The IP address (IPv6) information 285 is an identification number used in the IP protocol, and is composed of 128 bits in the case of IPv6. Assigning of IP address information 285 to each file 251 makes it possible for the storage device 241 to identify each file 251.

The clip ID 286 is identification information that identifies each clip data. The clip ID 286 is described as metadata in the clip data.

The hash value 287 is a fixed-length pseudorandom number generated using at least one of the file name (path name) 282, the name 283, the UMID 284, the IP address (IPv6) information 285, and the clip ID 286.

The data identification information extractor 264 shown in FIG. 28 extracts the data identification information 281 including the above-described information from the clip data and supplies the extracted data identification information 281 to the management information generator 272.

Figure 30:
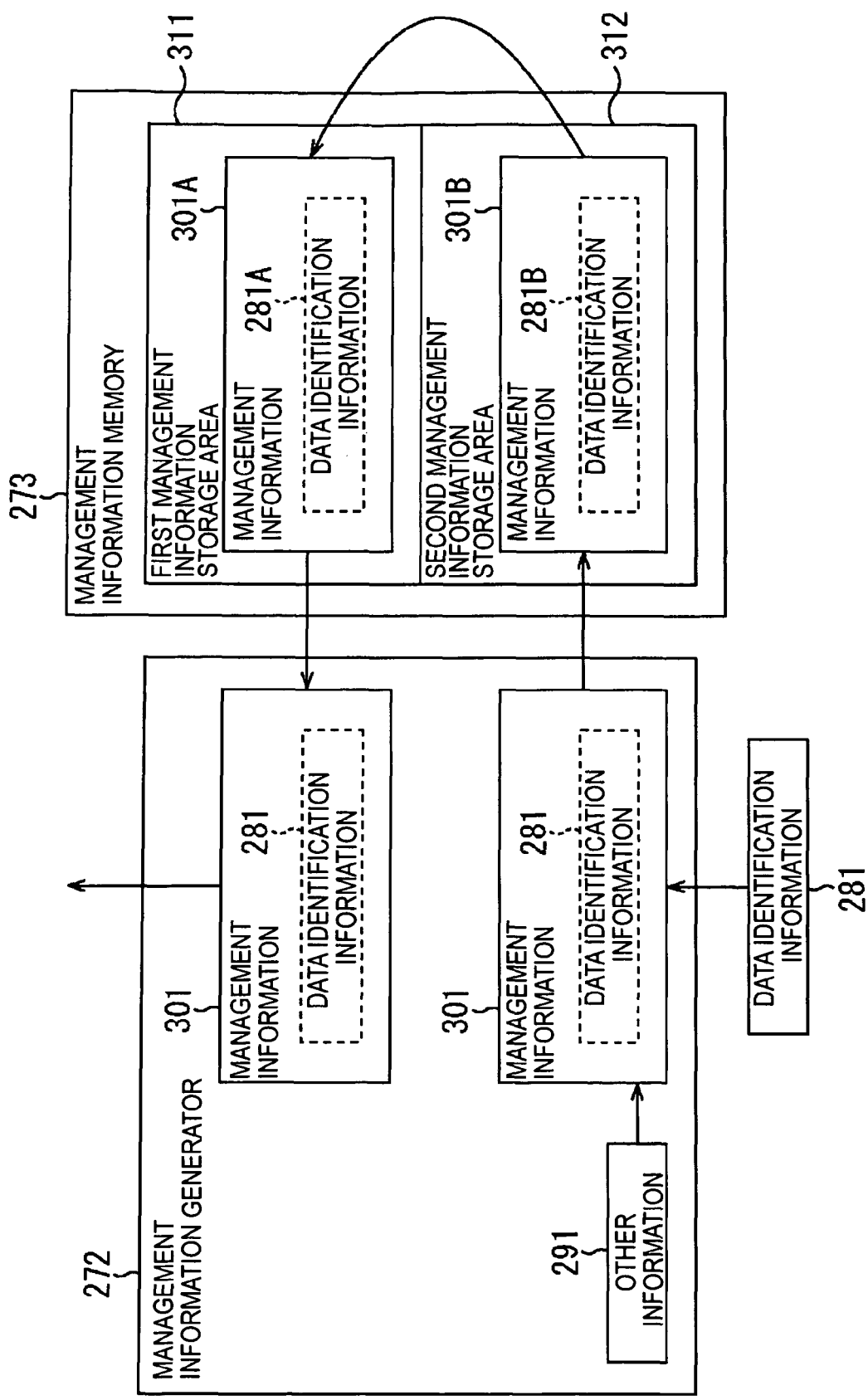
FIG. 30 is a diagram showing another example of a manner in which management information is generated.

FIG. 30 shows the management information generator 272 and management information stored in the management information memory 273.

As shown in FIG. 30, if the management information generator 272 acquires the data identification information 281 from the data identification information extractor 264, the management information generator 272 generates management information 301 by combining the acquired data identification information 281 with other information 291. The management information generator 272 supplies the generated management information 301 to the management information memory 273, which stores the received management information 301 in the second management information storage area 312. The management information memory 273 has two storage areas: a first management information storage area 311 for storing management information 301A; and the second management information storage area 82 for storing management information 301B. Note that the management information 301A is management information 301 generated immediately before the management information 301B.

The management information generator 272 reads the management information 301A from the first management information storage area 311 and supplies the read first management information 301A to the multiplexer 265. If the management information 301A is read from the first management information storage area 311, the management information 301A is deleted from the first management information storage area 311, and the management information 301B stored in the second management information storage area 312 is moved to the first management information storage area 311 and stored therein. The second management information storage area 312 becomes free and ready to store next management information.

Figure 31:
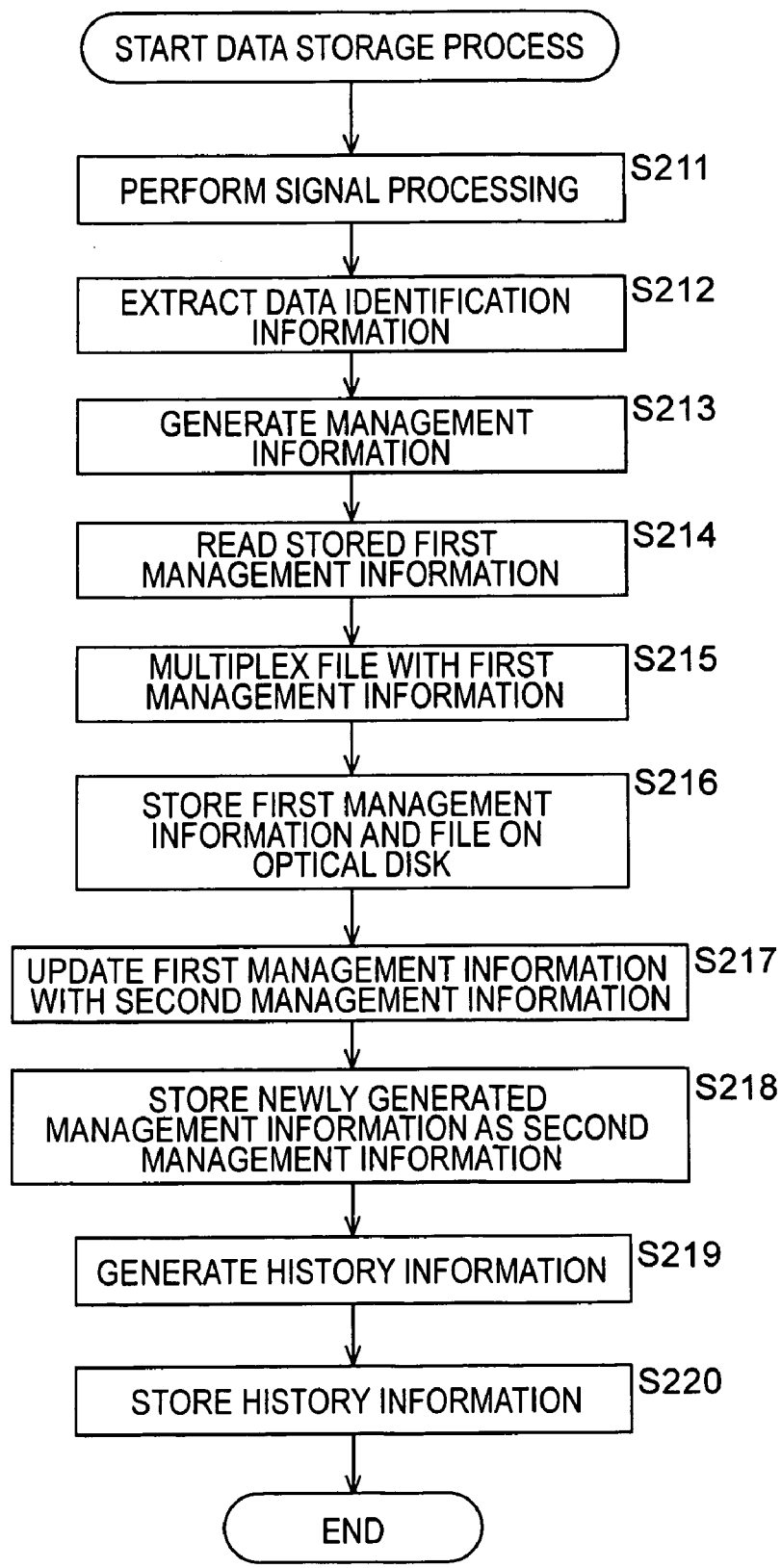
FIG. 31 is a flow chart showing an example of a data storage process.

Each file includes management information 301 generated in the above-described manner. To explain the process of storing the management information 301, the process performed by the storage device 241 shown in FIG. 28 to store data (the file 251) is described below. The controller 271 of the storage device 241 performs a data storage process to store data supplied via the communication interface 262 as described below with reference to a flow chart shown in FIG. 31.

In a first step S211 of the data storage process, the controller 271 commands the signal processor 263 to perform signal processing on the clip data supplied via the communication interface 262. In accordance with the command from the controller 271, the signal processor 263 perform the signal processing on the clip data supplied via the communication interface 262 and supplies the resultant clip data as a file 251 to the data identification information extractor 264. The process then proceeds to step S212.

In step S212, the controller 271 commands the data identification information extractor 264 to extract the data identification information 281 from the file 251. In accordance with the command from the controller 271, the data identification information extractor 264 extracts the data identification information 281 from the file 251 supplied from the signal processor 263 and supplies the extracted data identification information 281 to the management information generator 272. The data identification information extractor 264 also supplies the file 251 to the multiplexer 265.

In step S213, the controller 271 commands the management information generator 272 to generate management information 301. In accordance with the command from the controller 271, the management information generator 272 generates the management information 301 including the data identification information 281 supplied from the data identification information extractor 264.

In step S214, the controller 271 commands the management information generator 272 to read the first management information 301A stored in the management information memory 273. In accordance with the command from the controller 271, the management information generator 272 reads the first management information 301A from the first management information storage area 311 of the management information memory 273. Furthermore, under the control of the controller 271, the management information generator 272 supplies the acquired first management information 301A to the multiplexer 265.

In step S215, the controller 271 commands the multiplexer 265 to multiplex the file 251 and the first management information 301A. In accordance with the command from the controller 271, the multiplexer 265 incorporates, in the form of metadata, the first management information 301A supplied from the management information generator 272 into the file 251 supplied from the data identification information extractor 264, as with the management information 71, and the multiplexer 265 supplies the resultant data to the storage controller 266.

In step S216, the controller 271 commands the storage controller 266 to store the file 251 in the multiplexed form supplied from the multiplexer 265 on the optical disk 268. In accordance with the command from the controller 271, the storage controller 266 supplies the file 251 (including the multiplexed first management information 301A) supplied from the multiplexer 265 to the optical disk 268 via the pickup 267 to store it on the optical disk 268.

In step S217, the controller 271 commands the management information memory 273 to update the first management information 301A with the second management information 301B. In accordance with the command from the controller 271, the management information memory 273 moves the second management information 301B stored in the second management information storage area 312 into the first management information storage area 311, deletes the first management information 301A, and stores the second management information 301B as new first management information 301A.

In step S218, the controller 271 commands the management information generator 272 to supply the generated new management information 301 to the management information memory 273 to store it therein. In accordance with the command from the controller 271, the management information generator 272 supplies the management information 301 newly generated in step S213 to the second management information storage area 312 of the management information memory 273. The management information memory 273 stores the supplied management information 301 as second management information 301B in the second management information storage area 312.

The controller 271 then commands the history information generator 274 to generate history information corresponding to the management information 301 newly generated by the management information generator 272. In step S219, in accordance with the command from the controller 271, the history information generator 274 acquires the management information 301 newly generated by the management information generator 272 and generates the history information using the acquired management information 301. The history information generator 274 supplies the generated history information to the history information memory 275.

Under the control of the controller 271, the history information memory 275 stores the supplied history information. When storing of the history information is completed, the process is ended.

As described above, by multiplexing the management information 301 on the file 251, the controller 271 can easily store information associated with a previous file 251 in a current file 251. Thus, the storage device 241 has the capability of storing data on a storage medium such that the data can be easily managed, and thus the storage medium can be used in a very convenient manner.

In this case, the initialization process is performed in a basically similar manner as described earlier with reference to the flow chart shown in FIG. 7, and thus the explanation thereof is omitted. In this case, a storage process and a management information preparation process are performed in a data storage process.

Figure 32:
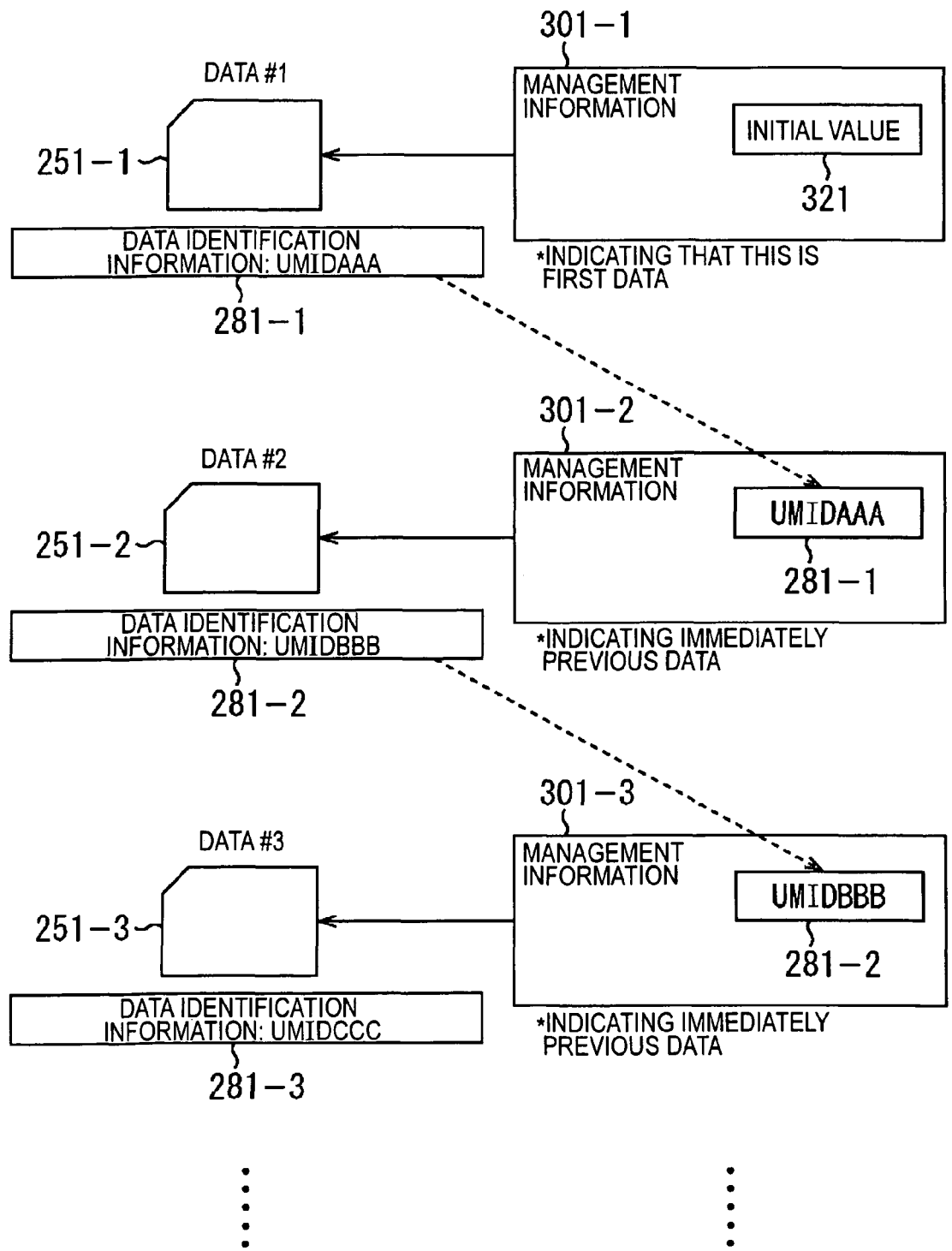
FIG. 32 is a diagram showing another example of management information.

As descried above, since management information 301 is generated and the generated management information 301 is stored together with a file 251 in the multiplexed form, a file 251-1 (a first file (data #1) of a group) in a state immediately after the initialization includes, as shown in FIG. 32, management information 301-1 including a predetermined initial value 321. More specifically, for example, a playback apparatus can identify that the present file 251-1 is a first file (in which first clip data is described) based on the management information 301-1.

In a second file (data #2) 251-2, management information 301-2 including data identification information 281-1 having a value "UMIDAAA" corresponding to the first file 251-1 is multiplexed. Thus, the playback apparatus can identify that a file immediately previous to this file 251-2 is the file 251-1 (including clip data immediately previous to the clip data included in the file 251-2), based on the management information 301-2. In other words, the playback apparatus can determine that the present file 251-2 is a file immediately next to the file 251-1.

In a third file (data #3) 251-3, management information 301-3 including data identification information 281-2 having a value "UMIDBBB" corresponding to the second file 251-2 is multiplexed. Thus, the playback apparatus can identify that a file immediately previous to this file 251-3 is the file 251-2 (including clip data immediately previous to the clip data included in the file 251-3), based on the management information 301-3. In other words, the playback apparatus can determine that the present file 251-3 is a file immediately next to the file 251-2.

As described above, when the storage device 241 stores a series of clip data belonging to the same group as a plurality of files, notification information indicating a file immediately previous to each file is stored together with each file in the multiplexed form, so that a playback apparatus can easily handle data stored in the files. Thus, the storage device 241 has the capability of storing data in files such that the data can be easily managed, and thus the storage medium can be used in a very convenient manner.

Figure 33:
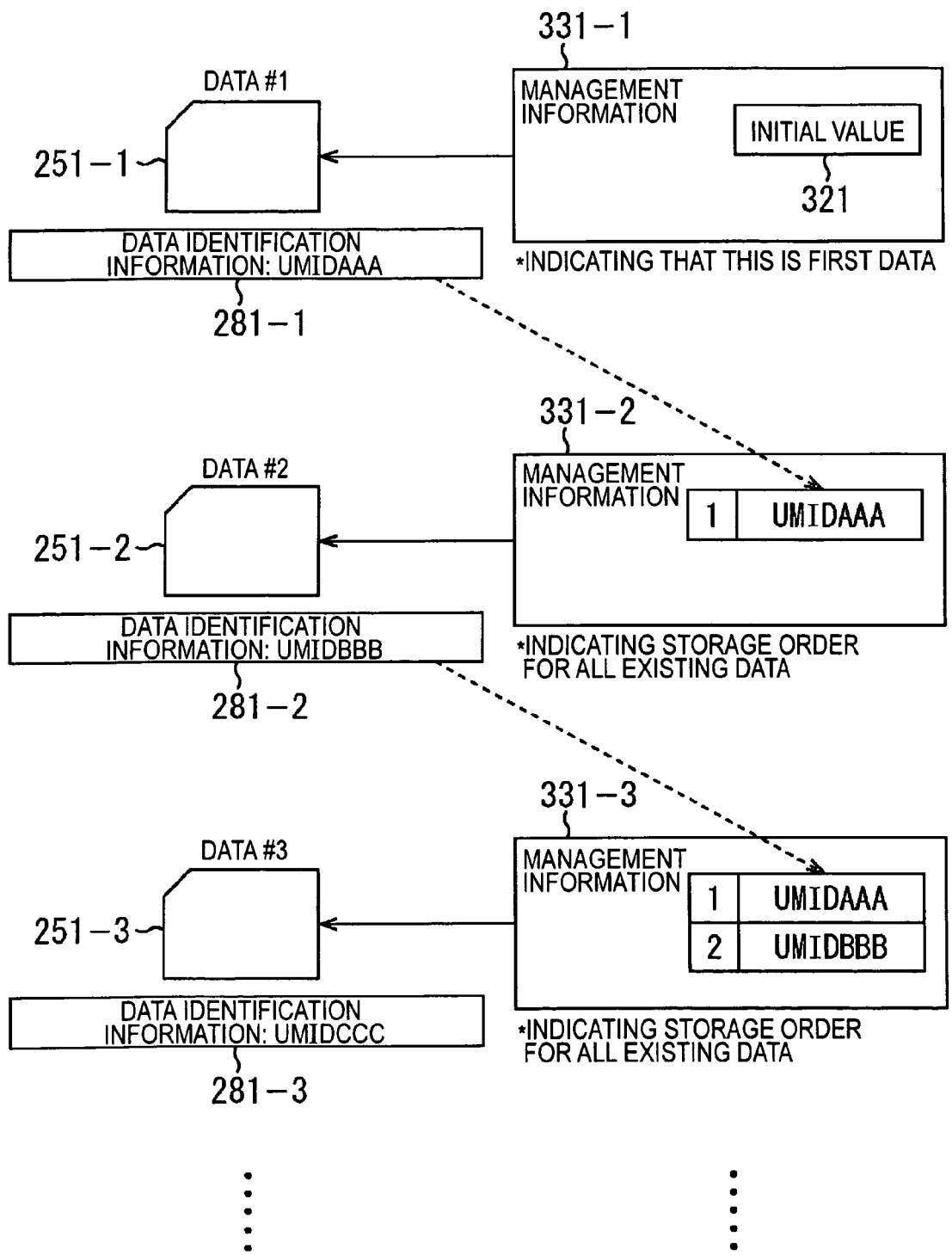
FIG. 33 is a diagram showing another example of management information.
Figure 34:
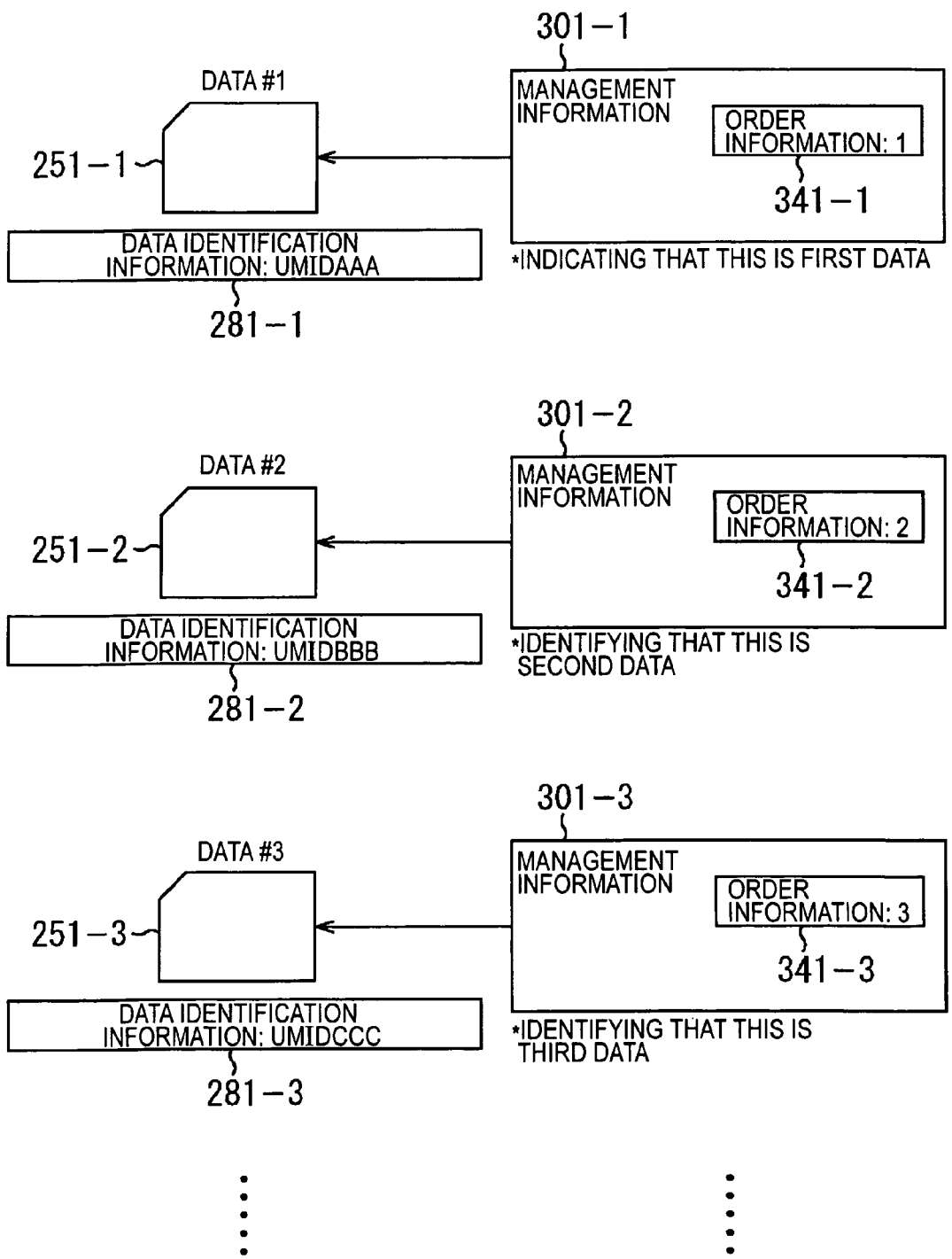
FIG. 34 is a diagram showing another example of management information.

Although in the example shown in FIG. 32, management information 301 is described in each file, information described in each file is not limited to management information 301. For example, instead of the management information 301, history information 331 may be used as shown in FIG. 33, as with storage medium identification information described above with reference to FIG. 11. In this case, a third file 251-3 has information (history information 331-3 shown in FIG. 33) including information associated with a first file and information associated with a second file. That is, each file 251 has information associated with all previous files. Therefore, when a file 251 is given to a playback apparatus, the playback apparatus can easily identify the order in which all previous files were stored, simply by referring to the history information 331 described in the file 251. That is, the storage device 241 is capable of storing data on storage media in a form that allows stored data to be easily managed and thus the storage media can be handled in a very convenient manner.

However, the data size of the history information 331 varies from one file 241 to another, and the data size becomes greater than in the case in which management information 301 is stored in the manner described in FIG. 32. The difference in the data size from that needed in the case in which management information 301 is stored in the manner described in FIG. 32 increases with the order of files 241. That is, the data size of a third file is greater than that of a second file, the data size of a fourth file is greater than that of the third file, and so on.

As with the storage medium identification information described earlier with reference to FIGS. 12 to 14, the management information 301 may include order information 341 indicating the order of files 251 instead of the storage medium identification information, and the management information 301 may be described in each file 251.

In this case, management information 301-1 including order information 341-1 indicating that the present file is first in the order is included in the multiplexed form in the first file 251-1. When a playback apparatus reads this file 251-1, the order information 341-1 allows the playback apparatus to identify that this file 251-1 is the first file in the group (the first file in which the first clip data of the series of clip data is described).

Similarly, management information 301-2 including order information 341-2 indicating that the present file is second in the order is included in the multiplexed form in the second file 251-2. When the playback apparatus reads this file 251-2, the order information 341-2 allows the playback apparatus to identify that this file 251-2 is the second file in the group (the second file in which the second clip data of the series of clip data is described).

In the case of the third file 251-3, management information 301-3 including order information 341-3 indicating that the present file is third in the order is included in the multiplexed form in the third file 251-3, and thus when the playback apparatus reads this file 251-3, the order information 341-3 allows the playback apparatus to identify that this file 251-3 is the third file in the group (the third file in which the third clip data of the series of clip data is described).

In this embodiment, as with the management information generator 44 shown in FIG. 13, the management information generator 272 is configured to include an order information manager 132, and the management information memory 273 is configured to store one piece of management information 301 as with the management information generator 45 shown in FIG. 13. The management information generator 272 generates order information (in step S63) as in the management information preparation process shown in the flow chart of FIG. 14 instead of steps S212 and S213 in FIG. 31, and the management information generator 272 generate management information using the order information (in step S64). However, the management information memory 273 stores not two pieces of management information (first management information 301A and second management information 302B) but only one piece of management information 301, and thus step S217 is skipped.

The management information 301 may include storage group identification information as described earlier with reference to FIGS. 15 to 18. In this case, the management information generator 272 is configured to include a storage group identification information generator 142 and a storage group identification information memory 143 such as those described earlier with reference to FIG. 15. With this management information generator 272, storage group identification information is generated in the initialization process as described earlier with reference to the flow chart shown in FIG. 16, and management information is generated using data identification information and storage group identification information in step S213 of the data storage process, as in the management information preparation process described earlier with reference to FIG. 17.

Figure 35:
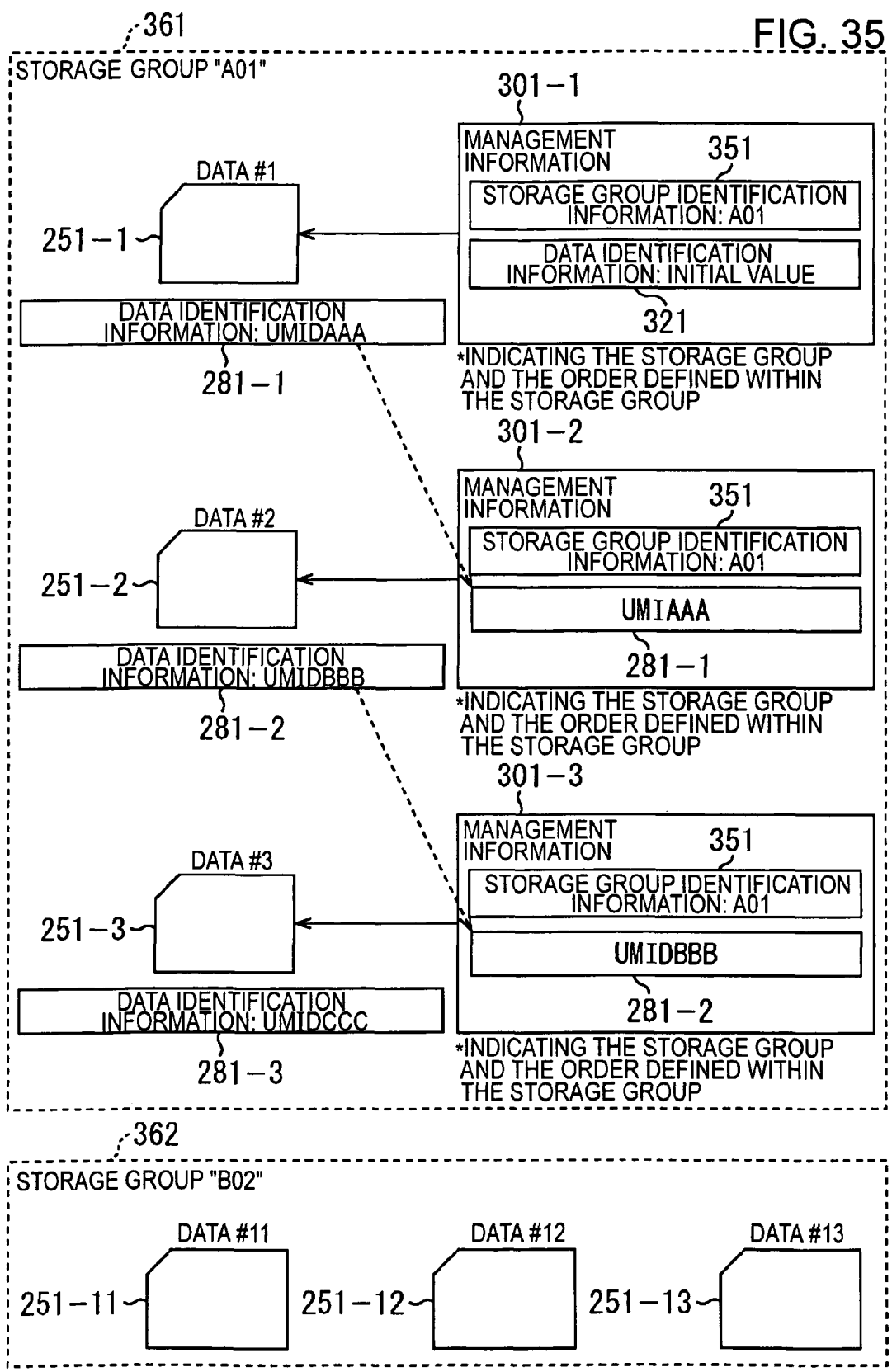
FIG. 35 is a diagram showing another example of management information.

As a result, for example, as shown in FIG. 35, management information 301-1 to management information 301-3 each include storage group identification information 351 having a value of "A01" together with data identification information 281 (data identification information 281-1 or 281-2 or a predetermined initial value 321), and thus files 251-1 to 251-3 respectively including management information 301-1 to management information 301-3 in the multiplexed form are identified as files belonging to a storage group 361 identified by "A01" (that is, files 251-1 to 251-3 are identified to include clip data belonging to the storage group 361). Thus, a playback apparatus can easily identify that these files 251-1 to 251-3 belong to a group different from a storage group 362 identified by "B02" to which files 251-11 to 251-13 belong.

As described above, when the storage device 241 stores files 251, management information 71 included in the files 251 in the multiplexed form is generated such that the management information 71 includes storage group identification information 351 together with data identification information 281, and thus it is possible to identify a storage group to which the files 251 belong and it is also possible to identify the order of the files 251 defined within the storage group.

The value of the storage group identification information 351 shown in FIG. 35 is an example, and an arbitrary value may be used as long as it can uniquely identify the storage group. The data identification information 321 is also allowed to have an arbitrary value as long as it correctly identifies data. This also applies to notification information included in management information 301 described elsewhere in the present invention.

In the example described above with reference to FIG. 35, a UMID is assigned as data identification information 281 to each file such that each of the files 251-1 to 251-3 has a UMID with a different value.

A UMID may be assigned to an item other than files. For example, a UMID may be assigned to a storage group as shown in FIG. 36. In this case, the UMID serves as storage group identification information.

In the example shown in FIG. 36, in management information 301 included in a multiplexed form in each file 251, a UMID is used as storage group identification information 351 to identify a storage group, and a file name is used as data identification information 281 to identify each file. More specifically, for example, in management information 301-2 included in the multiplexed form in a file 251-2, a file name "C0001" is used as data identification information 281-1 to point to a file 251-1. Similarly, in management information 301-3 included in the multiplexed form in a file 251-3, a file name "C0002" is used as data identification information 281-2 to point to a file 251-2.

As with the storage medium identification information described earlier with reference to FIGS. 19 to 22, data identification information identifying next data may be assigned to the management information. However, also in this case, it is required that notification information identifying each file have been determined and the storage device 241 have acquired the notification information identifying each file. More specifically, if UMIDs to be assigned to files to be generated are predetermined, and the storage device 241 is informed of the predetermined UMIDs in advance, then it is possible to describe identification information of next data in the management information 301 as shown in FIG. 37 so that when a playback apparatus reads one of these files, the playback apparatus can identify a UMID of a file next to the current file (that is, playback apparatus can identify a next file).

Figure 37:
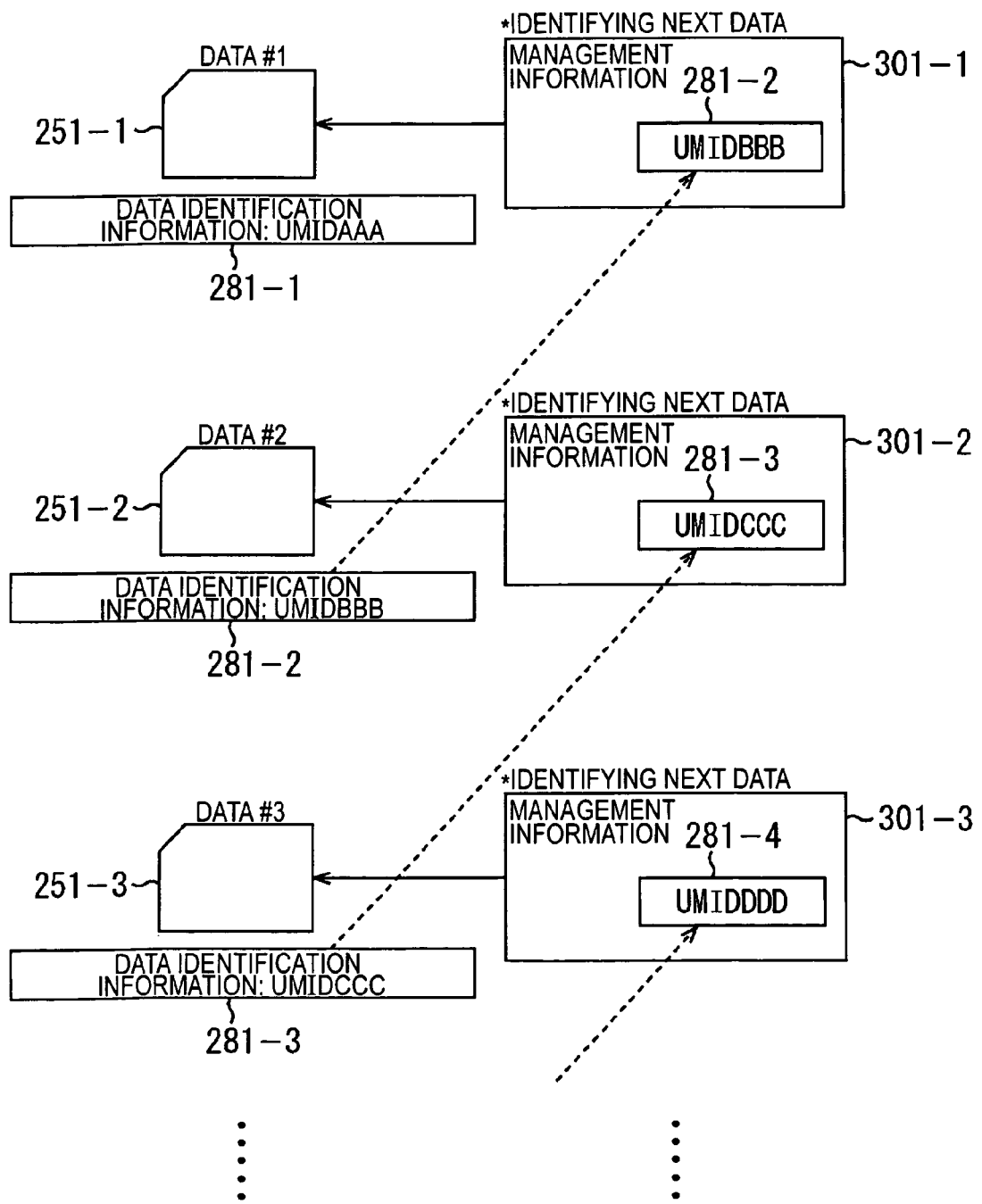
FIG. 37 is a diagram showing another example of management information.

The values of the next-storage medium identification information 281-2 to 281-4 shown in FIG. 37 are examples, and arbitrary values may be used. This also applies to notification information included in management information 301 described elsewhere in the present invention.

As described above, the storage device 13 is capable of storing data in such a form that allows the stored data to be easily managed, thereby providing improved convenience in using data.

Note that a plurality of files generated from clip data or the like may be stored on a single storage medium or may be stored on a plurality of storage media. When files are stored on a plurality of storage media, storage medium identification information may be used in addition to the data identification information.

A specific example of a system that uses data identification information generated in the above-described manner is described below.

Figure 38:
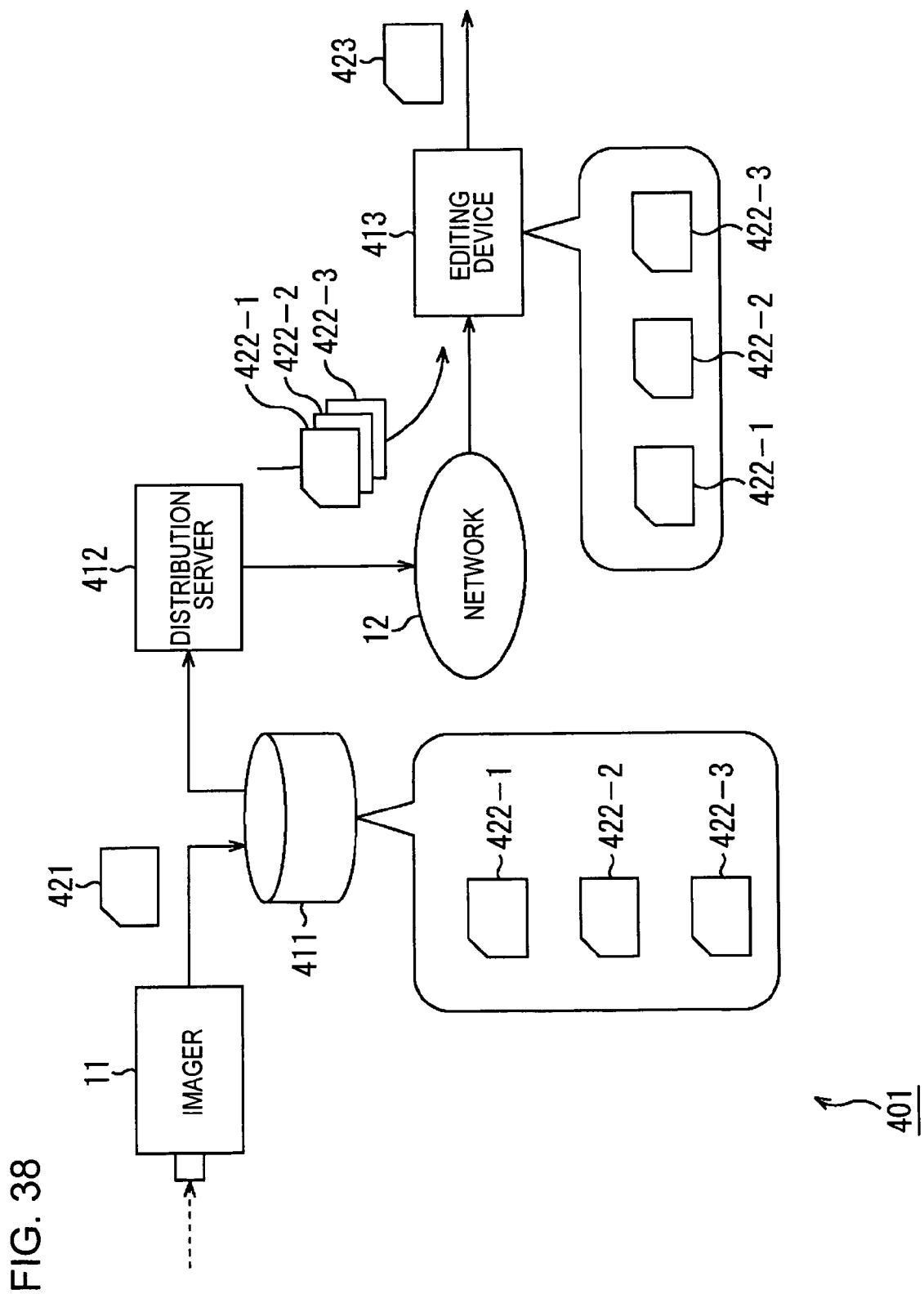
FIG. 38 is a block diagram showing a network system according to another embodiment of the present invention.

FIG. 38 is a diagram showing an example of a network system according to an embodiment of the present invention.

As shown in FIG. 38, the network system 401 includes an imager 11, a database 411, a distribution server 412, a network 12, and an editing apparatus 413.

In this network system 401, clip data obtained by taking images by the imager 11 are stored in the database 411, and the accumulated clip data are supplied to the editing apparatus 413 from the distribution server 412 via the network 12.

In this system, a common network such as the Internet is used as the network 12 to communicate with various apparatus connected to the network 12. If data with a very large size is transmitted via the network 12, the data occupies a very wide band in the transmission via the network 12. Because the network 12 is shared by various apparatus, occupation of such a wide band by a particular data causes other apparatus not to be allowed to use the network 12. To avoid the above problem, instead of directly transferring a data with a large size, the distribution server 412 divides the data into a plurality of files and transfers them separately to the editing apparatus 413. This allows the data to be transmitted to the editing apparatus 413 without imposing a too large burden on the network 12.

More specifically, the clip data 421 output from the imager 11 is supplied to the database 411 and stored therein. When the clip data 421 is stored in the database 411, the database 411 divides the clip data 421 into three files 422-1 to 422-3 and stores these three files as a single group.

In accordance with a request from the editing apparatus 413, the distribution server 412 reads the three files 422-1 to 422-3 stored as the single group 422 in the database 411 and supplies these three files 422-1 to 422-3 to the editing apparatus 413 via the network 12. If the editing apparatus 413 receives these three files, the editing apparatus 413 treats these three files as one clip data (that is, the clip data 421). More specifically, in accordance with edit commands issued by a user, the editing apparatus 413 edits the clip data 421 and outputs a result as clip data 423.

Figure 39:
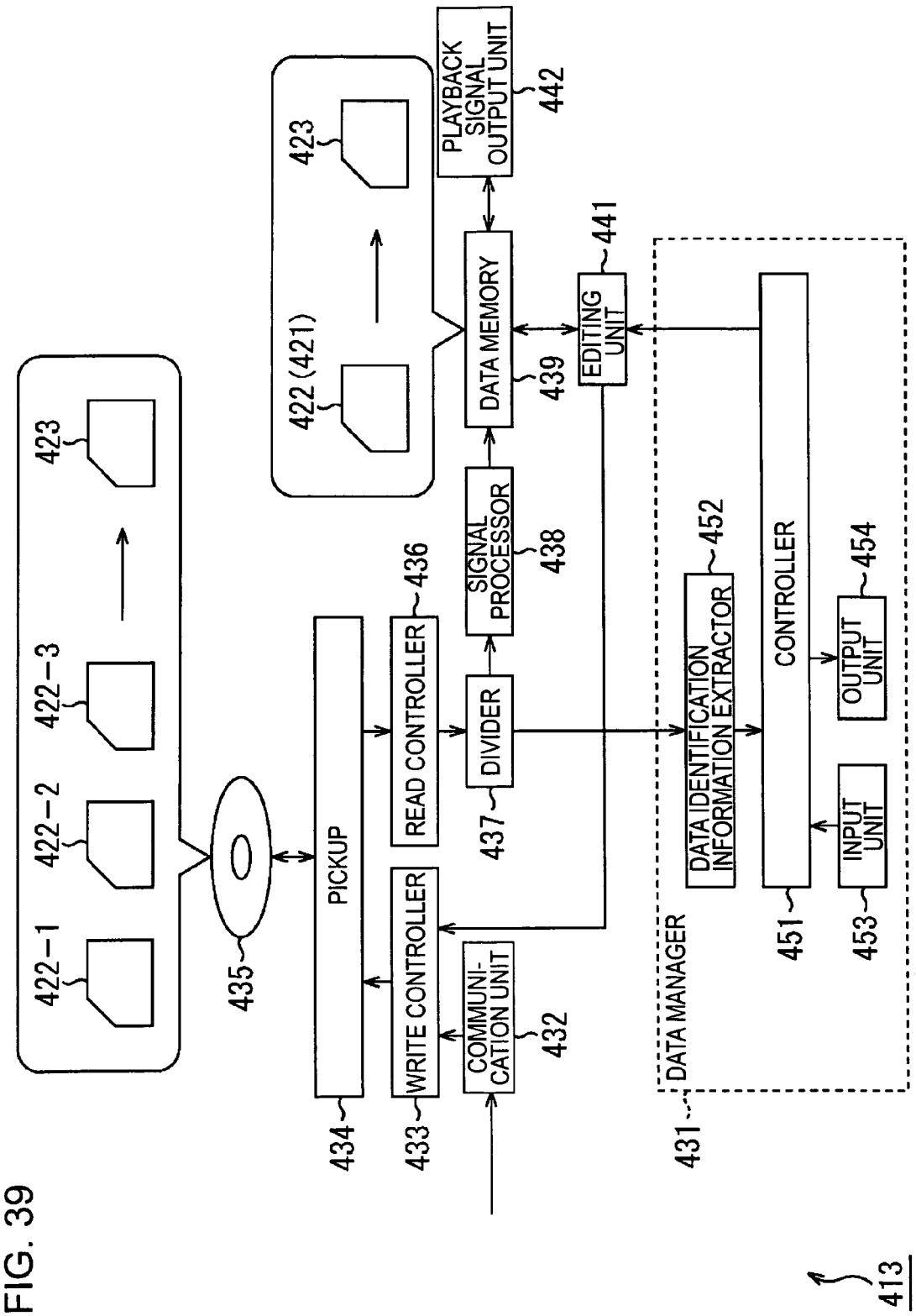
FIG. 39 is

FIG. 39 shows an example of a structure of the editing apparatus 413 in the network system 401.

As shown in FIG. 39, the editing apparatus 413 includes a data manager 431, a communication unit 432, a write controller 433, a pickup 434, an optical disk 435, a read controller 436, a divider 437, as signal processor 438, a data memory 439, an editor 441, and a playback signal output unit 442.

The data manager 431 is a processing unit that manages the order of data (files). The data manager 431 includes a controller 451, a data identification information extractor 452, an input unit 453, and an output unit 454.

The controller 451 includes a CPU, a ROM, and RAM, and serves to control various parts of the editing apparatus 413 via a bus (not shown). If the data identification information extractor 452 extracts data identification information from the management information supplied from the divider 437, the controller 451 identifies the order of files (the order in which the files were generated) based on the extracted data identification information and generates unification information that allows the editor 441 to treat the files as a single clip data. The generated unification information is supplied to the editor 441. If an output command is issued by the user via the input unit 453, the controller 451 outputs information specified by the user via the output unit 454 to present it to the user.

The communication unit 432 communicates with the distribution server 412 via the network 12 to acquire the files 422-1 to 422-3 supplied from the distribution server 412. The acquired files 422-1 to 422-3 are supplied to the controller 433.

The write controller 433 writes the files 422-1 to 422-3 supplied from the communication unit 432 on the optical disk 435 via the pickup 434. The read controller 436 reads the files 422-1 to 422-3 written (stored) on the optical disk 435 via the pickup 434 and supplies the read files 422-1 to 422-3 to the divider 437.

The divider 437 extracts the multiplexed management information from the files 422-1 to 422-3 supplied from the read controller 436 and supplies the extracted management information to the data identification information extractor 452. The divider 437 also supplies the files 422-1 to 422-3 to the signal processor 438. The signal processor 438 performs signal processing on the supplied files 422-1 to 422-3 and supplies the resultant files 422-1 to 422-3 to the data memory 439 to store them therein. The data memory 439 stores the supplied files 422-1 to 422-3 and provides them to the editor 441 or the playback signal output unit 442 in response to a request.

The editor 441 edits the files 422-1 to 422-3 stored in the data memory 439 as a single clip data 422 (that is, the clip data 421) based on the unification information supplied from the controller 451. As a result, edited clip data 423 is obtained in the data memory 439. The editor 441 acquires the edited clip data 423 from the data memory 439 and supplies it to the write controller 433 to store it on the optical disk 435. Thus, the clip data 423 obtained as the result of the process of editing the files 422-1 to 422-3 is stored on the optical disk 435.

The playback signal output unit 442 acquires the unification information from the editor 441 via the data memory 439 and, based on the unification information, continuously plays back the files 422-1 to 422-3 as the single clip data 422 or edited clip data 423.

Figure 40:
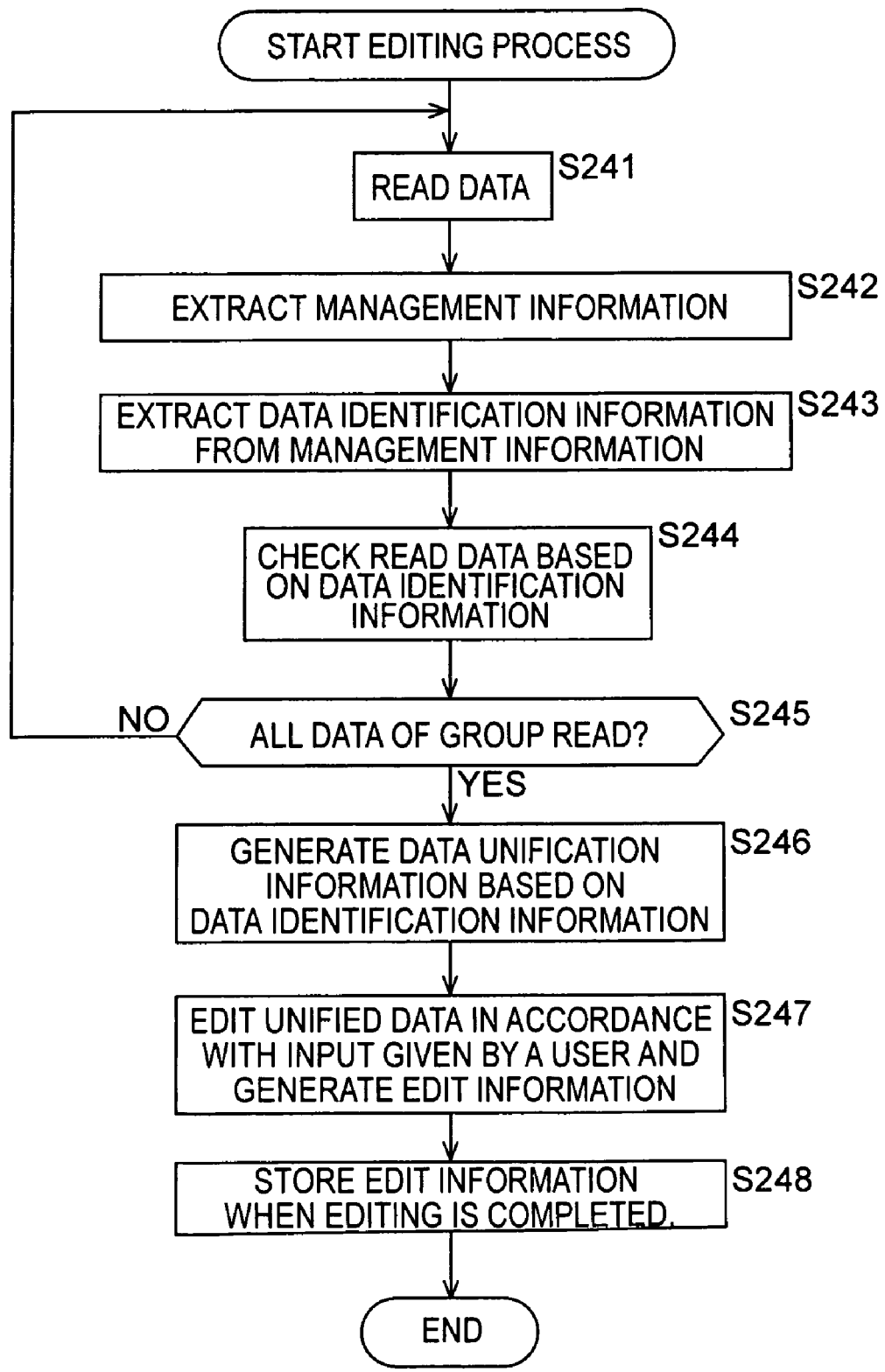
FIG. 40 is a flow chart showing an example of an editing process.

The editing process performed by the editing apparatus 413 is described in further detail below with reference to a flow chart shown in FIG. 40.

First, in step S241, the read controller 436 reads data (the files 422-1 to 422-3) from the optical disk 435 via the pickup 434, and supplies the read data to the divider 437. In step S242, the divider 437 extracts the management information from the supplied data (the files 422-1 to 422-3) and supplies the extracted management information to the data identification information extractor 452. The divider 452 also supplies the data (the files 422-1 to 422-3) to the signal processor 438.

In step S243, the data identification information extractor 452 extracts data identification information from the supplied management information, and supplies the extracted data identification information to the controller 451. In step S244, the controller 451 identifies the read data based on the supplied data identification information. In step S245, the controller 451 determines whether all data of the group have been read. If all data have not been read, the process returns to step S241 to repeat the above-described process from step S241 until all data of the group have been read. That is, the controller 451 performs steps S241 to S245 repeatedly until it is determined in step S245 that all data of the group have been read. If it is determined in step S245 that all data of the group have been read, the controller 451 advances the process to step S246.

In step S246, the controller 451 generates unification information associated with the data based on the data identification information supplied from the data identification information extractor 452 and supplies the generated unification information to the editor 441. In step S247, the editor 441 acquires data/command input by a user via the input unit 453 under the control of the controller 451 and edits the data unified by the unification information in accordance with the data/command input by the user (that is, the editor 441 unifies the files 422-1 to 422-3 stored in the data memory 439 in accordance with the unification information and edits the unified data). The editor 441 generates edit information (for example, an edit list) as a result of the edit process. In step S248, when the edit process is completed after all data/commands have been input, the editor 248 supplies the edit information obtained as the result of the edit process to the write controller 433 to store the edit information on the optical disk 435. After step S248, the process is ended.

As described above, the data identification information multiplexed on each of the files 422-1 to 422-3 allows the controller 451 to generate unification information by which to unify the files 422-1 to 422-3, and the generated unification information allows the editor 441 or the playback signal output unit 442 to deal with the files 422-1 to 422-3 as a single clip data.

As described above, the database 411 shown in FIG. 38 converts the clip data 421 into files 422-1 to 422-3 thereby making it possible to transmit the clip data via the network 12 in a state in which the data does not occupy too wide a band, without losing convenience for the editing apparatus 413 to deal with the received data.

As described above, by storing management information using storage medium identification information together with data on a storage medium, it becomes possible to easily manage the data stored on the storage medium thereby providing improved convenience in using the storage medium.

When a plurality of data generated in a successive order, as is the case with clip data described above, information indicating the order in which the data is generated is generated based on data identification information identifying the respective generated data and the information is attached in a multiplexed form to the data so that the plurality of successive data can be easily managed, thereby providing improved convenience in using the data.

Techniques disclosed in the embodiments in which storage medium identification information and embodiments in which data identification information may be arbitrarily combined as required. Parts of an apparatus or processing steps in an embodiment may be used to another embodiment unless stated. For example, the example of the structure shown in FIG. 13, 15, or 19 may be used in the storage device 241 shown in FIG. 28, and the process corresponding to the structure may be used in the storage device 241 shown in FIG. 28. However, in this case, it is necessary to properly replace the storage medium identification information 51 with the data identification information 281.

There is no particular restriction on the number of generated data, the number of generated files, and the number of files in which original data is divided. There is also no particular restriction on the number of apparatus or units included in the system, and there is no restriction on the number of storage media used, unless otherwise specified.

Although optical disks are used by way of example as storage media in the above-described embodiment, there is no restriction on the type of storage media unless otherwise specified.

The sequence of processing steps described above may be performed by means of hardware or software. When the sequence of processing steps are performed by means of software, the storage device 13 shown in FIG. 1 or the storage device 241 shown in FIG. 27 may be implemented on a personal computer such as that shown in FIG. 41.

Figure 41:
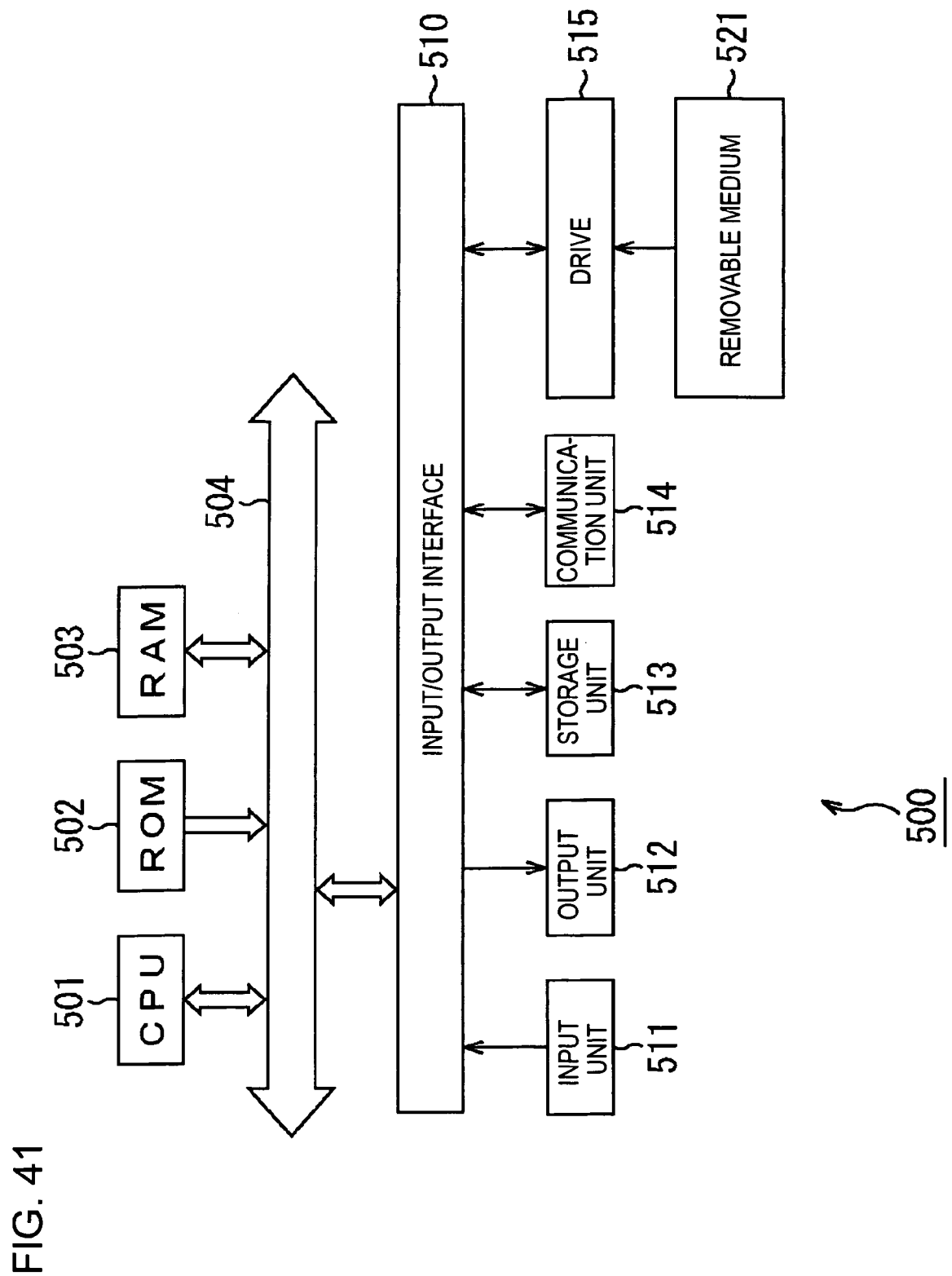
FIG. 41 is a block diagram showing a structure of a personal computer according to an embodiment of the present invention.

In the personal computer 500 shown in FIG. 41, a CPU 501 executes various processes in accordance with a program stored in a ROM 502 or a program loaded from a storage unit 513 into a RAM 503. The RAM 503 is also used to store data used by the CPU 501 in the execution of various processes.

The CPU 501, the ROM 502, and the RAM 503 are connected to each other via a bus 504. The bus 504 is also connected to an input/output interface 510.

The input/output interface 510 is also connected to an input unit 511 including a keyboard, mouse, and the like, an output unit 512 including a display such as a CRT or an LCD and a speaker, a storage unit 513 such as a hard disk, and a communication unit 514 such as a modem. The communication unit 514 serves to perform communication via a network such as the Internet.

Furthermore, the input/output interface 510 is also connected to a drive 515, as required. A removable storage medium 521 such as a magnetic disk, an optical disk, a magnetooptical disk, or a semiconductor memory is mounted on the drive 515 as required, and a computer program is read from the removable storage medium 521 and installed into the storage unit 513, as required.

When the processing sequence is executed by software, a program forming the software may be installed from a storage medium or via a network onto a computer.

An example of such a storage medium usable for the above purpose is a removable medium, such as the removable medium 521 shown in FIG. 41, on which a program is stored and which is supplied to a user separately from a computer. Specific examples include a magnetic disk (such as a floppy disk), an optical disk (such as a CD-ROM (Compact Disk-Read Only Memory) and a DVD (Digital Versatile Disk)), a magnetooptical disk (such as an MD (Mini-Disk, trademark)), and a semiconductor memory. A program may also be supplied to a user by preinstalling it on a built-in ROM 502 or a storage unit 513 such as a hard disk disposed in the computer.

In the present description, the steps described in the program stored in the storage medium may be performed either in time sequence in accordance with the order described in the program or in a parallel or separate fashion.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus that stores data on a plurality of storage media, comprising:
   a management information generator that generates first management information to manage an order in which data is stored on a particular storage media of the plurality of storage media, said first management information comprising first storage medium identification information identifying the particular storage media;
   a history information generator that generates history information from second management information previously generated for at least one storage media different than the particular storage media by the management information generator, the second management information comprising second storage medium identification information identifying the at least one storage media different than the particular storage media;
   a multiplexer that multiplexes the first storage medium identification information, generated by the management information generator, and the history information, generated by the history information generator, on the data; and
   a storage unit that stores the data, including the first storage medium identification information identifying the particular storage media and the history information multiplexed by the multiplexer, on the particular storage media.

2. An information processing apparatus according to claim 1, further comprising an information reader that reads the storage medium identification information from each storage medium, wherein
   the management information generator generates the management information using the storage medium identification information read by the information reader.

3. An information processing apparatus according to claim 1, wherein the management information multiplexed on the data by the multiplexer is generated by the management information generator so as to include storage medium identification information identifying a storage medium immediately previous, in the order of storage media, to the storage medium on which the data is stored.

4. An information processing apparatus according to claim 1, wherein the management information multiplexed on the data by the multiplexer is generated by the management information generator so as to include storage medium identification information identifying a storage medium immediately following, in the order of storage media, the storage medium on which the data is stored.

5. An information processing apparatus according to claim 1, further comprising an order information manager that manages the value of order information associated with the order, wherein
   the management information generator generates the management information using the order information managed by the order information manager.

6. An information processing apparatus according to claim 1, further comprising a storage group identification information generator that generates storage group identification information identifying a storage group that is a set of data, wherein
   the management information generator generates the management information using the storage group identification information generated by the storage group identification information generator.

7. The information processing apparatus of claim 1, wherein said storage medium identification information is one or more of a burst cutting area information, a production serial number, an internet protocol address, a name, a Universal Disk Format volume information, or a hash value generated using one of a burst cutting area information, a production serial number, an internet protocol address, a name, or a Universal Disk Format volume information.

8. A method of processing data in an information processing apparatus that stores data on a plurality of storage media, comprising the steps of:
   generating first management information to manage an order in which data is stored on a particular storage media of the plurality of storage media, said first management information comprising storage medium identification information identifying the particular storage media;
   generating history information from second management information previously generated for at least one storage media different than the particular storage media, the second management information comprising second storage medium identification information identifying the at least one storage media different than the particular storage media;

multiplexing the first storage medium identification information, generated in the management information generating step, and the history information, generated in the history generating step, on the data; and storing the data, including the first storage medium identification information identifying the particular storage media and the history information multiplexed in the multiplexing step, on the particular storage media.

9. The method of processing data in an information processing apparatus that stores data on a plurality of storage media of claim 8, wherein said storage medium identification information is one or more of a burst cutting area information, a production serial number, an internet protocol address, a name, a Universal Disk Format volume information, or a hash value generated using one of a burst cutting area information, a production serial number, an internet protocol address, a name, or a Universal Disk Format volume information.

10. A non-transitory computer-readable medium comprising a program with instructions that when executed by a processor perform a process of storing data on a plurality of storage media, the process comprising the steps of:

generating first management information to manage an order in which data is stored on a particular storage media of the plurality of storage media, said first management information comprising storage medium identification information identifying the particular storage media;

generating history information from second management information previously generated for at least one storage media different than the particular storage media, the second management information comprising second storage medium identification information identifying the at least one storage media different than the particular storage media;

multiplexing the first storage medium identification information, generated in the management information generating step, and the history information, generated in the history generating step, on the data; and storing the data, including the first storage medium identification information identifying the particular storage media and the history information multiplexed in the multiplexing step, on the particular storage media.

11. The non-transitory computer-readable medium comprising a program with instructions that when executed by a processor perform a process of storing data on a plurality of storage media of claim 10, wherein said storage medium identification information is one or more of a burst cutting area information, a production serial number, an internet protocol address, a name, a Universal Disk Format volume information, or a hash value generated using one of a burst cutting area information, a production serial number, an internet protocol address, a name, or a Universal Disk Format volume information.

12. An information processing apparatus that plays back data stored on a plurality of storage media, comprising:

a reading unit that reads the data from each of the plurality of storage media;

an extractor that extracts first storage medium identification information and history information from each particular storage media read by the reading unit, the first storage medium identification information identifying the particular storage media on which the respective data is stored and the history information including second management information previously generated for at least one storage media different than the particular storage media, the second management information comprising second storage medium identification information identifying the at least one storage media different than the particular storage media;

a playback order determination unit that determines the order in which to play back the plurality of data read by the reading unit, based on the first storage medium identification information extracted by the extractor; and a playback controller that plays back the plurality of data read by the reading unit in the order determined by the playback order determination unit.

13. The information processing apparatus that plays back data stored on a plurality of storage media of claim 12, wherein said storage medium identification information is one or more of a burst cutting area information, a production serial number, an internet protocol address, a name, a Universal Disk Format volume information, or a hash value generated using one of a burst cutting area information, a production serial number, an internet protocol address, a name, or a Universal Disk Format volume information.

14. A method of processing data in an information processing apparatus that plays back data stored on a plurality of storage media, comprising the steps of:

reading the data from each of the plurality of storage media;

extracting with a processor first storage medium identification information and history information from each particular storage media read in the reading step, the first storage medium identification information identifying the particular storage media on which the respective data is stored and the history information including second management information previously generated for at least one storage media different than the particular storage media, the second management information comprising second storage medium identification information identifying the at least one storage media different than the particular storage media;

determining with the processor the order in which to play back the plurality of data read in the reading step, based on the first storage medium identification information extracted in the extraction step; and playing back the plurality of data read in the reading step in the order determined by the playback order determination step.

15. The method of processing data in an information processing apparatus that plays back data stored on a plurality of storage media of claim 14, wherein said storage medium identification information is one or more of a burst cutting area information, a production serial number, an internet protocol address, a name, a Universal Disk Format volume information, or a hash value generated using one of a burst cutting area information, a production serial number, an internet protocol address, a name, or a Universal Disk Format volume information.

16. A non-transitory computer-readable medium comprising a program with instructions that when executed by a processor perform a process of playing back data stored on a plurality of storage media, the process comprising the steps of:

reading the data from each of the plurality of storage media;

extracting with a processor first storage medium identification information and history information from each particular storage media read in the reading step, the first storage medium identification information identifying the particular storage media on which the respective data is stored and the history information including second management information previously generated for at least one storage media different than the particular storage media, the second management information comprising second storage medium identification information identifying the at least one storage media different than the particular storage media;

determining with the processor the order in which to play back the plurality of data read in the reading step, based on the first storage medium identification information extracted in the extraction step; and playing back the plurality of data read in the reading step in the order determined by the playback order determination step.

17. The non-transitory computer-readable medium of claim 16, wherein said storage medium identification information is one or more of a burst cutting area information, a production serial number, an internet protocol address, a name, a Universal Disk Format volume information, or a hash value generated using one of a burst cutting area information, a production serial number, an internet protocol address, a name, or a Universal Disk Format volume information.

* * * * *